(12) United States Patent
Pickering et al.

(10) Patent No.: US 12,385,265 B2
(45) Date of Patent: Aug. 12, 2025

(54) BLOCK TRANSFER APPARATUS AND IMPROVED CLAMPING ASSEMBLY FOR USE THEREWITH

(71) Applicant: FASTBRICK IP PTY LTD, High Wycombe (AU)

(72) Inventors: Samuel Thomas Pickering, Kalamunda (AU); David James Newcombe, Cottesloe (AU); Rudolf Hans Hauri, City Beach (AU)

(73) Assignee: FASTBRICK IP PTY LTD, High Wycombe (AU)

( * ) Notice: Subject to any disclaimer, the term of this patent is extended or adjusted under 35 U.S.C. 154(b) by 13 days.

(21) Appl. No.: 17/920,335

(22) PCT Filed: Apr. 22, 2021

(86) PCT No.: PCT/AU2021/050361
§ 371 (c)(1),
(2) Date: Oct. 20, 2022

(87) PCT Pub. No.: WO2021/212176
PCT Pub. Date: Oct. 28, 2021

(65) Prior Publication Data
US 2023/0167650 A1    Jun. 1, 2023

(30) Foreign Application Priority Data
Apr. 22, 2020    (AU) ................. 2020901272

(51) Int. Cl.
E04G 21/22    (2006.01)
B25J 9/16    (2006.01)
(Continued)

(52) U.S. Cl.
CPC ............ *E04G 21/22* (2013.01); *B25J 9/1694* (2013.01); *B25J 11/00* (2013.01); *B25J 13/089* (2013.01);
(Continued)

(58) Field of Classification Search
CPC ........ B25J 9/1694; B25J 11/00; B25J 13/089; B25J 15/0033; B25J 15/0253;
(Continued)

(56) References Cited

U.S. PATENT DOCUMENTS 428,096 A    5/1890    Hathaway
1,411,172 A    3/1922    Kaye
(Continued)

FOREIGN PATENT DOCUMENTS

AU    645640 B2    1/1994
CH    673498 A    3/1990
(Continued)

OTHER PUBLICATIONS

Examination report dated Sep. 30, 2023 on Australian Patent Application No. AU2018348785.
(Continued)

*Primary Examiner* — Saul Rodriguez
*Assistant Examiner* — Brendan P Tighe
(74) *Attorney, Agent, or Firm* — Perkins Coie LLP

(57) ABSTRACT

A block transfer apparatus for transferring a block between an upstream and downstream clamps of a block delivery system. The apparatus includes: a frame pivotally mounted to a support; a clamping assembly mounted to the frame and linearly extendable relative thereto, and including a pair of gripper jaws for clamping opposing sides of the block. The apparatus receives a block in the gripper jaws in an approximate position; rotates to a drop position and releases the block allowing it to self-datum onto first and second
(Continued)

orthogonal datum surfaces. The apparatus re-clamps the block after the drop by applying a clamping force to opposing sides of the block to register the block against a third datum surface to thereby datum the position of the block with respect to the clamping assembly; and presents the block clamped in the datumed position for transfer to the downstream clamp.

16 Claims, 24 Drawing Sheets

(51) Int. Cl.
  *B25J 11/00* (2006.01)
  *B25J 13/08* (2006.01)
  *B25J 15/00* (2006.01)
  *B25J 15/02* (2006.01)

(52) U.S. Cl.
  CPC ....... *B25J 15/0033* (2013.01); *B25J 15/0253* (2013.01)

(58) Field of Classification Search
  CPC .... B65G 47/248; B65G 47/252; B65G 47/84; B65G 47/842; B65G 47/847; B65G 47/904; E04G 21/22
  See application file for complete search history.

(56) References Cited

U.S. PATENT DOCUMENTS

| | | |
|---|---|---|
| 1,633,192 A | 6/1927 | Reagan |
| 1,829,435 A | 10/1931 | Barnhart |
| 2,599,552 A | 6/1952 | Harney |
| 3,438,171 A | 4/1969 | Demarest |
| 3,746,570 A | 7/1973 | McIntosh |
| 3,757,484 A | 9/1973 | Williamson et al. |
| 3,790,428 A | 2/1974 | Lingl |
| 3,791,559 A | 2/1974 | Foye |
| 3,834,973 A | 9/1974 | Kummerow |
| RE28,305 E | 1/1975 | Williamson et al. |
| 3,930,929 A | 1/1976 | Lingl |
| 3,950,914 A | 4/1976 | Lowen |
| 4,033,463 A | 7/1977 | Cervin |
| 4,067,766 A | 1/1978 | Larger |
| 4,106,259 A | 8/1978 | Taylor-smith |
| 4,221,258 A | 9/1980 | Richard |
| 4,245,451 A | 1/1981 | Taylor-smith |
| 4,303,363 A | 12/1981 | Cervin |
| 4,523,100 A | 6/1985 | Payne |
| 4,635,985 A | 1/1987 | Rooke |
| 4,708,562 A | 11/1987 | Melan et al. |
| 4,714,339 A | 12/1987 | Lau |
| 4,758,036 A | 7/1988 | Legille et al. |
| 4,765,789 A | 8/1988 | Lonardi et al. |
| 4,786,227 A * | 11/1988 | Kremer ................ F27D 1/1621 266/281 |
| 4,790,651 A | 12/1988 | Brown et al. |
| 4,827,689 A | 5/1989 | Lonardi et al. |
| 4,829,737 A | 5/1989 | Anliker |
| 4,852,237 A | 8/1989 | Tradt et al. |
| 4,911,595 A | 3/1990 | Kirchen et al. |
| 4,945,493 A | 7/1990 | Huang et al. |
| 4,952,772 A | 8/1990 | Zana |
| 4,954,762 A | 9/1990 | Miyake et al. |
| 4,969,789 A | 11/1990 | Searle |
| 5,004,844 A | 4/1991 | Van Leeuwen et al. |
| 5,013,986 A | 5/1991 | Gauggel |
| 5,018,923 A * | 5/1991 | Melan .................. E04G 21/22 414/744.5 |
| 5,049,797 A | 9/1991 | Phillips |
| 5,080,415 A | 1/1992 | Bjornson |
| 5,193,723 A | 3/1993 | Everett et al. |
| 5,196,900 A | 3/1993 | Pettersen |
| 5,284,000 A | 2/1994 | Milne et al. |
| 5,321,353 A | 6/1994 | Furness |
| 5,403,140 A | 4/1995 | Carmichael et al. |
| 5,413,454 A | 5/1995 | Movsesian |
| 5,419,669 A | 5/1995 | Kremer et al. |
| 5,420,489 A | 5/1995 | Hansen et al. |
| 5,469,531 A | 11/1995 | Faure et al. |
| 5,497,061 A | 3/1996 | Nonaka et al. |
| 5,523,663 A | 6/1996 | Tsuge et al. |
| 5,527,145 A | 6/1996 | Duncan |
| 5,557,397 A | 9/1996 | Hyde et al. |
| 5,581,975 A | 12/1996 | Trebbi |
| 5,737,500 A | 4/1998 | Seraji et al. |
| 5,743,374 A * | 4/1998 | Monsees ................ B65H 1/30 414/349 |
| 5,838,882 A | 11/1998 | Gan et al. |
| 5,895,690 A | 4/1999 | Greisel |
| 6,018,923 A | 2/2000 | Wendt |
| 6,049,377 A | 4/2000 | Lau et al. |
| 6,101,455 A | 8/2000 | Davis |
| 6,112,955 A | 9/2000 | Lang |
| 6,134,507 A | 10/2000 | Markey, Jr. et al. |
| 6,166,809 A | 12/2000 | Pettersen et al. |
| 6,166,811 A | 12/2000 | Long et al. |
| 6,172,754 B1 | 1/2001 | Niebuhr |
| 6,213,309 B1 | 4/2001 | Dadisho |
| 6,285,959 B1 | 9/2001 | Greer |
| 6,310,644 B1 | 10/2001 | Keightley |
| 6,330,503 B1 | 12/2001 | Sharp et al. |
| 6,370,837 B1 | 4/2002 | Mcmahon et al. |
| 6,427,122 B1 | 7/2002 | Lin |
| 6,429,016 B1 | 8/2002 | Mcneil |
| 6,512,993 B2 | 1/2003 | Kacyra et al. |
| 6,516,272 B2 | 2/2003 | Lin |
| 6,584,378 B1 | 6/2003 | Anfindsen |
| 6,611,141 B1 | 8/2003 | Schulz |
| 6,618,496 B1 | 9/2003 | Tassakos et al. |
| 6,628,322 B1 | 9/2003 | Cerruti |
| 6,643,002 B2 | 11/2003 | Drake, Jr. |
| 6,664,529 B2 | 12/2003 | Pack et al. |
| 6,681,145 B1 | 1/2004 | Greenwood et al. |
| 6,683,694 B2 | 1/2004 | Cornil |
| 6,704,619 B1 | 3/2004 | Coleman et al. |
| 6,741,364 B2 | 5/2004 | Lange et al. |
| 6,825,937 B1 | 11/2004 | Gebauer et al. |
| 6,850,946 B1 | 2/2005 | Rappaport et al. |
| 6,859,729 B2 | 2/2005 | Breakfield et al. |
| 6,864,966 B2 | 3/2005 | Giger |
| 6,868,847 B2 | 3/2005 | Ainedter et al. |
| 6,873,880 B2 | 3/2005 | Hooke et al. |
| 6,917,893 B2 | 7/2005 | Dietsch et al. |
| 6,935,036 B2 | 8/2005 | Barber et al. |
| 6,957,496 B2 | 10/2005 | Raab et al. |
| 6,965,843 B2 | 11/2005 | Hobden et al. |
| 6,970,802 B2 | 11/2005 | Ban et al. |
| 6,996,912 B2 | 2/2006 | Raab et al. |
| 7,050,930 B2 | 5/2006 | Hobden et al. |
| 7,051,450 B2 | 5/2006 | Barber et al. |
| 7,069,664 B2 | 7/2006 | Barber et al. |
| 7,107,144 B2 | 9/2006 | Capozzi et al. |
| 7,111,437 B2 | 9/2006 | Ainedter |
| 7,130,034 B2 | 10/2006 | Barvosa-carter et al. |
| 7,142,981 B2 | 11/2006 | Hablani |
| 7,145,647 B2 | 12/2006 | Suphellen et al. |
| 7,153,454 B2 | 12/2006 | Khoshnevis |
| 7,174,651 B2 | 2/2007 | Barber et al. |
| 7,230,689 B2 | 6/2007 | Lau |
| 7,246,030 B2 | 7/2007 | Raab et al. |
| 7,269,910 B2 | 9/2007 | Raab et al. |
| 7,347,311 B2 | 3/2008 | Rudge |
| 7,519,493 B2 | 4/2009 | Atwell et al. |
| 7,551,121 B1 | 6/2009 | Oconnell et al. |
| 7,564,538 B2 | 7/2009 | Sakimura et al. |
| 7,570,371 B1 | 8/2009 | Storm |
| 7,576,836 B2 | 8/2009 | Bridges |
| 7,576,847 B2 | 8/2009 | Bridges |
| 7,591,078 B2 | 9/2009 | Crampton |
| 7,639,347 B2 | 12/2009 | Eaton |
| 7,693,325 B2 | 4/2010 | Pulla et al. |

(56) References Cited

U.S. PATENT DOCUMENTS

| | | |
|---|---|---|
| 7,701,587 B2 | 4/2010 | Shioda et al. |
| 7,743,586 B2 | 6/2010 | Hancock |
| 7,774,159 B2 | 8/2010 | Cheng et al. |
| 7,800,758 B1 | 9/2010 | Bridges et al. |
| 7,804,602 B2 | 9/2010 | Raab |
| RE42,055 E | 1/2011 | Raab et al. |
| RE42,082 E | 2/2011 | Raab et al. |
| 7,881,896 B2 | 2/2011 | Atwell et al. |
| 7,967,549 B2 | 6/2011 | Geist et al. |
| 7,993,289 B2 | 8/2011 | Quistgaard et al. |
| 8,036,452 B2 | 10/2011 | Pettersson et al. |
| 8,054,451 B2 | 11/2011 | Karazi et al. |
| 8,060,344 B2 | 11/2011 | Stathis |
| 8,145,446 B2 | 3/2012 | Atwell et al. |
| 8,166,727 B2 | 5/2012 | Pivac et al. |
| 8,169,604 B2 | 5/2012 | Braghiroli et al. |
| 8,185,240 B2 | 5/2012 | Williams et al. |
| 8,229,208 B2 | 7/2012 | Pulla et al. |
| 8,233,153 B2 | 7/2012 | Knuettel |
| 8,244,030 B2 | 8/2012 | Pettersson et al. |
| 8,248,620 B2 | 8/2012 | Wicks et al. |
| 8,269,984 B2 | 9/2012 | Hinderling et al. |
| 8,327,555 B2 | 12/2012 | Champ |
| 8,337,407 B2 | 12/2012 | Quistgaard et al. |
| 8,345,926 B2 | 1/2013 | Clark et al. |
| 8,346,392 B2 | 1/2013 | Walser et al. |
| 8,405,716 B2 | 3/2013 | Yu et al. |
| 8,467,072 B2 | 6/2013 | Cramer et al. |
| 8,537,372 B2 | 9/2013 | Siercks et al. |
| 8,537,376 B2 | 9/2013 | Day et al. |
| 8,558,992 B2 | 10/2013 | Steffey |
| 8,593,648 B2 | 11/2013 | Cramer et al. |
| 8,595,948 B2 | 12/2013 | Raab et al. |
| 8,606,399 B2 | 12/2013 | Williams et al. |
| 8,634,950 B2 | 1/2014 | Simonetti et al. |
| 8,644,964 B2 | 2/2014 | Hendron et al. |
| 8,668,074 B2 | 3/2014 | Davidson |
| 8,670,114 B2 | 3/2014 | Bridges et al. |
| 8,677,643 B2 | 3/2014 | Bridges et al. |
| 8,792,709 B2 | 7/2014 | Pulla et al. |
| 8,803,055 B2 | 8/2014 | Lau et al. |
| 8,812,155 B2 | 8/2014 | Brethe |
| 8,825,208 B1 * | 9/2014 | Benson .................. E04F 21/02 700/247 |
| 8,832,954 B2 | 9/2014 | Atwell et al. |
| 8,848,203 B2 | 9/2014 | Bridges et al. |
| 8,875,409 B2 | 11/2014 | Kretschmer et al. |
| 8,898,919 B2 | 12/2014 | Bridges et al. |
| 8,902,408 B2 | 12/2014 | Bridges |
| 8,913,814 B2 | 12/2014 | Gandyra |
| 8,931,182 B2 | 1/2015 | Raab et al. |
| 8,942,940 B2 | 1/2015 | York |
| 8,965,571 B2 | 2/2015 | Peters et al. |
| 8,996,244 B2 | 3/2015 | Summer et al. |
| 8,997,362 B2 | 4/2015 | Briggs et al. |
| 9,020,240 B2 | 4/2015 | Pettersson et al. |
| 9,028,908 B1 | 5/2015 | DeTar |
| 9,033,998 B1 | 5/2015 | Schaible et al. |
| RE45,565 E | 6/2015 | Bridges et al. |
| 9,046,360 B2 | 6/2015 | Atwell et al. |
| 9,074,381 B1 | 7/2015 | Drew |
| 9,109,877 B2 | 8/2015 | Thierman |
| 9,146,315 B2 | 9/2015 | Bosse et al. |
| 9,151,830 B2 | 10/2015 | Bridges |
| 9,163,922 B2 | 10/2015 | Bridges et al. |
| 9,170,096 B2 | 10/2015 | Fowler et al. |
| 9,188,430 B2 | 11/2015 | Atwell et al. |
| 9,207,309 B2 | 12/2015 | Bridges |
| 9,223,025 B2 | 12/2015 | Debrunner et al. |
| 9,229,108 B2 | 1/2016 | Debrunner et al. |
| 9,266,238 B2 | 2/2016 | Huettenhofer |
| 9,267,784 B2 | 2/2016 | Atwell et al. |
| 9,278,448 B2 | 3/2016 | Freeman |
| 9,279,661 B2 | 3/2016 | Tateno et al. |
| 9,303,988 B2 | 4/2016 | Tani |
| 9,353,519 B2 | 5/2016 | Williams |
| 9,354,051 B2 | 5/2016 | Dunne et al. |
| 9,358,688 B2 | 6/2016 | Drew |
| 9,367,741 B2 | 6/2016 | Le Marec |
| 9,377,301 B2 | 6/2016 | Neier et al. |
| 9,383,200 B2 | 7/2016 | Hulm et al. |
| 9,395,174 B2 | 7/2016 | Bridges |
| 9,405,293 B2 | 8/2016 | Meuleau |
| 9,423,282 B2 | 8/2016 | Moy |
| 9,437,005 B2 | 9/2016 | Tateno et al. |
| 9,443,308 B2 | 9/2016 | Pettersson et al. |
| 9,452,533 B2 | 9/2016 | Calkins et al. |
| 9,454,818 B2 | 9/2016 | Cramer |
| 9,476,695 B2 | 10/2016 | Becker et al. |
| 9,481,007 B2 | 11/2016 | Rzonca |
| 9,482,524 B2 | 11/2016 | Metzler et al. |
| 9,482,525 B2 | 11/2016 | Bridges |
| 9,482,746 B2 | 11/2016 | Bridges |
| 9,494,686 B2 | 11/2016 | Maryfield et al. |
| 9,513,100 B2 | 12/2016 | Raab et al. |
| 9,536,163 B2 | 1/2017 | Veeser et al. |
| 9,541,371 B2 | 1/2017 | Pettersson et al. |
| 9,561,019 B2 | 2/2017 | Mihailescu et al. |
| 9,607,239 B2 | 3/2017 | Bridges et al. |
| 9,618,620 B2 | 4/2017 | Zweigle et al. |
| 9,658,061 B2 | 5/2017 | Wilson et al. |
| 9,671,221 B2 | 6/2017 | Ruhland et al. |
| 9,679,385 B2 | 6/2017 | Suzuki et al. |
| 9,686,532 B2 | 6/2017 | Tohme |
| 9,708,079 B2 | 7/2017 | Desjardien et al. |
| 9,715,730 B2 | 7/2017 | Suzuki |
| 9,720,087 B2 | 8/2017 | Christen et al. |
| 9,734,609 B2 | 8/2017 | Pulla et al. |
| 9,739,595 B2 | 8/2017 | Lau |
| 9,746,308 B2 | 8/2017 | Gong |
| 9,757,859 B1 | 9/2017 | Kolb et al. |
| 9,768,837 B2 | 9/2017 | Charvat et al. |
| 9,772,173 B2 | 9/2017 | Atwell et al. |
| 9,803,969 B2 | 10/2017 | Gong |
| 9,816,813 B2 | 11/2017 | Lettau et al. |
| 9,829,305 B2 | 11/2017 | Gong |
| 9,835,717 B2 | 12/2017 | Bosse et al. |
| 9,844,792 B2 | 12/2017 | Pettersson et al. |
| 9,879,976 B2 | 1/2018 | Bridges et al. |
| 9,897,442 B2 | 2/2018 | Pettersson et al. |
| 9,903,939 B2 | 2/2018 | Charvat et al. |
| 9,909,855 B2 | 3/2018 | Becker et al. |
| 9,915,733 B2 | 3/2018 | Fried et al. |
| 9,921,046 B2 | 3/2018 | Gong |
| 9,958,268 B2 | 5/2018 | Ohtomo et al. |
| 9,958,545 B2 | 5/2018 | Eichenholz et al. |
| 9,964,398 B2 | 5/2018 | Becker et al. |
| 9,964,402 B2 | 5/2018 | Tohme et al. |
| 9,967,545 B2 | 5/2018 | Tohme |
| 9,989,353 B2 | 6/2018 | Bartmann et al. |
| 10,012,732 B2 | 7/2018 | Eichenholz et al. |
| 10,030,972 B2 | 7/2018 | Iseli et al. |
| 10,041,793 B2 | 8/2018 | Metzler et al. |
| 10,054,422 B2 | 8/2018 | Böckem et al. |
| 10,058,394 B2 | 8/2018 | Johnson et al. |
| 10,073,162 B2 | 9/2018 | Charvat et al. |
| 10,074,889 B2 | 9/2018 | Charvat et al. |
| 10,082,521 B2 | 9/2018 | Atlas et al. |
| 10,090,944 B1 | 10/2018 | Charvat et al. |
| 10,094,909 B2 | 10/2018 | Charvat et al. |
| 10,126,415 B2 | 11/2018 | Becker et al. |
| 10,189,176 B2 | 1/2019 | Williams |
| 10,220,511 B2 | 3/2019 | Linnell et al. |
| 10,240,949 B2 | 3/2019 | Peters et al. |
| 10,315,904 B2 | 6/2019 | Landler |
| 10,635,758 B2 * | 4/2020 | Pivac .................. B25J 9/1651 |
| 10,865,578 B2 | 12/2020 | Pivac et al. |
| 10,876,308 B2 | 12/2020 | Pivac et al. |
| 11,106,836 B2 | 8/2021 | Pivac et al. |
| 11,401,115 B2 | 8/2022 | Pivac et al. |
| 2002/0030145 A1 | 3/2002 | Lang |
| 2002/0176603 A1 | 11/2002 | Bauer et al. |
| 2003/0048459 A1 | 3/2003 | Gooch |
| 2003/0090682 A1 | 5/2003 | Gooch et al. |

(56) References Cited

U.S. PATENT DOCUMENTS

| | | |
|---|---|---|
| 2003/0120377 A1 | 6/2003 | Hooke et al. |
| 2003/0206285 A1 | 11/2003 | Lau |
| 2004/0078137 A1 | 4/2004 | Breakfield et al. |
| 2004/0093119 A1 | 5/2004 | Gunnarsson et al. |
| 2004/0200947 A1 | 10/2004 | Lau |
| 2005/0007450 A1 | 1/2005 | Hill et al. |
| 2005/0057745 A1 | 3/2005 | Bontje |
| 2005/0060092 A1 | 3/2005 | Hablani |
| 2005/0086901 A1 | 4/2005 | Chisholm |
| 2005/0131619 A1 | 6/2005 | Rappaport et al. |
| 2005/0196484 A1 | 9/2005 | Khoshnevis |
| 2005/0252118 A1 | 11/2005 | Matsufuji |
| 2006/0167587 A1 | 7/2006 | Read |
| 2006/0215179 A1 | 9/2006 | Mcmurtry et al. |
| 2007/0024870 A1 | 2/2007 | Girard et al. |
| 2007/0229802 A1 | 10/2007 | Lau |
| 2007/0284215 A1 | 12/2007 | Rudge |
| 2008/0030855 A1 | 2/2008 | Lau |
| 2008/0189046 A1 | 8/2008 | Eliasson et al. |
| 2009/0038258 A1 | 2/2009 | Pivac et al. |
| 2009/0074979 A1 | 3/2009 | Krogedal et al. |
| 2010/0025349 A1 | 2/2010 | Khoshnevis |
| 2010/0138185 A1 | 6/2010 | Kang |
| 2010/0274390 A1 | 10/2010 | Walser et al. |
| 2010/0281822 A1 | 11/2010 | Murray |
| 2011/0066393 A1 | 3/2011 | Groll et al. |
| 2011/0153524 A1 | 6/2011 | Schnackel |
| 2011/0208347 A1 | 8/2011 | Otake et al. |
| 2012/0038074 A1 | 2/2012 | Khoshnevis |
| 2012/0099096 A1 | 4/2012 | Bridges et al. |
| 2012/0136524 A1 | 5/2012 | Everett et al. |
| 2012/0265391 A1 | 10/2012 | Letsky |
| 2012/0277898 A1 | 11/2012 | Kawai et al. |
| 2013/0028478 A1 | 1/2013 | St-pierre et al. |
| 2013/0068061 A1 | 3/2013 | Yoon |
| 2013/0103192 A1 | 4/2013 | Huettenhofer |
| 2013/0104407 A1 | 5/2013 | Lee |
| 2013/0222816 A1 | 8/2013 | Briggs et al. |
| 2013/0250285 A1 | 9/2013 | Bridges et al. |
| 2013/0286196 A1 | 10/2013 | Atwell |
| 2014/0002608 A1 | 1/2014 | Atwell et al. |
| 2014/0067121 A1 | 3/2014 | Brooks et al. |
| 2014/0076923 A1 | 3/2014 | Clark |
| 2014/0176677 A1 | 6/2014 | Valkenburg et al. |
| 2014/0192187 A1 | 7/2014 | Atwell et al. |
| 2014/0309960 A1 | 10/2014 | Vennegeerts et al. |
| 2014/0343727 A1 | 11/2014 | Calkins et al. |
| 2014/0348388 A1 | 11/2014 | Metzler et al. |
| 2014/0366481 A1 | 12/2014 | Benson |
| 2015/0082740 A1 | 3/2015 | Peters et al. |
| 2015/0100066 A1 | 4/2015 | Kostrzewski et al. |
| 2015/0134303 A1 | 5/2015 | Chang et al. |
| 2015/0153720 A1 | 6/2015 | Pettersson et al. |
| 2015/0158181 A1 | 6/2015 | Kawamura et al. |
| 2015/0241203 A1 | 8/2015 | Jordil et al. |
| 2015/0258694 A1 | 9/2015 | Hand et al. |
| 2015/0276402 A1 | 10/2015 | Grsser et al. |
| 2015/0280829 A1 | 10/2015 | Breuer |
| 2015/0293596 A1 | 10/2015 | Krausen et al. |
| 2015/0309175 A1 | 10/2015 | Hinderling et al. |
| 2015/0314890 A1 | 11/2015 | Desjardien et al. |
| 2015/0352721 A1 | 12/2015 | Wicks et al. |
| 2015/0355310 A1 | 12/2015 | Gong et al. |
| 2015/0367509 A1 | 12/2015 | Georgeson |
| 2015/0371082 A1 | 12/2015 | Csaszar et al. |
| 2015/0377606 A1 | 12/2015 | Thielemans |
| 2016/0005185 A1 | 1/2016 | Geissler |
| 2016/0093099 A1 | 3/2016 | Bridges |
| 2016/0153786 A1 | 6/2016 | Liu et al. |
| 2016/0187130 A1 | 6/2016 | Metzler et al. |
| 2016/0187470 A1 | 6/2016 | Becker et al. |
| 2016/0223364 A1 | 8/2016 | Peters et al. |
| 2016/0242744 A1 | 8/2016 | Mihailescu et al. |
| 2016/0263767 A1 | 9/2016 | Williams |
| 2016/0274237 A1 | 9/2016 | Stutz |
| 2016/0282107 A1 | 9/2016 | Roland et al. |
| 2016/0282110 A1 | 9/2016 | Vagman et al. |
| 2016/0282179 A1 | 9/2016 | Nazemi et al. |
| 2016/0288331 A1 | 10/2016 | Sivich et al. |
| 2016/0313114 A1 | 10/2016 | Tohme et al. |
| 2016/0327383 A1 | 11/2016 | Becker et al. |
| 2016/0340873 A1 | 11/2016 | Eidenberger et al. |
| 2016/0341041 A1 | 11/2016 | Puura et al. |
| 2016/0349746 A1 | 12/2016 | Grau |
| 2016/0363436 A1 | 12/2016 | Clark et al. |
| 2016/0363659 A1 | 12/2016 | Mindell et al. |
| 2016/0363663 A1 | 12/2016 | Mindell et al. |
| 2016/0363664 A1 | 12/2016 | Mindell et al. |
| 2016/0364869 A1 | 12/2016 | Siercks et al. |
| 2016/0364874 A1 | 12/2016 | Tohme et al. |
| 2017/0066157 A1 | 3/2017 | Peters et al. |
| 2017/0067739 A1 | 3/2017 | Siercks et al. |
| 2017/0082436 A1 | 3/2017 | Siercks et al. |
| 2017/0091922 A1 | 3/2017 | Siercks et al. |
| 2017/0091923 A1 | 3/2017 | Siercks et al. |
| 2017/0108528 A1 | 4/2017 | Atlas et al. |
| 2017/0122733 A1 | 5/2017 | Brown |
| 2017/0122736 A1 | 5/2017 | Dold et al. |
| 2017/0166399 A1 | 6/2017 | Stubbs |
| 2017/0173796 A1 | 6/2017 | Kim et al. |
| 2017/0176572 A1 | 6/2017 | Charvat et al. |
| 2017/0179570 A1 | 6/2017 | Charvat |
| 2017/0179603 A1 | 6/2017 | Charvat et al. |
| 2017/0191822 A1 | 7/2017 | Becker et al. |
| 2017/0227355 A1 | 8/2017 | Pettersson et al. |
| 2017/0236299 A1 | 8/2017 | Valkenburg et al. |
| 2017/0254102 A1 | 9/2017 | Peters et al. |
| 2017/0269203 A1 | 9/2017 | Trishaun |
| 2017/0307757 A1 | 10/2017 | Hinderling et al. |
| 2017/0314909 A1 | 11/2017 | Dang |
| 2017/0314918 A1 | 11/2017 | Shah |
| 2017/0333137 A1 | 11/2017 | Roessler |
| 2017/0343336 A1 | 11/2017 | Lettau |
| 2018/0003493 A1 | 1/2018 | Bernhard et al. |
| 2018/0017384 A1 | 1/2018 | Siercks et al. |
| 2018/0023935 A1 | 1/2018 | Atwell et al. |
| 2018/0038684 A1 | 2/2018 | Fröhlich et al. |
| 2018/0046096 A1 | 2/2018 | Shibazaki |
| 2018/0052233 A1 | 2/2018 | Frank et al. |
| 2018/0108178 A1 | 4/2018 | Murugappan et al. |
| 2018/0121571 A1 | 5/2018 | Tiwari et al. |
| 2018/0149469 A1 | 5/2018 | Becker et al. |
| 2018/0156601 A1 | 6/2018 | Pontai |
| 2018/0170719 A1 | 6/2018 | Tasch et al. |
| 2018/0180416 A1 | 6/2018 | Edelman et al. |
| 2018/0202796 A1 | 7/2018 | Ziegenbein |
| 2018/0209156 A1 | 7/2018 | Pettersson |
| 2018/0239010 A1 | 8/2018 | Mindell et al. |
| 2018/0300433 A1 | 10/2018 | Maxam et al. |
| 2019/0026401 A1 | 1/2019 | Benjamin et al. |
| 2019/0032348 A1 | 1/2019 | Parkes |
| 2019/0184555 A1 | 6/2019 | Linnell et al. |
| 2019/0224846 A1 | 7/2019 | Pivac et al. |
| 2019/0251210 A1 | 8/2019 | Pivac et al. |
| 2019/0316369 A1* | 10/2019 | Pivac .................... E04G 21/22 |
| 2020/0173777 A1 | 6/2020 | Pivac et al. |
| 2020/0206923 A1 | 7/2020 | Pivac et al. |
| 2020/0206924 A1 | 7/2020 | Pivac et al. |
| 2020/0215688 A1 | 7/2020 | Pivac et al. |
| 2020/0215692 A1 | 7/2020 | Pivac et al. |
| 2020/0215693 A1 | 7/2020 | Pivac et al. |
| 2021/0016437 A1 | 1/2021 | Pivac et al. |
| 2021/0016438 A1 | 1/2021 | Pivac et al. |
| 2021/0080582 A1 | 3/2021 | Pivac et al. |
| 2021/0291362 A1 | 9/2021 | Pivac et al. |
| 2021/0370509 A1 | 12/2021 | Pivac et al. |
| 2021/0379775 A1 | 12/2021 | Pivac et al. |
| 2022/0058300 A1 | 2/2022 | Pivac et al. |
| 2024/0328180 A1 | 10/2024 | Pickering |

FOREIGN PATENT DOCUMENTS

| | | |
|---|---|---|
| CN | 2730976 Y | 10/2005 |
| CN | 2902981 Y | 5/2007 |

(56) References Cited

FOREIGN PATENT DOCUMENTS

| | | |
|---|---|---|
| CN | 2923903 Y | 7/2007 |
| CN | 101100903 A | 1/2008 |
| CN | 201184054 Y | 1/2009 |
| CN | 101360873 B | 2/2009 |
| CN | 101476883 A | 7/2009 |
| CN | 100557169 C | 11/2009 |
| CN | 101694130 A | 4/2010 |
| CN | 201972413 U | 9/2011 |
| CN | 102359282 A | 2/2012 |
| CN | 202248944 U | 5/2012 |
| CN | 202292752 U | 7/2012 |
| CN | 102995911 A | 3/2013 |
| CN | 202925913 U | 5/2013 |
| CN | 103363902 A | 10/2013 |
| CN | 103698769 A | 4/2014 |
| CN | 203701626 U | 7/2014 |
| CN | 104141391 B2 | 11/2014 |
| CN | 104153591 A | 11/2014 |
| CN | 104493810 A | 4/2015 |
| CN | 204295678 U | 4/2015 |
| CN | 104612411 A | 5/2015 |
| CN | 204311767 U | 5/2015 |
| CN | 103774859 B | 11/2015 |
| CN | 103753586 B | 12/2015 |
| CN | 105113373 A | 12/2015 |
| CN | 105178616 A | 12/2015 |
| CN | 105257008 B | 1/2016 |
| CN | 105544998 A | 5/2016 |
| CN | 205290958 U | 6/2016 |
| CN | 104806028 B | 11/2016 |
| CN | 205668271 U | 11/2016 |
| CN | 205840368 U | 12/2016 |
| CN | 205990775 U | 3/2017 |
| CN | 206185879 U | 5/2017 |
| CN | 206189878 U | 5/2017 |
| CN | 105089274 B | 6/2017 |
| CN | 105064699 B | 7/2017 |
| CN | 107217859 A | 9/2017 |
| CN | 107237483 A | 10/2017 |
| CN | 107357294 A | 11/2017 |
| CN | 107605167 A | 1/2018 |
| CN | 206838382 U | 1/2018 |
| CN | 206844687 U | 1/2018 |
| CN | 107654077 A | 2/2018 |
| CN | 107675891 A | 2/2018 |
| CN | 107740591 A | 2/2018 |
| CN | 106088632 B | 3/2018 |
| CN | 107762165 A | 3/2018 |
| CN | 207063553 U | 3/2018 |
| CN | 106088631 B | 5/2018 |
| CN | 107975245 A | 5/2018 |
| CN | 108061551 A | 5/2018 |
| CN | 108222527 A | 6/2018 |
| CN | 108301628 A | 7/2018 |
| CN | 108331362 A | 7/2018 |
| CN | 106150109 B | 8/2018 |
| CN | 108396977 A | 8/2018 |
| CN | 108457479 A | 8/2018 |
| CN | 108708560 A | 10/2018 |
| CN | 208023979 U | 10/2018 |
| CN | 106881711 A | 4/2019 |
| CN | 107083845 A | 6/2019 |
| CN | 108016585 B | 7/2019 |
| CN | 209701519 U | 11/2019 |
| DE | 3430915 C2 | 3/1986 |
| DE | 4038260 C2 | 6/1991 |
| DE | 4207384 A1 | 9/1993 |
| DE | 19509809 A1 | 10/1995 |
| DE | 4417928 A1 | 11/1995 |
| DE | 29601535 U1 | 5/1997 |
| DE | 19600006 A1 | 7/1997 |
| DE | 19603234 C2 | 9/1997 |
| DE | 19743717 C2 | 4/1999 |
| DE | 19849720 A1 | 5/2000 |
| DE | 10230021 C1 | 7/2003 |
| DE | 102006030130 B3 | 9/2007 |
| DE | 102009018070 A1 | 10/2010 |
| DE | 102009042014 A1 | 3/2011 |
| DE | 202012100646 U1 | 6/2013 |
| DE | 102013019869 A1 | 5/2015 |
| EP | 190076 A1 | 8/1986 |
| EP | 370682 A2 | 5/1990 |
| EP | 456020 A1 | 1/1995 |
| EP | 493020 B1 | 4/1995 |
| EP | 495525 B1 | 4/1995 |
| EP | 836664 B1 | 1/1999 |
| EP | 674069 B1 | 12/1999 |
| EP | 1918478 A2 | 5/2008 |
| EP | 2112291 A1 | 10/2009 |
| EP | 2219528 A1 | 8/2010 |
| EP | 2249997 A1 | 11/2010 |
| EP | 2353801 A2 | 8/2011 |
| EP | 2199719 B1 | 10/2014 |
| EP | 3084719 A1 | 10/2016 |
| ES | 2296556 A1 | 4/2008 |
| FR | 2230825 A1 | 12/1974 |
| FR | 2524522 A1 | 10/1983 |
| GB | 119331 A | 10/1918 |
| GB | 2198105 A | 5/1923 |
| GB | 673472 A | 6/1952 |
| GB | 682010 A | 11/1952 |
| GB | 839253 A | 6/1960 |
| GB | 1067604 A | 5/1967 |
| GB | 1465068 A | 2/1977 |
| GB | 2268536 A | 1/1994 |
| GB | 125079 | 12/2001 |
| GB | 2422400 A | 7/2006 |
| JP | 64006719 A | 1/1989 |
| JP | H07101509 A | 11/1999 |
| JP | 2000127077 A | 5/2000 |
| JP | 2005283600 A | 10/2005 |
| JP | 4294990 B2 | 4/2009 |
| JP | 2009521630 A | 6/2009 |
| JP | 5508895 B2 | 3/2014 |
| LU | 87054 A1 | 6/1989 |
| LU | 87381 A1 | 6/1990 |
| LU | 88144 A1 | 4/1994 |
| RU | 85392 U1 | 8/2009 |
| WO | 9702397 A1 | 1/1997 |
| WO | 2001076830 A1 | 10/2001 |
| WO | 2004020760 A1 | 3/2004 |
| WO | 2004083540 A3 | 9/2004 |
| WO | 2005014240 A1 | 2/2005 |
| WO | 2005017550 A2 | 2/2005 |
| WO | 2005070657 A1 | 8/2005 |
| WO | 2004011734 A1 | 11/2005 |
| WO | 2006111827 A1 | 10/2006 |
| WO | 2007076581 A1 | 7/2007 |
| WO | 2008124713 A2 | 10/2008 |
| WO | 2009026641 A1 | 3/2009 |
| WO | 2009026642 A1 | 3/2009 |
| WO | 2009044002 A1 | 4/2009 |
| WO | 2010020457 A1 | 2/2010 |
| WO | 2011077006 A2 | 6/2011 |
| WO | 2013088154 A1 | 6/2013 |
| WO | 2013134559 A1 | 9/2013 |
| WO | 2017162630 A1 | 9/2017 |
| WO | 2018009978 A1 | 1/2018 |
| WO | 2018009980 A1 | 1/2018 |
| WO | 2018009985 A1 | 1/2018 |
| WO | 2018009986 A1 | 1/2018 |
| WO | WO-2018009981 A1 * | 1/2018 ............ B25J 13/089 |
| WO | 2018052469 A3 | 4/2018 |
| WO | 2018099323 A1 | 6/2018 |
| WO | 2019006511 A1 | 1/2019 |
| WO | 2019014701 A1 | 1/2019 |
| WO | 2019014702 A1 | 1/2019 |
| WO | 2019014705 A1 | 1/2019 |
| WO | 2019014706 A1 | 1/2019 |
| WO | 2019014707 A1 | 1/2019 |
| WO | 2019033165 A1 | 2/2019 |
| WO | 2019033166 A1 | 2/2019 |
| WO | 2019033170 A1 | 2/2019 |
| WO | 2019068128 A1 | 4/2019 |

(56) References Cited

FOREIGN PATENT DOCUMENTS

| WO | 2019071313 A1 | 4/2019 |
|---|---|---|
| WO | 2020014737 A1 | 1/2020 |
| WO | 2020047574 A1 | 3/2020 |
| WO | 2020136563 A2 | 7/2020 |
| WO | 2020210863 A1 | 10/2020 |

OTHER PUBLICATIONS

Examination report dated Sep. 30, 2023 on UAE Patent Application No. P60005242020.
Examination report issued Mar. 31, 2023 on Saudi Arabian Patent Application No. 522440994.
Boston Dynamics: "Introducing Spot (previously SpotMini)", Jun. 28, 2016, YouTube video, 1 page (screenshot of video); video retrieved at <https://www.youtube.com/watch?v=tf7IEVTDjng>.
Delgado, R. et al.: "Development and Control of an Omnidirectional Mobile Robot on an EtherCAT Network", International Journal of Applied Engineering Research, vol. 11, No. 21, 2016, pp. 10586-10592, XP055574484 *.
Dorfler, K. et al.: "Mobile Robotic Brickwork ', Automation of a Discrete Robotic Fabrication Process Using an Autonomous Mobile Robot Robotic Fabrication in Architecture", Art and Design 2016, Feb. 4, 2016 (Feb. 4, 2016), pp. 204-217, XP055567451 *.
Egerstedt, M. et al.: "Control of Mobile Platforms using a Virtual Vehicle Approach", IEEE Transactions on Automatic Control, vol. 46, No. 11, Nov. 2001 (Nov. 1, 2001), XP055567515 *.
Examination Report mailed Apr. 18, 2021 in GCC Patent Application No. 2018-35644, 5 pages.
Examination Report mailed Apr. 30, 2021 in GCC Patent Application No. 2018-35643, 3 pages.
Examination Report mailed Jun. 29, 2021 for India Patent Application No. 201927004006, 6 pages.
Examination Report mailed Sep. 30, 2021 for Australian Patent Application No. 2017295316, 3 pages.
Extended European Search Report mailed Jun. 4, 2021 for European Patent Application No. 18865644.1, 7 pages.
Extended European Search Report mailed Mar. 16, 2021 for European Patent Application No. 18834565.6, 19 pages.
Extended European Search Report mailed Mar. 17, 2021 for European Patent Application No. 18835861.8, 12 pages.
Extended European Search Report mailed Mar. 18, 2021 for European Patent Application No. 18834673.8, 14 pages.
Extended European Search Report mailed Mar. 18, 2021 for European Patent Application No. 18834893.2, 12 pages.
Extended European Search Report mailed Mar. 18, 2021 for European Patent Application No. 18835737.0, 10 pages.
Extended European Search Report mailed Mar. 30, 2021 for European Patent Application No. 18845794.9, 13 pages.
Extended European Search Report mailed Mar. 5, 2021 for European Patent Application No. 18828425.1, 7 pages.
Fastbrick Robotics, Fastbrick Robotics: Hadrian 105 First Look Revealed, Nov. 16, 2015 (Nov. 16, 2015), XP054978174, Retrieved from the Internet <URL:https://www.youtube.com/watch?v=7Zw7qHxMtrY> [retrieved on Nov. 16, 2015] *.
Fastbrick Robotics: Hadrian 105 Demonstrative Model Animation, Jun. 29, 2015 (Jun. 29, 2015), XP054979424, Retrieved from the Internet <URL:https://www.youtube.com/watch?v=Rebqcsb61gY> [retrieved on Mar. 7, 2018] *.
Fastbrick Robotics: Hadrian 105 Time Lapse, Fastbrick Robotics Time Lapse, May 22, 2016 (May 22, 2016), XP054978173, Retrieved from the Internet <URL:https://www.youtube.com/watch?v=4YcrO8ONcfY> [retrieved on May 22, 2016] *.
Fastbrick Robotics: Hadrian X Digital Construction System, published on Sep. 21, 2016 <URL: https://www.youtube.com/watch?v=5bW1vuCgEaA >.
Feng, C. et al.: "Vision Guided Autonomous Robotic Assembly and as-built Scanning on Unstructured Construction Sites", Automation in Construction, vol. 59, Nov. 2015 (Nov. 1, 2015), pp. 128-138, XP055567454 *.
Gander H et al: "Application of a floating point digital signal processor to a dynamic robot measurement system", Instrumentation and Measurement Technology Conference, 1994. IMTC/94. Conference Proceedings. $10^{th}$ Anniversary. Advanced Technologies in I & M., 1994 IEEE Hamamatsu, Japan May 10-12, 1994, New York, NY, USA, IEEE, May 10, 1994 (May 10, 1994), pp. 372-375, XP010121924, DOI: 10.1109/IMTC.1994.352046, ISBN: 978-0-7803-1880-9, *whole document*.
Gao, X. et al.: "Complete Solution Classification for the Perspective-Three-Point Problem", IEEE Transactions on Pattern Analysis and Machine Intelligence, vol. 25, No. 8, Aug. 2003 (Aug. 1, 2003), pp. 930-943, XP011099374 *.
Garrido, S. et al., "FM2: A real-time fast marching sensor based motion planner", Advanced Intelliget Mechatronics, 2007 IEEE/ASME International Conference on, IEEE, PI, Sep. 1, 2007 (Sep. 1, 2007), pp. 1-6.
Giftthaler, M. et al., "Efficient Kinematic Planning for Mobile Manipulators with Non-holonomic Constraints Using Optimal Control", 2017 IEEE International Conference on Robotics and Automation (ICRA), Singapore, May 29-Jun. 3, 2017.
Heintze, H., "Design and Control of a Hydraulically Actuated Industrial Brick Laying Robot," 264 pages.
Heintze, J. et al., "Controlled hydraulics for a direct drive brick laying robot," Automation in Construction 5 (1996), pp. 23-29.
Helm, V. et al.: "Mobile Robotic Fabrication on Construction Sites: dimRob", IEEE /RSJ International Conference on Intelligent Robots and Systems, Oct. 7, 2012 (Oct. 7, 2012), Vilamoura, Portugal, pp. 4335-4341, XP032287463 *.
http://www.new-technologies.org/ECT/Other/brickrob.htm. "Emerging Construction Technologies." Dec. 1, 2006.
Huang, S. et al., "Applying High-Speed Vision Sensing to an Industrial Robot for High-Performance Position Regulation under Uncertainties," Sensors, 2016, 16, 1195, 15 pages.
International Search Report and Written Opinion for International Application No. PCT/AU2021/050732; Date of Mailing: Sep. 21, 2021; 10 pages.
International Preliminary Report on Patentability for International Application No. PCT/AU2017/050731; Date of Mailing: Jan. 15, 2019; 5 pages.
International Preliminary Report on Patentability for International Application No. PCT/AU2017/050738; Date of Mailing: Jan. 15, 2019; 13 pages.
International Preliminary Report on Patentability for International Application No. PCT/AU2017/050739; Date of Mailing: Jan. 15, 2019; 6 pages.
International Preliminary Report on Patentability for International Application No. PCT/AU2018/050733; Date of Mailing: Jan. 21, 2020; 6 pages.
International Preliminary Report on Patentability for International Application No. PCT/AU2018/050734; Date of Mailing: Jan. 21, 2020; 9 pages.
International Preliminary Report on Patentability for International Application No. PCT/AU2018/050737; Date of Mailing: Jan. 21, 2020; 6 pages.
International Preliminary Report on Patentability for International Application No. PCT/AU2018/050739; Date of Mailing: Jan. 21, 2020; 6 pages.
International Preliminary Report on Patentability for International Application No. PCT/AU2018/050740; Date of Mailing: Jan. 21, 2020; 6 pages.
International Search Report and Written Opinion for International Application No. PCT/AU2017/050730; Date of Mailing: Aug. 23, 2017; 17 pages.
International Search Report and Written Opinion for International Application No. PCT/AU2017/050731; Date of Mailing: Aug. 31, 2017; 8 pages.
International Search Report and Written Opinion for International Application No. PCT/AU2017/050738; Date of Mailing: Oct. 17, 2017; 19 pages.
International Search Report and Written Opinion for International Application No. PCT/AU2017/050739; Date of Mailing: Sep. 28, 2017; 9 pages.

(56) References Cited

OTHER PUBLICATIONS

International Search Report and Written Opinion for International Patent Application No. PCT/AU19/50742; Date of Mailing Sep. 23, 2019; 5 pages.
International Search Report and Written Opinion for International Patent Application No. PCT/AU19/50743; Date of Mailing mailed Oct. 1, 2019; 10 pages.
International Search Report and Written Opinion for International Patent Application No. PCT/AU20/50367; Date of Mailing Jun. 29, 2020; 15 pages.
International Search Report and Written Opinion for International Patent Application No. PCT/AU20/50368; Date of Mailing Jun. 25, 2020; 11 pages.
Kazemi, M. et al.: "Path Planning for Image-based Control of Wheeled Mobile Manipulators", 2012 IEEE /RSJ International Conference on Intelligent Robots and Systems, Oct. 7, 2012 (Oct. 7, 2012), Vilamoura, Portugal, XP055567470 *.
Kleinigger, M. et al.: "Application of 6-DOF sensing for robotic disturbance compensation", Automation Science and Engineering (CASE), 2010 IEEE Conference on, IEEE, Piscataway, NJ, USA, Aug. 21, 2010 (Aug. 21, 2010, pp. 344-349, XP031762876, ISBN: 978-1-4244-5477-1, *abstract*, *sections 1 to 3*.
Kleinkes, M. et al.: "Laser Tracker and 6DoF measurement strategies in industrial robot applications", CMSC 2011: Coordinate Metrology System Conference, Jul. 25, 2011 (Jul. 25, 2011), XP055456272 *.
Koren et al.: "End-effector guidance of robot arms", CIRP Annals—Manufacturing Technology, vol. 36, No. 1, 1987, pp. 289-292, XP055456270 *.
Kwon, S. et al., "On the Coarse/Fine Dual-Stage Manipulators with Robust Perturbation Compensator," IEEE, May 21-26, 2001, pp. 121-126.
Kyle in CMSC: Charlotte-Concord, Jul. 21-25, 2008.
Latteur, et al., "Drone-Based Additive Manufacturing of Architectural Structures," IASS Symposium 2015, Amsterdam, The Netherlands; Aug. 17-20, 2015; 12 pages.
Lippiello, V. et al.: "Position-Based Visual Servoing in Industrial Multirobot Cells Using a Hybrid Camera Configuration", IEEE Transactions on Robotics, vol. 23, No. 1, Feb. 2007 (Feb. 1, 2007), XP011163518 *.
Liu, Z. et al.: "EtherCAT Based Robot Modular Joint Controller", Proceeding of the 2015 IEEE International Conference on Information and Automation, Aug. 2015 (Aug. 1, 2015), Lijiang, China, pp. 1708-1713, XP033222650 *.
Mercedes-Benz: "Mercedes-Benz "Chicken" Magic Body Control TV commercial", YouTube, Sep. 23, 2013, 1 page. Retreived from the internet: <https://www.youtube.com/watch?v+nLwML2PagbY>.
Notice of Acceptance of Patent Application received for priority Australian Patent Application No. 2017294796, mailed May 15, 2019 (158 pages).
Office Action mailed Apr. 21, 2021 in Japanese Patent Application No. 2019-523148, 4 pages.
Office Action mailed Aug. 20, 2021 for Japanese Patent Application No. 2019-523147, 3 pages.
Office Action mailed Jul. 5, 2021 for Japanese Patent Application No. 2019-523145, 4 pages.
Office Action mailed May 24, 2021 for Chinese Patent Application No. 201880067520.0, 8 pages.
Office Action mailed Sep. 3, 2021 for Chinese Patent Application No. 201780056460.8, 9 pages.
Partial Supplementary European Search Report mailed Apr. 14, 2020 in European Patent Application No. 17826696.1, 10 pages.
Pless, R.: "Using Many Cameras as One", IEEE Computer Society Conference on Computer Vision and Pattern Recognition, Jun. 18, 2003 (Jun. 18, 2003), Madison , WI, USA, pp. 1-7, XP055564465 *.
Posada et al.: "High accurate robotic drilling with external sensor and compliance model-based compensation", Robotics and Automation (ICRA), 2016 IEEE International Conference, May 16, 2016 (May 16, 2016), pp. 3901-3907, XP032908649 *.
Pritschow, G. et al., "A Mobile Robot for On-Site Construction of Masonry," Inst. Of Control Tech. for Machine Tools and Manuf. Units, pp. 1701-1707.
Pritschow, G. et al., "Application Specific Realisation of a Mobile Robot for On-Site Construction of Masonry," Automation and Robotics in Construction XI, 1994, pp. 95-102.
Pritschow, G. et al., "Configurable Control System of a Mobile Robot for ON-Site Construction of Masonry," Inst. Of Control Technology for Machine Tools and Manuf. Units, pp. 85-92.
Pritschow, G. et al., "Technological aspects in the development of a mobile bricklaying robot," Automation in Construction 5 (1996), pp. 3-13.
Riegl Laser Measurement Systems. "Long Range & High Accuracy 3D Terrestrial Laser Scanner System—LMS-Z420i." pp. 1-4.
Salcudean, S. et al., "On the Control of Redundant Coarse-Fine Manipulators," IEEE, pp. 1834-1840.
Sandy, T. et al.: "Autonomous Repositioning and Localization of an In Situ Fabricator", 2016 IEEE International Conference on Robotics and Automation (ICRA), May 16, 2016 (May 16, 2016), pp. 2852-2858, XP055567467 *.
Siciliano, B. et al., "Robotics—chapters 2-4" Robotics, Dec. 31, 2009 (Dec. 31, 2009), Springer London, London, pp. 39-189.
Skibniewski, M.J., "Current Status of Construction Automation and Robotics in the United States of America," The 9th International Symposium on Automation and Robotics in Construction, Jun. 3-5, 1992, 8 pages.
Trimble ATS. "Advanced Tracking Sensor (ATS) with target recognition capability for stakeless machine control survey applications." pp. 1-4.
Vincze, M. et al., "A Laser Tracking System to Measure Position and Orientation of Robot End Effectors Under Motion," The International Journal of Robotics Research, vol. 13, No. 4, Aug. 1994, pp. 305-314.
Warszawski, A. et al., "Implementation of Robotics in Building: Current Status and Future Prospects," Journal of Construction Engineering and Management, Jan./Feb. 1998, 124(1), pp. 31-41.
Willmann, J. et al.: "Robotic Timber Construction—Expanding Additive Fabrication to New Dimensions", Automation in Construction, vol. 61, 2016, pp. 16-23, XP029310896 *.
Xu, H. et al.: "Uncalibrated Visual Servoing of Mobile Manipulators with an Eye-to-hand Camera", Proceedings of the 2016 IEEE International Conference on Robotics and Biomimetics, Dec. 3, 2016 (Dec. 3, 2016), Qingdao, China, pp. 2145-2150, XP033071767 *.
Yu, S.N. et al., "Feasibility verification of brick-laying robot using manipulation trajectory and the laying pattern optimization," Dept. of Mech. Eng., Automation in Construction (2009), pp. 644-655.
Zaki, T., "Parametric modeling of Blackwall assemblies for automated generation of shop drawings and detailed estimates using BIM", Master's Thesis, May 23, 2016, pp. 1-151.
Examination report dated Sep. 13, 2022 on Chinese Patent Application No. 201880066756.2, 11 pages.
IPRP dated Jan. 10, 2023 on International Patent Application No. PCT/AU2021/050732, 5 pages.
Examination Report dated Jul. 4, 2024 on European Patent Application No. 21837579.8.
International Preliminary Report on Patentability received for counterpart International Application No. PCT/AU2023/050325, mailed Oct. 31, 2024, 6 pages.
International Preliminary Report on Patentability received in International Patent Application No. PCT/AU2021/050361, mailed Oct. 25, 2022.

* cited by examiner

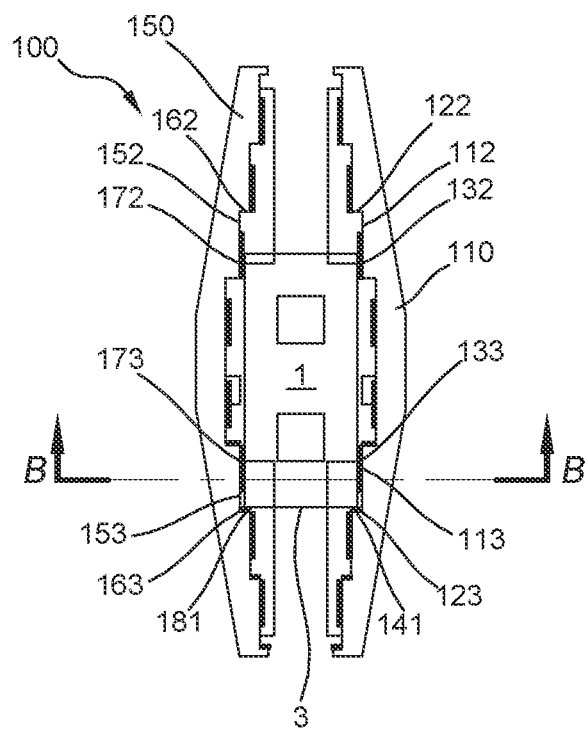
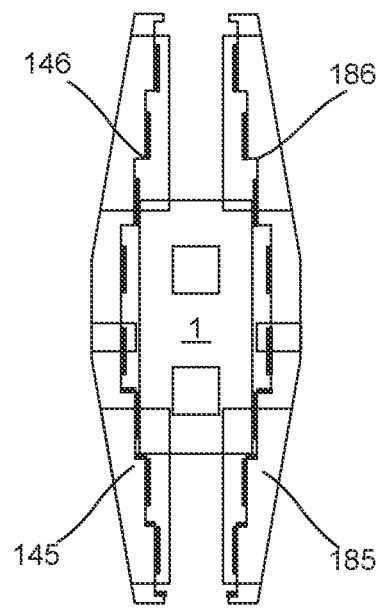
Fig. 4A  Fig. 4B
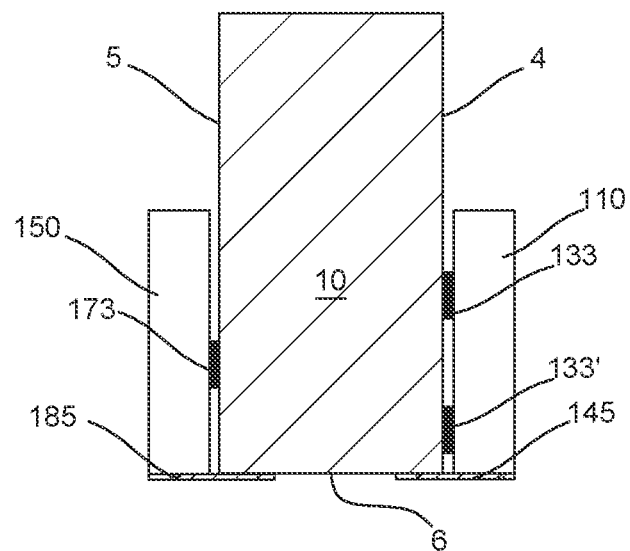
Fig. 4C

BLOCK TRANSFER APPARATUS AND IMPROVED CLAMPING ASSEMBLY FOR USE THEREWITH

CROSS-REFERENCE TO RELATED APPLICATIONS

The present application is a United States national phase entry of International Application No. PCT/AU2021/050361 titled "BLOCK TRANSFER APPARATUS AND IMPROVED CLAMPING ASSEMBLY FOR USE THEREWITH" and filed on April 22, 2022, which claims priority from Australian Provisional Application No. 2020901272 titled "BLOCK TRANSFER APPARATUS AND IMPROVED CLAMPING ASSEMBLY FOR USE THEREWITH" and filed on 22 Apr. 2020, the contents of which are hereby incorporated by reference in their entireties.

BACKGROUND OF THE INVENTION

The present invention relates to a block transfer apparatus and improved clamping assembly for use therewith. In one particular example, the block transfer apparatus and clamping assembly is suitable for use by a robotic block laying machine.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Autonomous and semi-autonomous industrial robotic equipment is increasingly being used in outside work environments such as on construction sites, building sites, mining sites, and industrial sites. For example, WO 2007/076581 describes an automated brick laying system for constructing a building from a plurality of bricks comprising a robot provided with a brick laying and adhesive applying head, a measuring system, and a controller that provides control data to the robot to lay the bricks at predetermined locations. The measuring system measures in real time the position of the head and produces position data for the controller. The controller produces control data on the basis of a comparison between the position data and a predetermined or pre-programmed position of the head to lay a brick at a predetermined position for the building under construction. The controller can control the robot to construct the building in a course by course manner where the bricks are laid sequentially at their respective predetermined positions and where a complete course of bricks for the entire building is laid prior to laying of the bricks for the next course.

In one example of a robotic construction robot developed by the applicant there is provided a telescoping articulated boom that is mounted on a truck, and a conveying system that transports bricks along the boom to an end effector known as the layhead, which lays the bricks at predetermined locations. When the brick arrives at the layhead via the boom, it is clamped while adhesive is applied and then it is rotated 180 degrees and presented for pickup by a robot arm that places the brick at a desired location, preferably with sub-mm accuracy. When a brick is laid, it is assumed that the brick is held in a certain pose with respect to the robot arm. In order for the robot arm to place a brick at the desired location, it must pick up the brick in the correct location from the clamp.

One problem is that the exact location of the brick with respect to the clamp in the layhead is not accurately known. It may be translated or rotated slightly away from an ideal pickup location of the robot arm. A camera-based vision system may be used to determine the exact 6 DOF location of the brick in space. However, this is a challenging task, as there are spatial constraints at the layhead to place cameras and sensors (without affecting the required functionality) and processing must be performed quickly (e.g. less than 2 seconds) to ensure rapid bricklaying. Further this task is made more difficult due to the varied range of outdoor conditions the robot is required to operate in—this includes temperatures ranging from 0-50° C., rain, dust, wind as well as full daylight, twilight and dark night lighting conditions. This places significant demands on the vision system for determining the location of the brick to enable precise placement of the brick.

There is thus a need to develop an improved system for clamping a brick or block such that its location with respect to the clamp is known without requiring vision-based processing techniques, or to at least provide a useful alternative to existing systems.

SUMMARY OF THE PRESENT INVENTION

In one broad form, an aspect of the present invention seeks to provide a block transfer apparatus for transferring a block between an upstream clamp of a block delivery system and a downstream clamp of the block delivery system, the block transfer apparatus including:
  a) a frame pivotally mounted to a support; and,
  b) a clamping assembly mounted to the frame and linearly extendable relative thereto, the clamping assembly including a pair of gripper jaws for clamping opposing sides of the block;
  wherein, the block transfer apparatus is configured to:
    i) receive a block from the upstream clamp, wherein the block is initially clamped in the gripper jaws in an approximate position;
    ii) rotate to a drop position whereby the gripper jaws release the block and allow it to self-datum onto first and second orthogonal datum surfaces to thereby register an end and top or bottom face of the block in corresponding first and second orthogonal planes;
    iii) re-clamp the block after the drop by applying a clamping force to opposing sides of the block so as to register the block against a third datum surface defining a third plane orthogonal to both the first and second planes to thereby datum the position of the block with respect to the clamping assembly; and,
    iv) present the block clamped in the datumed position for transfer to the downstream clamp.

In one embodiment, the first datum surface that registers an end of the block is provided as part of the clamping assembly at one of:
  a) a distal end of the gripper jaws; and,
  b) a proximal end of the gripper jaws to either the jaw or a jaw support structure.

In one embodiment, the second datum surface that registers a top or bottom surface of the block is at least one of:
  a) provided as part of the clamping assembly along an upper lengthwise extending edge of the gripper jaws; and, b) provided as part of the frame in the form of a lengthwise extending bar or plate mounted to the support that is parallel to the gripper jaws.

In one embodiment, the third datum surface is provided by a first of the two gripper jaws.

In one embodiment, the first gripper jaw has a pair of spaced apart first gripper pads rigidly attached to an inner surface of the jaw.

In one embodiment, the first gripper pads extend lengthwise along the first gripper jaw.

In one embodiment, a second of the two gripper jaws includes a plurality of second gripper pads attached to flexible finger members spaced apart along the length of the jaw that allow the pads to flex laterally and compensate for variations in flatness of the side of the block along its length.

In one embodiment, an at least one row of second gripper pads of the second gripper jaw is located approximately midway between the pair of spaced apart first gripper pads such that when a clamping force is applied to the block it is urged into planar alignment with the third datum surface.

In one embodiment, the gripper jaws are configured to accommodate blocks of varying length.

In one embodiment, the gripper jaws are configured to one of:
  a) clamp blocks of varying length at different pre-defined positions along the length of the gripper jaws; and,
  b) clamp blocks of varying length at the same position along the length of the gripper jaws.

In one embodiment, the drop position coincides with the clamping assembly being rotated to a relative angle to the ground of at least one of:
  a) between 30 to 60 degrees;
  b) between 35 to 55 degrees;
  c) between 40 to 50 degrees; and,
  d) approximately 45 degrees.

In one embodiment, the support comprises a distal end of a boom used for transferring blocks therealong.

In one embodiment, the upstream clamp forms part of a shuttle for delivering a block along the boom.

In one embodiment, the downstream clamp is an end effector of a robotic block placement arm that is programmed to place blocks during construction of a building structure.

In one embodiment, the block transfer apparatus includes a distance range sensor for use in determining the proximity between the clamping assembly and the block held by the upstream clamp.

In another broad form, an aspect of the present invention seeks to provide a block delivery system for delivering blocks for placement during construction of a building structure, the block delivery system including:
  a) a boom for transferring blocks therealong;
  b) an upstream clamp forming part of a shuttle that delivers blocks along the boom;
  c) a downstream clamp associated with an end effector of a robotic block placement arm that is programmed to place blocks during construction of the building structure; and,
  d) a block transfer apparatus for transferring a block between the upstream clamp and the downstream clamp, the block transfer apparatus including:
    i) a frame pivotally mounted to a distal end of the boom; and,
    ii) a clamping assembly mounted to the frame and linearly extendable relative thereto, the clamping assembly including a pair of gripper jaws for clamping opposing sides of the block;

wherein, the block transfer apparatus is configured to:
  (1) receive a block from the upstream clamp, wherein the block is initially clamped in the gripper jaws in an approximate position;
  (2) rotate to a drop position whereby the gripper jaws release the block and allow it to self-datum onto first and second orthogonal datum surfaces to thereby register an end and top or bottom face of the block in corresponding first and second orthogonal planes;
  (3) re-clamp the block after the drop by applying a clamping force to opposing sides of the block so as to register the block against a third datum surface defining a third plane orthogonal to both the first and second planes to thereby datum the position of the block with respect to the clamping assembly; and,
  (4) present the block clamped in the datumed position for transfer to the downstream clamp.

In another broad form, an aspect of the present invention seeks to provide a clamping assembly for clamping a block, the clamping assembly including a pair of gripper jaws including datum surfaces in first and second orthogonal planes to locate the block relative thereto, the clamping assembly configured to locate an end and top or bottom face of the block in the first and second orthogonal planes and then apply a clamping force to opposing sides of the block so as to locate the block in a third plane orthogonal to both the first and second planes to thereby datum the position of the block with respect to the clamping assembly.

In one embodiment, the datum surfaces form a V-shaped wedge into which the block is located.

In one embodiment, each gripper jaw includes at least one first datum surface extending at least partially between top and bottom surfaces of the gripper jaw and towards the opposing gripper jaw for locating an end of the block.

In one embodiment, the at least one first datum surface is provided by one of:
  a) a surface integral with each gripper jaw; and,
  b) a plate element mounted to a surface integral with each gripper jaw.

In one embodiment, each gripper jaw includes at least one second datum surface that is parallel to a top or bottom surface of the gripper jaw and projects towards the opposing gripper jaw for locating the top or bottom surface of the block.

In one embodiment, the at least one second datum surface is provided by one of:
  a) the top or bottom surface of each gripper jaw; and,
  b) plate elements mounted to the top or bottom surfaces of each gripper jaw.

In one embodiment, the at least one second datum surface is discontinuous.

In one embodiment, the gripper jaws are configured to accommodate blocks of varying length.

In one embodiment, the gripper jaws are configured to clamp blocks of varying length at different pre-defined positions along the length of the gripper jaws.

In one embodiment, each gripper jaw includes a plurality of first datum surfaces spaced apart along a lengthwise direction thereof.

In one embodiment, the plurality of spaced apart first datum surfaces are further stepped apart laterally with respect to each gripper jaw so as not to overlap in the lengthwise direction thereof.

In one embodiment, an end of blocks of varying length are each located on one of the plurality of first datum surfaces of each gripper jaw.

In one embodiment, a first of the pair of gripper jaws has a plurality of first gripper pads arranged to define the third plane for locating a side face of the block when clamped.

In one embodiment, a second of the pair of gripper jaws has a plurality of second gripper pads arranged co-linearly in a lengthwise direction thereof such that when a clamping force is applied to the block the plurality of second gripper pads act to urge the block into planar alignment with the third plane defined by the plurality of first gripper pads.

In one embodiment, the plurality of first gripper pads comprise a pair of spaced apart rows of first gripper pads extending in a lengthwise direction of the first gripper jaw and wherein the second gripper pads are located on the second gripper jaw approximately midway between the spaced apart rows of first gripper pads.

In one embodiment, the first and second gripper pads are arranged on stepped surfaces of each gripper jaw so that each different length of block clamped by the assembly is contacted by a different plurality of first and second gripper pads.

In one embodiment, any block clamped by the assembly will be in contact with at least four first gripper pads and at least two second gripper pads when a clamping force is applied.

In one embodiment, the block is allowed to drop into the wedge under gravity to locate onto the datum surfaces defining the first and second orthogonal planes.

In one embodiment, the clamping assembly is pivotable and the drop is performed when the gripper jaws have been pivoted to a relative angle to the ground of at least one of:
 a) between 30 to 60 degrees;
 b) between 35 to 55 degrees;
 c) between 40 to 50 degrees; and,
 d) approximately 45 degrees.

In one embodiment, the block is:
 a) initially clamped in the gripper jaws in an approximate position;
 b) rotated to a drop position whereby the gripper jaws release the block and allow it to drop into the wedge; and,
 c) re-clamped when the block is located in the wedge so that the block is located in a datumed position.

In another broad form, an aspect of the present invention seeks to provide a block transfer apparatus for transferring a block between an upstream clamp of a block delivery system and a downstream clamp of the block delivery system, the block transfer apparatus including:
 a) a frame pivotally mounted to a support; and,
 b) a clamping assembly mounted to the frame and linearly extendable relative thereto, the clamping assembly including a pair of gripper jaws including datum surfaces in first and second orthogonal planes to locate the block relative thereto, wherein the clamping assembly is configured to at least:
  i) receive a block from the upstream clamp, wherein the block is initially clamped in the gripper jaws in an approximate position;
  ii) rotate to a drop position whereby the gripper jaws release the block and allow it to drop into a V-shaped wedge formed by the datum surfaces to thereby locate an end and top or bottom face of the block in the first and second orthogonal planes;
  iii) re-clamp the block after the drop by applying a clamping force to opposing sides of the block so as to locate the block in a third plane orthogonal to both the first and second planes to thereby datum the position of the block with respect to the clamping assembly.
  iv) present the block clamped in the datumed position for transfer to the downstream clamp.

In one embodiment, the support comprises a distal end of a boom used for transferring blocks therealong.

In one embodiment, the upstream clamp forms part of a shuttle for delivering a block along the boom.

In one embodiment, the downstream clamp is an end effector of a robotic block placement arm that is programmed to place blocks during construction of a building structure.

In one embodiment, the block transfer apparatus includes a distance range sensor for use in determining the proximity between the clamping assembly and the block held by the upstream clamp.

In yet a further broad form, an aspect of the present invention seeks to provide a block delivery system for delivering blocks for placement during construction of a building structure, the block delivery system including:
 a) a boom for transferring blocks therealong;
 b) an upstream clamp forming part of a shuttle that delivers blocks along the boom;
 c) a downstream clamp associated with an end effector of a robotic block placement arm that is programmed to place blocks during construction of the building structure; and,
 d) a block transfer apparatus for transferring a block between the upstream clamp and the downstream clamp, the block transfer apparatus including:
  i) a frame pivotally mounted to a distal end of the boom; and,
  ii) a clamping assembly mounted to the frame and linearly extendable relative thereto, the clamping assembly including a pair of gripper jaws including datum surfaces in first and second orthogonal planes to locate the block relative thereto, wherein the clamping assembly is configured to at least:
   (1) receive a block from the upstream clamp, wherein the block is initially clamped in the gripper jaws in an approximate position;
   (2) rotate to a drop position whereby the gripper jaws release the block and allow it to drop into a V-shaped wedge formed by the datum surfaces to thereby locate an end and top or bottom face of the block in the first and second orthogonal planes;
   (3) re-clamp the block after the drop by applying a clamping force to opposing sides of the block so as to locate the block in a third plane orthogonal to both the first and second planes to thereby datum the position of the block with respect to the clamping assembly; and,
   (4) present the block clamped in the datumed position for transfer to the downstream clamp.

It will be appreciated that the broad forms of the invention and their respective features can be used in conjunction and/or independently, and reference to separate broad forms is not intended to be limiting.

BRIEF DESCRIPTION OF THE DRAWINGS

Various examples and embodiments of the present invention will now be described with reference to the accompanying drawings, in which:

FIG. 3A is a schematic bottom view of a clamping assembly shown in use clamping a first block type;

FIG. 3B is a schematic top view of the clamping assembly of FIG. 3A;

FIG. 4A is a schematic bottom view of a clamping assembly shown in use clamping a second block type;

FIG. 4B is a schematic top view of the clamping assembly of FIG. 4A;

FIG. 4C is a sectional view of the clamping assembly taken through section B-B of FIG. 4A;

FIG. 5A is a schematic bottom view of a clamping assembly shown in use clamping a third block type;

FIG. 5B is a schematic top view of the clamping assembly of FIG. 5A;

DETAILED DESCRIPTION OF THE PREFERRED EMBODIMENTS

Figure 1A:
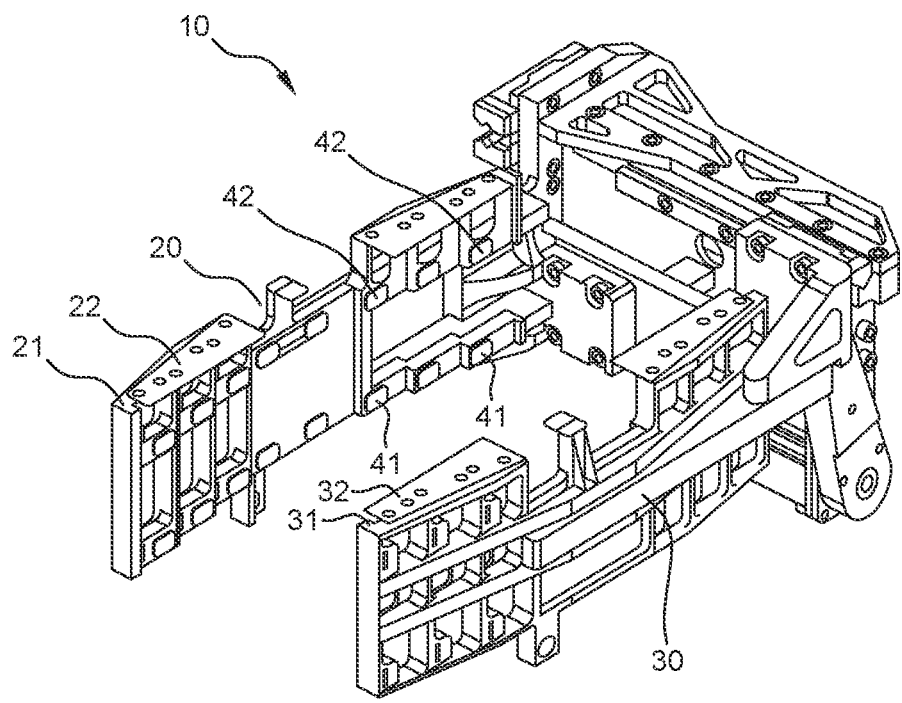
FIG. 1A is a perspective view of an example of a clamping assembly.

An example of a clamping assembly 10 for clamping a block will now be described with references to FIGS. 1A to 1D.

The term "block" used herein is a piece of material, typically in the form of a polyhedron, such as a cuboid having six quadrilateral and more typically substantially rectangular faces. The block is typically made of a hard material and may include openings or recesses, such as cavities or the like. The block is configured to be used in constructing a structure, such as a building or the like and specific example blocks include bricks, besser blocks, concrete masonry units or similar.

In this example, the clamping assembly 10 includes a pair of gripper jaws 20, 30 including datum surfaces 21, 31 and 22, 32 in first and second orthogonal planes to locate the block relative thereto. The clamping assembly 10 is configured to locate an end and top or bottom face of the block in the first and second orthogonal planes and then apply a clamping force to opposing sides of the block so as to locate the block in a third plane orthogonal to both the first and second planes to thereby datum the position of the block with respect to the clamping assembly 10.

An advantage of the above-described clamping assembly 10 is its ability to provide a reliable and repeatable mechanical datum for the block it is clamping. This is particularly useful in a robotic system in which the clamping assembly may be used to clamp a block and transfer it for pick up by a robotic arm. As the position and orientation of the block is known relative to the clamping assembly, the block may be accurately transferred to the robotic arm and the robotic arm may be programmed to pick up the block from a precise location with respect to the clamping assembly. This enables a further clamp (i.e. end effector) of the robotic arm to pick up a block in the same position every time which is important to ensure that the block is placed accurately at its target destination. The ability to mechanically datum the block in the gripper jaws removes the need for a vision system to image the block in the clamping assembly in order to determine its precise 6 DOF location. By eliminating the need for a camera-based vision system, the robotic block transfer system is made more reliable and efficient.

A number of further features will now be described.

In one example, the datum surfaces form a V-shaped wedge into which the block is located. This corresponds to the intersection of the X and Z planes in FIGS. 1C and 1D. As will be described in further detail below, typically the block is allowed to drop into the wedge under the force of gravity when the clamping assembly is oriented at an acute angle, typically around 45 degrees to the ground.

Typically, each gripper jaw includes at least one first datum surface extending at least partially between top and bottom surfaces of the gripper jaw and towards the opposing gripper jaw for locating an end of the block. The at least one first datum surface is provided by one of a surface integral with each gripper jaw or a plate element mounted to a surface integral with each gripper jaw. In an example configuration, a thin wear plate/strip, for example made from Steel or the like is fixed to the surface integral with each gripper jaw. These strips or inserts can be replaced periodically when the datum surface starts to wear and this obviates the need to replace the entire gripper jaw.

Further, each gripper jaw includes at least one second datum surface that is parallel to a top or bottom surface of the gripper jaw and projects towards the opposing gripper jaw for locating the top or bottom surface of the block. The at least one second datum surface is provided by one of the top or bottom surface of each gripper jaw or plate elements mounted to the top or bottom surfaces of each gripper jaw. It will be appreciated therefore that the datum surfaces could be surfaces machined into the body of each gripper jaw, whilst in other embodiments the datum surfaces may be provided by additional plate elements fixed to surfaces of the gripper jaw.

In one example, the at least one second datum surface is discontinuous. In this regard, the top or bottom surface of each gripper jaw and/or plate elements fixed thereto may be segmented so as to provide gaps suitable for a gripper of a robotic arm to grip the block whilst it is held by the clamping assembly to effect transfer to the robotic arm. It is to be appreciated that in order to datum the block in the at least one second datum plane contact with one or more surface segments or plate elements may be used. In some examples, depending on the length of block being clamped, more than one surface segment or plate element providing the second datum surface will be in contact with the block whereas for shorter blocks only one surface segment or plate element may contact the block.

The gripper jaws of the clamping assembly may therefore be configured to accommodate blocks of varying length. In one example, the jaws may accommodate one or more of a full-size block of length L, a three-quarter size block of length 0.75 L, a half-size block of length 0.5 L and a quarter-size block of length 0.25 L.

Typically, the gripper jaws are configured to clamp blocks of varying length at different pre-defined positions along the length of the gripper jaws. In this regard, each gripper jaw may include a plurality of first datum surfaces spaced apart along a lengthwise direction thereof. The plurality of spaced apart first datum surfaces are typically further stepped apart laterally with respect to each gripper jaw so as not to overlap in the lengthwise direction thereof. In this arrangement, an end of blocks of varying length are each located on one of the plurality of first datum surfaces of each gripper jaw. Accordingly, when a particular block type is held by the clamping assembly in a datumed configuration, only one of the plurality of first datum surfaces will be in contact with the block.

The clamping method of the gripper jaws will now be described. Typically, a first of the pair of gripper jaws has a plurality of first gripper pads arranged to define the third plane for locating a side face of the block when clamped. The plurality of first gripper pads may be mounted onto an inner face of the first gripper jaw or into recesses formed therein such that the pads protrude slightly past the inner face. In one example, the plurality of first gripper pads comprise a pair of spaced apart rows of first gripper pads extending in a lengthwise direction of the first gripper jaw. In a preferred arrangement, at least four first gripper pads will contact a first side face of the block when clamping. Typically, this comprises two first gripper pads in the first row and two first gripper pads in the second row. This arrangement will provide four points of contact typically whereby the gripper pads in the first and second rows are equally spaced apart in the lengthwise direction.

A second of the pair of gripper jaws typically has a plurality of second gripper pads arranged co-linearly in a lengthwise direction thereof such that when a clamping force is applied to the block the plurality of second gripper pads act to urge the block into planar alignment with the third plane defined by the plurality of first gripper pads. In this regard, the second gripper pads are typically located on the second gripper jaw approximately midway between the spaced apart rows of first gripper pads. In this way, the line of action of the clamping force through the second gripper pads will be midway between the corresponding lines of action of the clamping force through the first gripper pads. This arrangement assists in providing planar alignment in the third plane (i.e. Y-plane) and prevents the block from being angularly misaligned in the jaws.

The first and second gripper pads are arranged on stepped surfaces of each gripper jaw so that each different length of block clamped by the assembly is contacted by a different plurality of first and second gripper pads.

In one example, any block clamped by the assembly will be in contact with at least four first gripper pads and at least two second gripper pads when a clamping force is applied. In other arrangements it may be possible to for a block to be in contact with only three first gripper pads and one second gripper pad.

It is to be understood that when a block is clamped by the above-described clamping assembly it may be held initially in an undatumed and unknown position. In order to datum the block in the jaws, typically the block is allowed to drop into the wedge under gravity to locate onto the datum surfaces defining the first and second orthogonal planes.

In order to effect this drop, typically the clamping assembly is pivotable (either directly or indirectly) and the drop is performed when the gripper jaws have been pivoted to a relative angle to the ground of at least one of: between 30 to 60 degrees; between 35 to 55 degrees; between 40 to 50 degrees; and, approximately 45 degrees. As the jaws must be opened in order to allow the block to drop, the angle is chosen for a particular block type to ensure that the block is not inadvertently dropped out of the clamping assembly.

In operation, in one example, the block is initially clamped in the gripper jaws in an approximate position. It is then rotated to a drop position whereby the gripper jaws release the block and allow it to drop into the wedge. The block is then re-clamped when it is located in the wedge so that the block is then clamped in a datumed position.

In another broad form there is provided a block transfer apparatus for transferring a block between an upstream clamp of a block delivery system and a downstream clamp of the block delivery system. The block transfer apparatus includes a frame pivotally mounted to a support; and, a clamping assembly mounted to the frame and linearly extendable relative thereto, the clamping assembly including a pair of gripper jaws including datum surfaces in first and second orthogonal planes to locate the block relative thereto. The clamping assembly is configured to at least: receive a block from the upstream clamp, wherein the block is initially clamped in the gripper jaws in an approximate position; rotate to a drop position whereby the gripper jaws release the block and allow it to drop into a V-shaped wedge formed by the datum surfaces to thereby locate an end and top or bottom face of the block in the first and second orthogonal planes; re-clamp the block after the drop by applying a clamping force to opposing sides of the block so as to locate the block in a third plane orthogonal to both the first and second planes to thereby datum the position of the block with respect to the clamping assembly. Finally, the block transfer apparatus presents the block clamped in the datumed position for transfer to the downstream clamp.

In one example, the support comprises a distal end of a boom used for transferring blocks therealong and the upstream clamp forms part of a shuttle for delivering a block along the boom.

The downstream clamp may be an end effector of a robotic block placement arm that is programmed to place blocks during construction of a building structure.

In some arrangements, the block transfer apparatus includes a distance range sensor for use in determining the proximity between the clamping assembly and the block held by the upstream clamp. Any suitable distance range sensing technology such as ultrasonic, laser etc may be used. Feedback from the distance sensor can be used to control the block transfer apparatus to pick up the block from the upstream clamp.

In a further broad form, there is provided a block delivery system for delivering blocks for placement during construction of a building structure. The block delivery system includes a boom for transferring blocks therealong; an upstream clamp forming part of a shuttle that delivers blocks along the boom; a downstream clamp associated with an end effector of a robotic block placement arm that is programmed to place blocks during construction of the building structure; and, a block transfer apparatus for transferring a block between the upstream clamp and the downstream clamp, the block transfer apparatus including: a frame pivotally mounted to a distal end of the boom; and, a clamping assembly mounted to the frame and linearly extendable relative thereto, the clamping assembly including a pair of gripper jaws including datum surfaces in first and second orthogonal planes to locate the block relative thereto, wherein the clamping assembly is configured to at least: receive a block from the upstream clamp, wherein the block is initially clamped in the gripper jaws in an approximate position; rotate to a drop position whereby the gripper jaws release the block and allow it to drop into a V-shaped wedge formed by the datum surfaces to thereby locate an end and top or bottom face of the block in the first and second orthogonal planes; re-clamp the block after the drop by applying a clamping force to opposing sides of the block so as to locate the block in a third plane orthogonal to both the first and second planes to thereby datum the position of the block with respect to the clamping assembly; and, present the block clamped in the datumed position for transfer to the downstream clamp.

Referring again to FIGS. 1A to 1D, the clamping assembly 10 will be described in further detail. The clamping assembly 10 includes a frame 11 to which the gripper jaws 20, 30 are slidably mounted onto rails 14, 16 via bearing blocks or rail guides for linear movement in a lateral direction in order to open and close the jaws. The jaws 20, 30 are belt driven by a servo motor 17 that turns a lead screw 15 connecting the jaws to thereby move the jaws along the rails 14, 16 in order to apply and release a clamping force to a block. Further bearing blocks or rail guides 12, 13 are also mounted to one side of the frame 11 and these guides are engageable onto rails of a block transfer apparatus as will be described in further detail below.

Figure 1B:
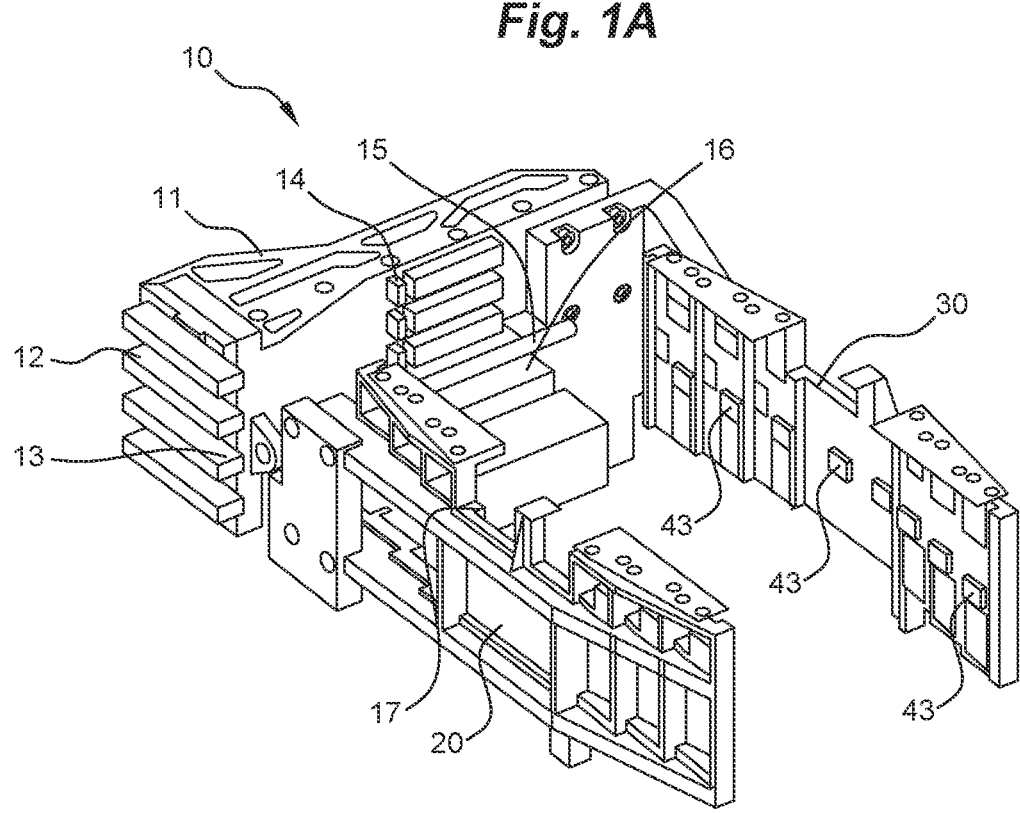
FIG. 1B is a further perspective view of the clamping assembly of FIG. 1A.
Figure 1C:
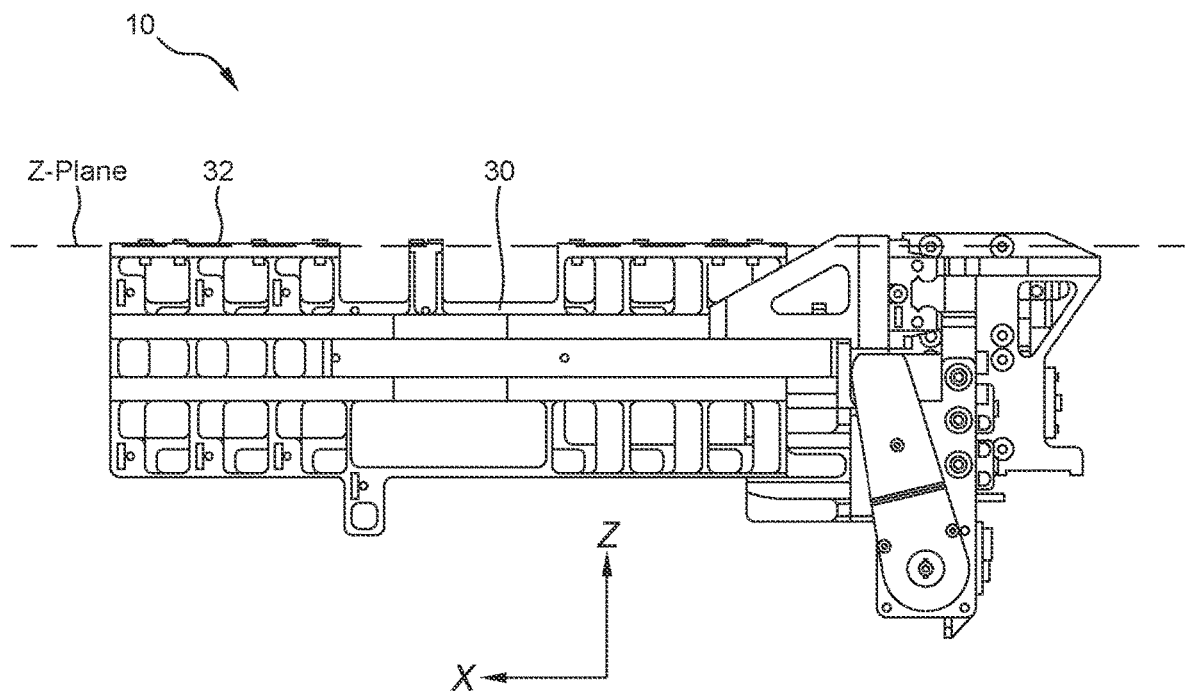
FIG. 1C is a side view of the clamping assembly of FIG. 1A.

As shown in FIGS. 1A and 1B, first gripper jaw 20 includes two rows of spaced apart gripper pads 41, 42 along the length of the first griper jaw 20, whilst second gripper jaw 30 includes a single row of spaced apart gripper pads 43 along the length of second gripper jaw 30. These gripper pads exert a clamping force onto a block when clamped and are arranged so that the gripper pads 43 of the second gripper jaw 30 urge the block into planar alignment in a Y-plane defined by the gripper pads 41, 42 of the first gripper jaw 20 in contact with the block. In this regard, the single row of gripper pads 43 of the second gripper jaw 30 are typically located approximately midway between the height of the two rows defined respectively by gripper pads 41, 42 of the first gripper jaw 20. This arrangement prevents angular misalignment or twisting of the block in the jaws.

Each gripper jaw 20, 30 of the clamping assembly has a body extending in a lengthwise direction. In plan view, the gripper jaws 20, 30 each have a central portion 25, 35 and fore and aft portions 26, 36 and 27, 37 that are inwardly tapered from the central portion 25, 35 towards respective opposing ends of each jaw 20, 30. Internally, the body of each gripper jaw has a central recessed portion, from which the body defines a stepped profile in opposing directions towards respective ends of each jaw. The inner face of each jaw therefore defines a number of laterally stepped apart recessed portions, each defining a recessed inner surface and corresponding lip segment as will be described in further detail below with respect to the schematic views shown in FIGS. 3A to 3C, 4A to 4C, 5A to 5C and 6A to 6C.

Figure 1D:
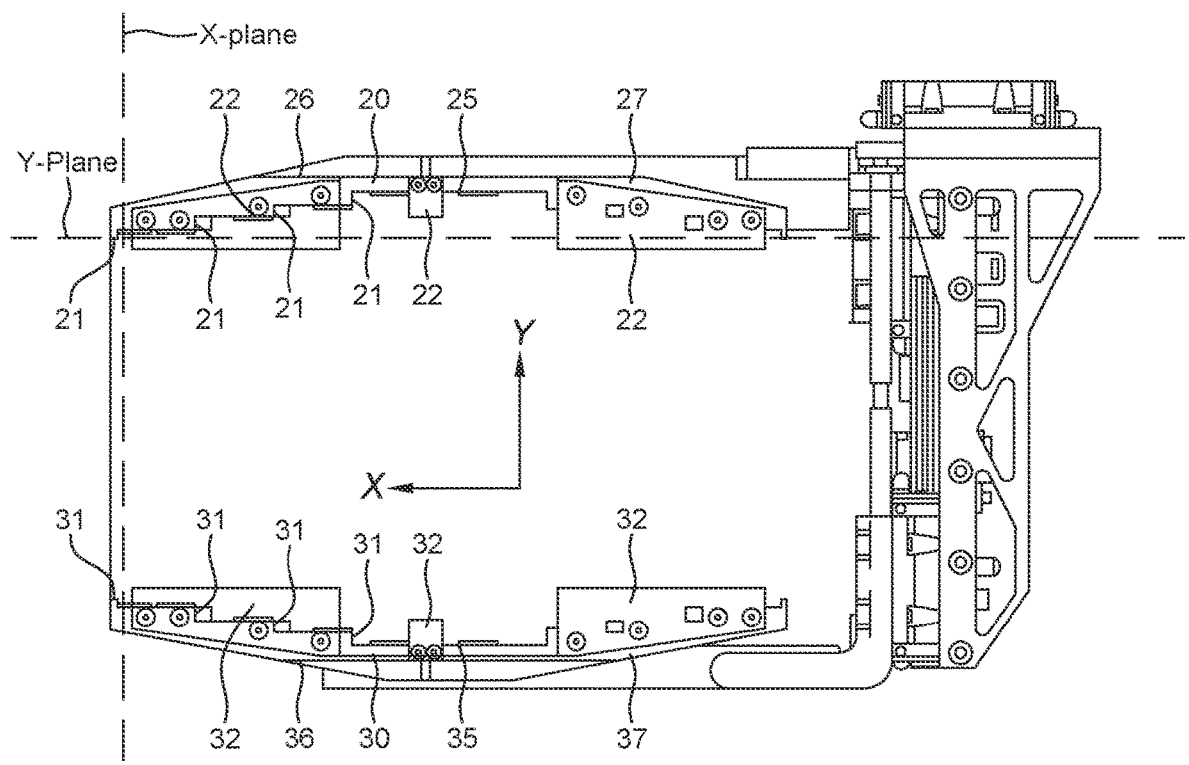
FIG. 1D is a top view of the clamping assembly of FIG. 1A.

In FIG. 1D, it is to be noted that the clamping assembly 10 includes a plurality of first datum surfaces 21, 31 that are stepped apart in a lengthwise direction of the gripper jaws 20, 30. Advantageously, this enables the clamping assembly 10 to be able to clamp and datum blocks of varying length which increases its utility. There may also be provided a plurality of second datum surfaces 22, 32 as shown that have gaps between them suitable for a clamp of a robot to grip the block whilst held by the clamping assembly 10 for transfer thereto.

Figure 2:
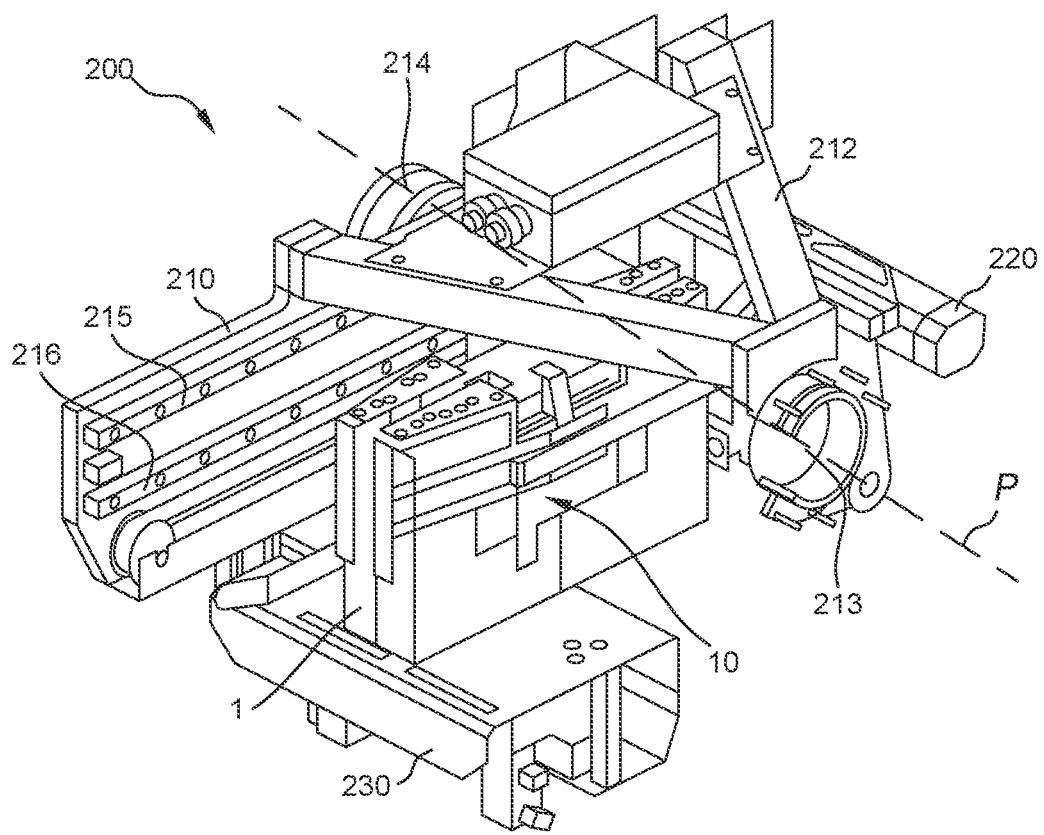
FIG. 2 is a perspective view of a block transfer apparatus incorporating the clamping assembly of FIGS. 1A to 1D.

An example of a block transfer apparatus 200 is provided in FIG. 2. In this example, the block transfer apparatus 200 includes a lengthwise extending frame or bracket 210 to which the clamping assembly 10 is translatably mounted for linear extension and retraction therealong about rails 215, 216. The rail guides 12, 13 mounted to the frame 11 of the clamping assembly 10 receive the rails 215, 216 therein and the clamping assembly 10 is belt driven along the rails by servo motor 220. In use, the block transfer apparatus 200 is pivotally mounted to a support (such as a distal end of a boom) to enable controlled rotation about pivot axis P. In the example shown, the bracket 210 has structural cross bracing support 212 attached thereto and a pivot mount 213 is provided on this support. On the opposing side, a pivot mount 214 which may be in the form of a high precision reduction gearing is provided mounted to the bracket 210. Mounted beneath the bracket 210 is an adhesive applicator 230 for dispensing construction adhesive onto the block 1. In use, the block is translated beneath nozzles of the adhesive applicator in order to apply adhesive along a substantial length of the block surface. Further details of operation of the block transfer apparatus 200 are described below with references to FIGS. 7A to 7Q.

Referring now to FIGS. 3A to 3C, 4A to 4C, 5A to 5C and 6A to 6C, there are shown detailed schematic representations of a clamping assembly 100 for use in clamping various block types in a datumed position. In these figures, the nomenclature of first and second gripper jaws is the opposite of that used with respect to FIGS. 1A to 1D.

In the below description, each gripper jaw of the clamping assembly has a body extending in a lengthwise direction. In plan view, the gripper jaws have a central portion and fore and aft portions that are inwardly tapered from the central portion towards respective opposing ends of each jaw. Internally, the body of each gripper jaw has a central recessed portion, from which the body defines a stepped profile in opposing directions towards respective ends of each jaw. The inner face of each jaw therefore defines a number of laterally stepped apart recessed portions, each defining a recessed inner surface and corresponding lip segment.

It is to be understood that at least some of the lips define the plurality of first datum surfaces spaced apart along a lengthwise direction of each jaw and stepped apart laterally so as not to overlap in the lengthwise direction thereof.

Figure 3C:
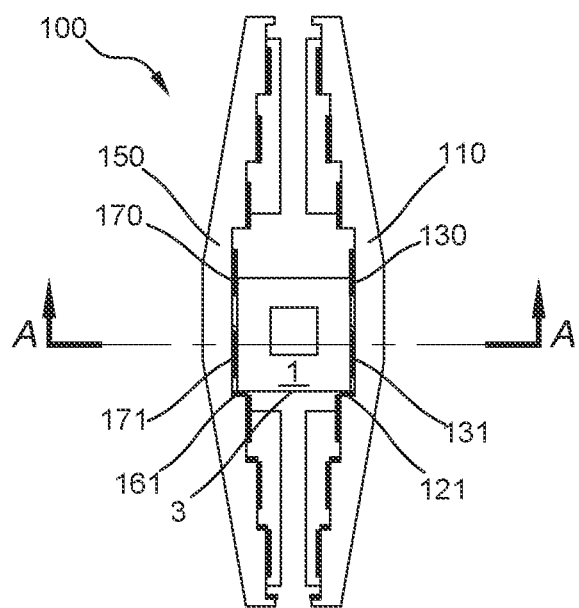
FIG. 3C is a sectional view of the clamping assembly taken through section A-A of FIG. 3A.
Figure 3C:
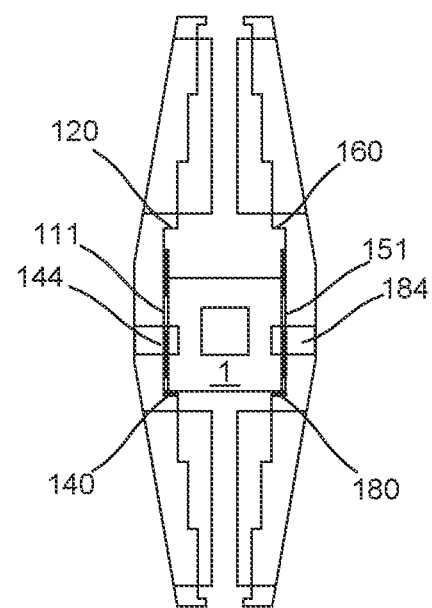
Figure 3C:
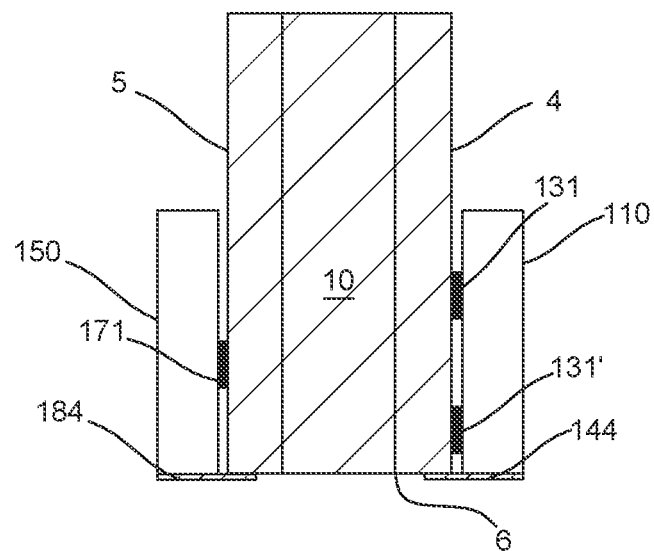

In FIGS. 3A to 3C, the clamping assembly 100 is shown clamping a quarter-length block 1 having a single core or cavity therethrough, although this is for purposes of illustration only.

In this arrangement, the block 1 is clamped in the central recessed portion of the jaws 110, 150 between first recessed inner surfaces 111, 151. The end face 3 of the block 1 is in contact with first lip segments 121, 161 that define first datum surfaces in the X-plane. In this example, first insert wear strips 140, 180 are fixed onto the corresponding first lip segments 121, 161 and the block 1 is held in contact with these strips. A top or bottom face 6 of the block 1 is in contact with plate elements 144, 184 that are fixed to the top surface of respective jaws 110, 150 proximate the central portion thereof. These plate elements 144, 184 project inwardly so as to at least partly extend above the central recessed portion of the jaws. The plate elements 144, 184 define second datum surfaces in the Z-plane and accordingly in the clamped configuration shown, the block 1 is datumed in the X and Z planes.

Respective sides 4 and 5 of the block 1 are clamped respectively by first gripper pads 130, 131 and 130', 131' that are fixed proximal first recessed inner surface 111 of the first gripper jaw 110 and second gripper pads 170, 171 that are fixed proximal first recessed inner surface 151 of the second gripper jaw 150. As shown in FIG. 3B, the first gripper pads are arranged in spaced apart rows with first gripper pads 130, 131 being in an upper row and first gripper pads 130', 131' being in a lower row so as to position first gripper pad 130 above first gripper pad 130' and first gripper pad 131 above first gripper pad 131'. The second gripper pads 170, 171 are arranged co-linearly in a single row that is centrally disposed between the two rows of first gripper pads.

In this way, when a clamping force is applied to the block 1, the plurality of second gripper pads 170, 171 act to urge the block into planar alignment with a third plane (the Y-plane) defined by the surfaces of the plurality of first gripper pads 130, 131, 130', 131'. This arrangement of gripper pads prevents angular misalignment when the block is clamped as side face 4 of the block 1 has four points of contact and side face 5 has two points of contact disposed midway between the opposing points of contact on the other side. As such, in this configuration the position of the block 1 is datumed in the X, Y and Z planes relative to the clamping assembly 100.

In FIGS. 4A to 4C, the clamping assembly 100 is shown clamping a half-length block 1 having a two cores or cavities therethrough, although this is for purposes of illustration only.

In this arrangement, the block 1 is clamped by respective fore and aft portions of each gripper jaw 110, 150, between second recessed inner surfaces 112, 152 in the aft portion and second recessed inner surfaces 113, 153 in the fore portion. The end face 3 of the block 1 is in contact with second lip segments 123, 163 that define first datum surfaces in the X-plane. In this example, second insert wear strips 141, 181 are fixed onto the corresponding second lip segments 123, 163 and the block 1 is held in contact with these strips. A top or bottom face 6 of the block 1 is in contact with plate elements 145, 185 that are fixed to the top surface of respective fore portions of the gripper jaws 110, 150 so as to project inwardly past the second recessed inner surfaces 113, 153. In addition, the top or bottom face 6 of the block 1 is also in contact with plate elements 146, 186 that are fixed to the top surface of respective aft portions of the gripper jaws 110, 150 so as to project inwardly past the second recessed inner surfaces 112, 152. The plate elements 145, 146, 184, 186 define second datum surfaces in the Z-plane and accordingly in the clamped configuration shown, the block 1 is datumed in the X and Z planes.

Side 4 of the block 1 is clamped respectively by first gripper pads 132, 132' that are fixed proximal second recessed inner surface 112 of the first gripper jaw 110 and first gripper pads 133, 133' that are fixed proximal second recessed inner surface 113 of the first gripper jaw 110. Side 5 of the block 1 is clamped respectively by second gripper pad 172 that is fixed proximal second recessed inner surface 152 of the second gripper jaw 150, and second gripper pad 173, that is fixed proximal second recessed inner surface 153 of the second gripper jaw 150. The respective first and second gripper pads are arranged substantially as previous described, except spaced apart further in a lengthwise direction of the gripper jaws. As the block 1 is clamped, the plurality of second gripper pads 172, 173 act to urge the block into planar alignment with a third plane (the Y-plane) defined by the surfaces of the plurality of first gripper pads 132, 133, 132', 133'. As such, in this configuration the position of the block 1 is datumed in the X, Y and Z planes relative to the clamping assembly 100.

Figure 5C:
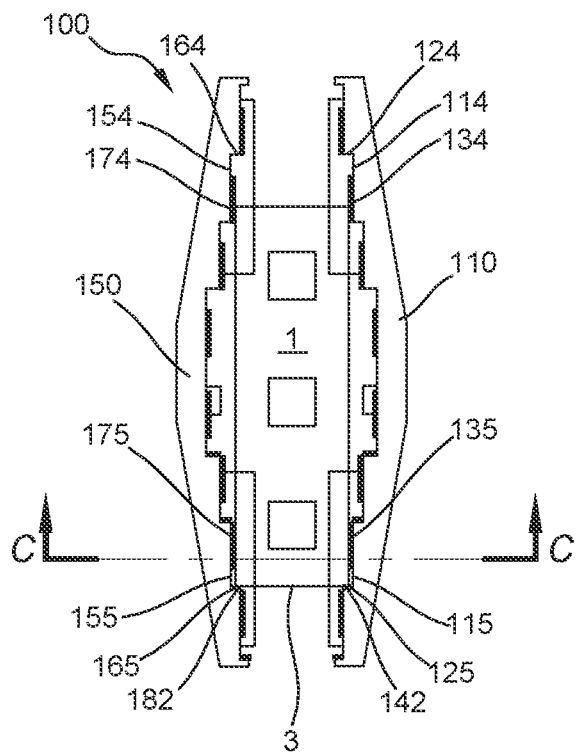
FIG. 5C is a sectional view of the clamping assembly taken through section C-C of FIG. 5A.
Figure 5C:
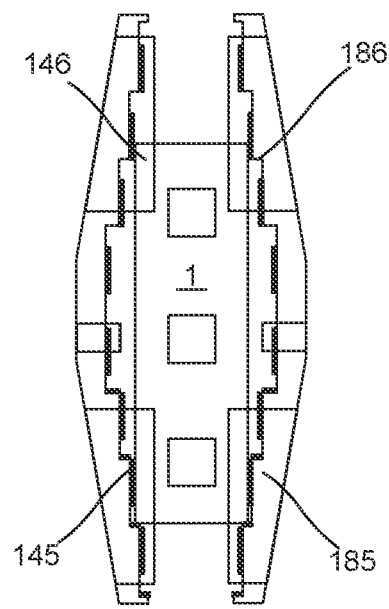
Figure 5C:
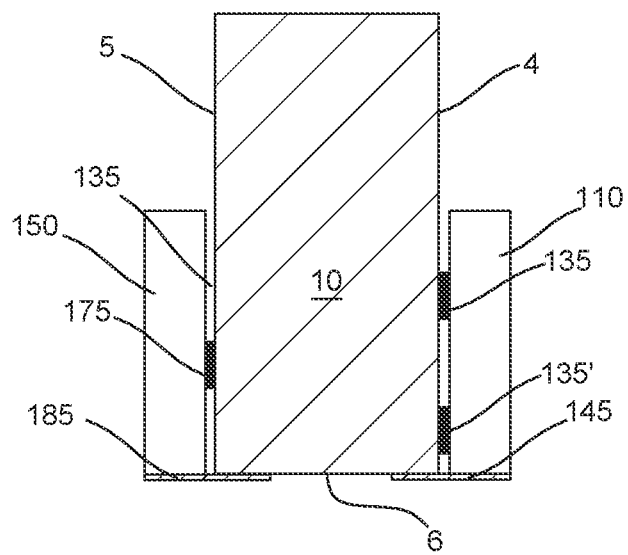

In FIGS. 5A to 5C, the clamping assembly 100 is shown clamping a three quarter-length block 1 having a three cores or cavities therethrough, although this is for purposes of illustration only.

In this arrangement, the block 1 is clamped by respective fore and aft portions of each gripper jaw 110, 150, between third recessed inner surfaces 114, 154 in the aft portion and third recessed inner surfaces 115, 155 in the fore portion. The end face 3 of the block 1 is in contact with third lip segments 125, 165 that define first datum surfaces in the X-plane. In this example, third insert wear strips 142, 182 are fixed onto the corresponding third lip segments 125, 165 and the block 1 is held in contact with these strips. A top or bottom face 6 of the block 1 is in contact with plate elements 145, 185 that are fixed to the top surface of respective fore portions of the gripper jaws 110, 150 so as to project inwardly past the third recessed inner surfaces 115, 155. In addition, the top or bottom face 6 of the block 1 is also in contact with plate elements 146, 186 that are fixed to the top surface of respective aft portions of the gripper jaws 110, 150 so as to project inwardly past the third recessed inner surfaces 114, 154. The plate elements 145, 146, 184, 186 define second datum surfaces in the Z-plane and accordingly in the clamped configuration shown, the block 1 is datumed in the X and Z planes.

Side 4 of the block 1 is clamped respectively by first gripper pads 134, 134' that are fixed proximal third recessed inner surface 114 of the first gripper jaw 110 and first gripper pads 135, 135' that are fixed proximal third recessed inner surface 115 of the first gripper jaw 110. Side 5 of the block 1 is clamped respectively by second gripper pad 174 that is fixed proximal third recessed inner surface 154 of the second gripper jaw 150, and second gripper pad 175 that is fixed proximal third recessed inner surface 155 of the second gripper jaw 150. The respective first and second gripper pads are arranged substantially as previous described, except spaced apart further in a lengthwise direction of the gripper jaws than the previous examples. As the block 1 is clamped, the plurality of second gripper pads 174, 175 act to urge the block into planar alignment with a third plane (the Y-plane) defined by the surfaces of the plurality of first gripper pads 134, 135, 134', 135'. As such, in this configuration the position of the block 1 is datumed in the X, Y and Z planes relative to the clamping assembly 100.

Figure 6A:
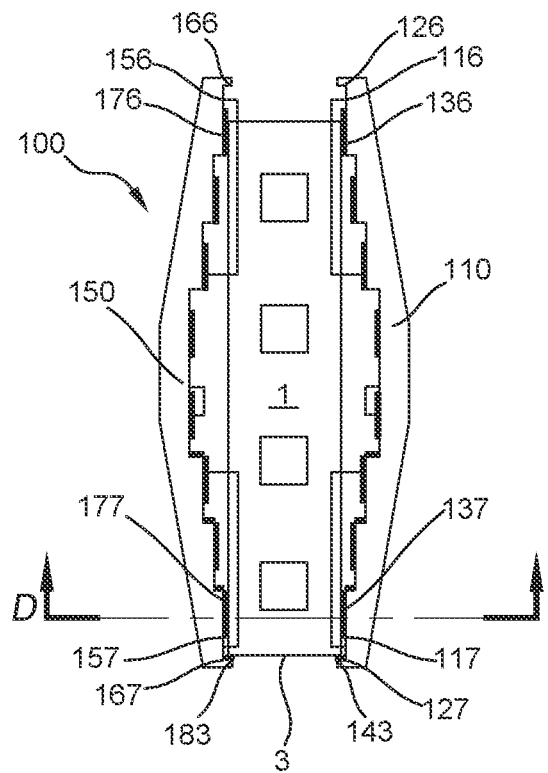
FIG. 6A is a schematic bottom view of a clamping assembly shown in use clamping a fourth block type.
Figure 6B:
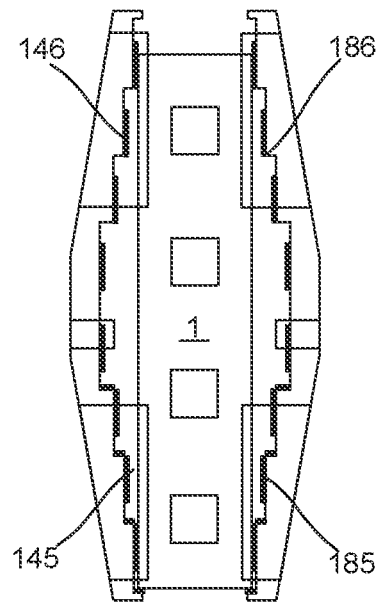
FIG. 6B is a schematic top view of the clamping assembly of FIG. 6A.
Figure 6C:
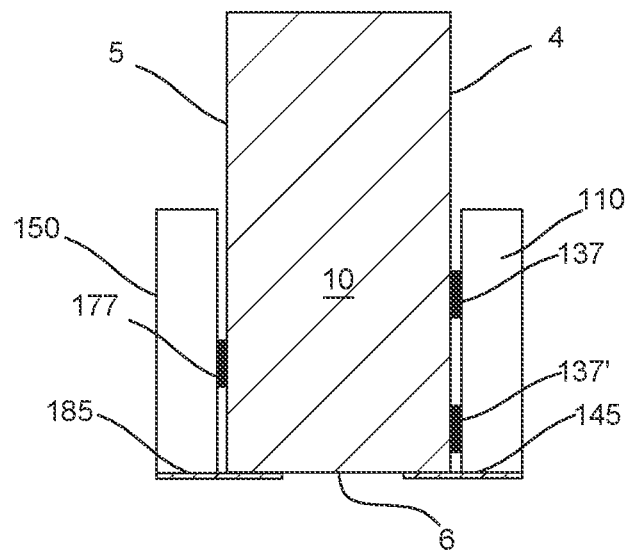
FIG. 6C is a sectional view of the clamping assembly taken through section D-D of FIG. 6A.

In FIGS. 6A to 6C, the clamping assembly 100 is shown clamping a full-length block 1 having a four cores or cavities therethrough, although this is for purposes of illustration only.

In this arrangement, the block 1 is clamped by respective fore and aft portions of each gripper jaw 110, 150, between fourth recessed inner surfaces 116, 156 in the aft portion and fourth recessed inner surfaces 117, 157 in the fore portion.

The end face 3 of the block 1 is in contact with fourth lip segments 127, 167 that define first datum surfaces in the X-plane. In this example, fourth insert wear strips 143, 183 are fixed onto the corresponding fourth lip segments 127, 167 and the block 1 is held in contact with these strips. A top or bottom face 6 of the block 1 is in contact with plate elements 145, 185 that are fixed to the top surface of respective fore portions of the gripper jaws 110, 150 so as to project inwardly past the fourth recessed inner surfaces 117, 157. In addition, the top or bottom face 6 of the block 1 is also in contact with plate elements 146, 186 that are fixed to the top surface of respective aft portions of the gripper jaws 110, 150 so as to project inwardly past the fourth recessed inner surfaces 116, 156. The plate elements 145, 146, 184, 186 define second datum surfaces in the Z-plane and accordingly in the clamped configuration shown, the block 1 is datumed in the X and Z planes.

Side 4 of the block 1 is clamped respectively by first gripper pads 136, 136' that are fixed proximal fourth recessed inner surface 116 of the first gripper jaw 110 and first gripper pads 137, 137' that are fixed proximal fourth recessed inner surface 117 of the first gripper jaw 110. Side 5 of the block 1 is clamped respectively by second gripper pad 176 that is fixed proximal fourth recessed inner surface 156 of the second gripper jaw 150, and second gripper pad 177 that is fixed proximal fourth recessed inner surface 157 of the second gripper jaw 150. The respective first and second gripper pads are arranged substantially as previous described, except spaced apart further in a lengthwise direction of the gripper jaws than the previous examples. As the block 1 is clamped, the plurality of second gripper pads 176, 177 act to urge the block into planar alignment with a third plane (the Y-plane) defined by the surfaces of the plurality of first gripper pads 136, 137, 136', 137'. As such, in this configuration the position of the block 1 is datumed in the X, Y and Z planes relative to the clamping assembly 100.

Figure 7A:
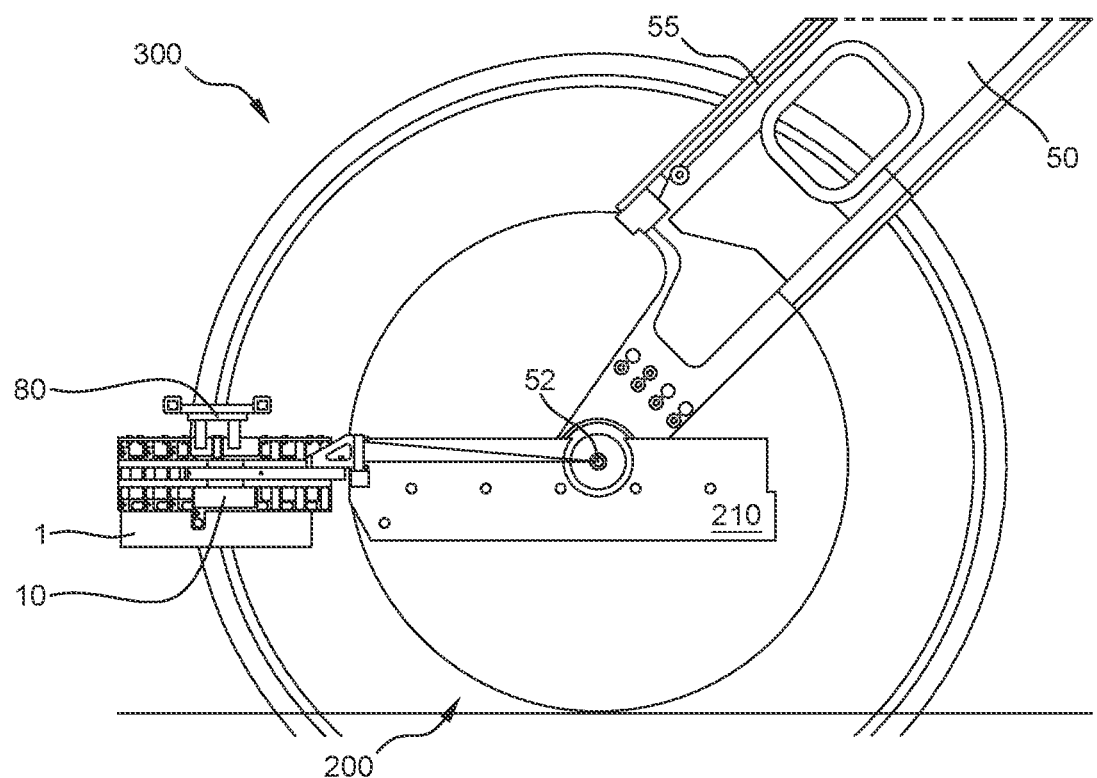
FIGS. 7A to 7Q provide a detailed sequence of schematic views of a block transfer apparatus illustrating controlled movements thereof.
Figure 7B:
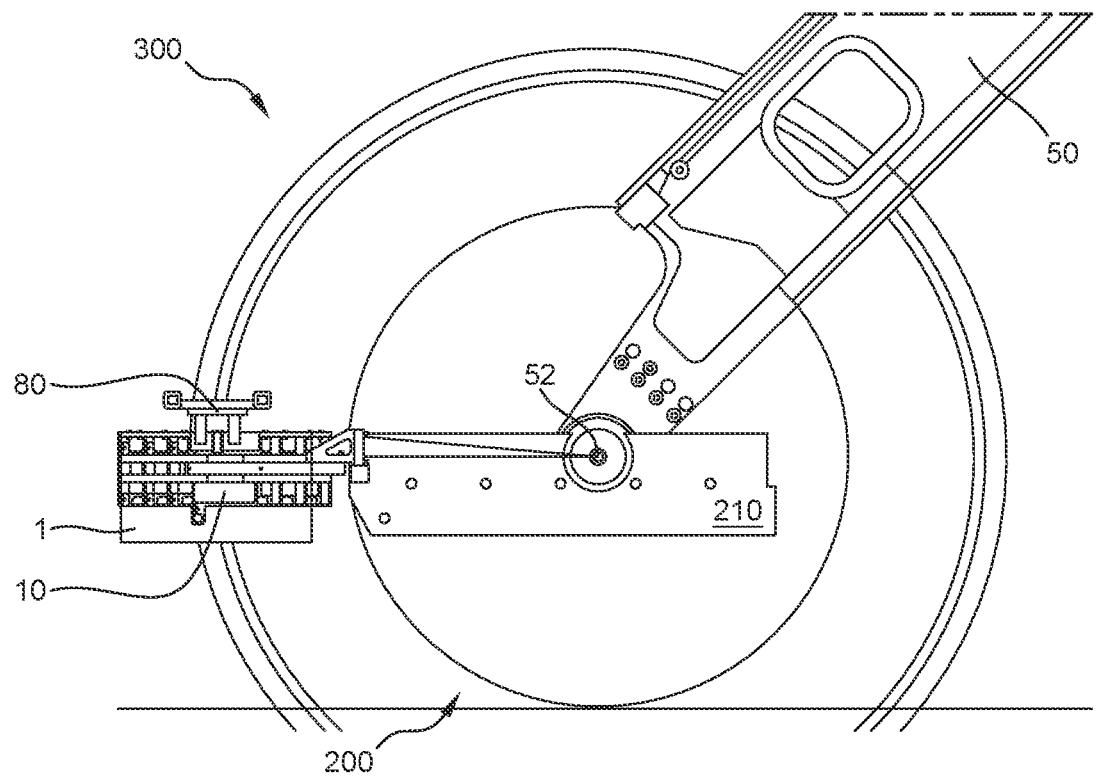
Figure 7C:
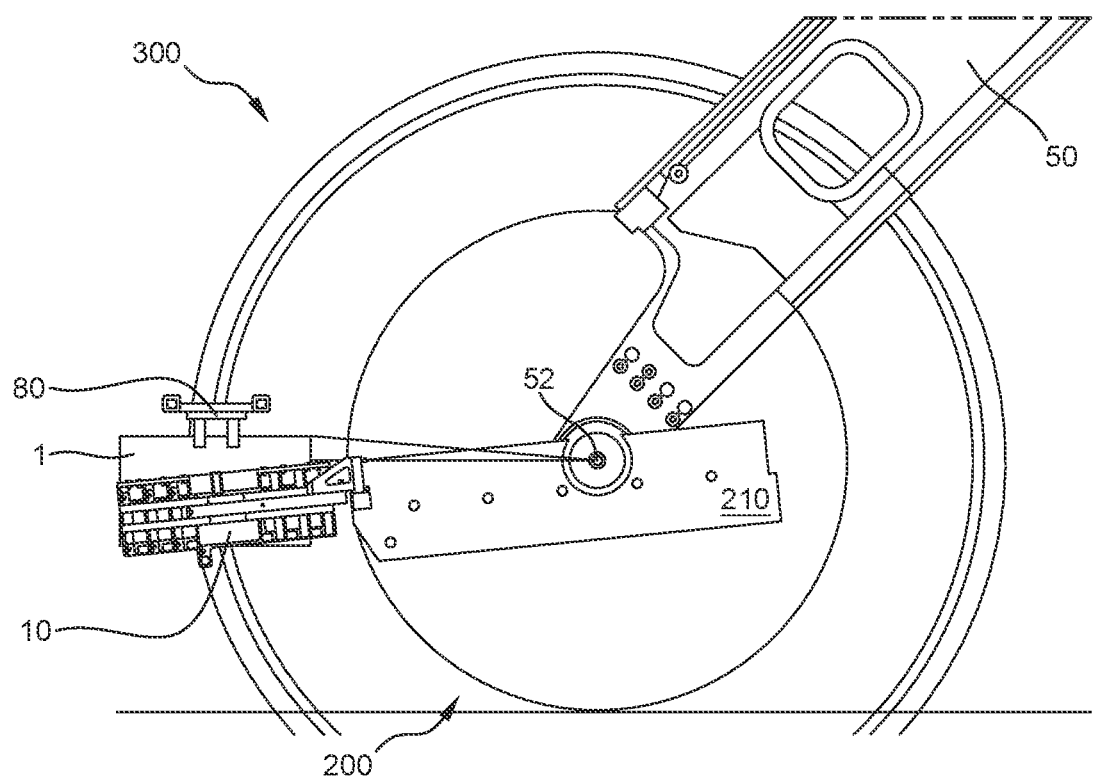
Figure 7D:
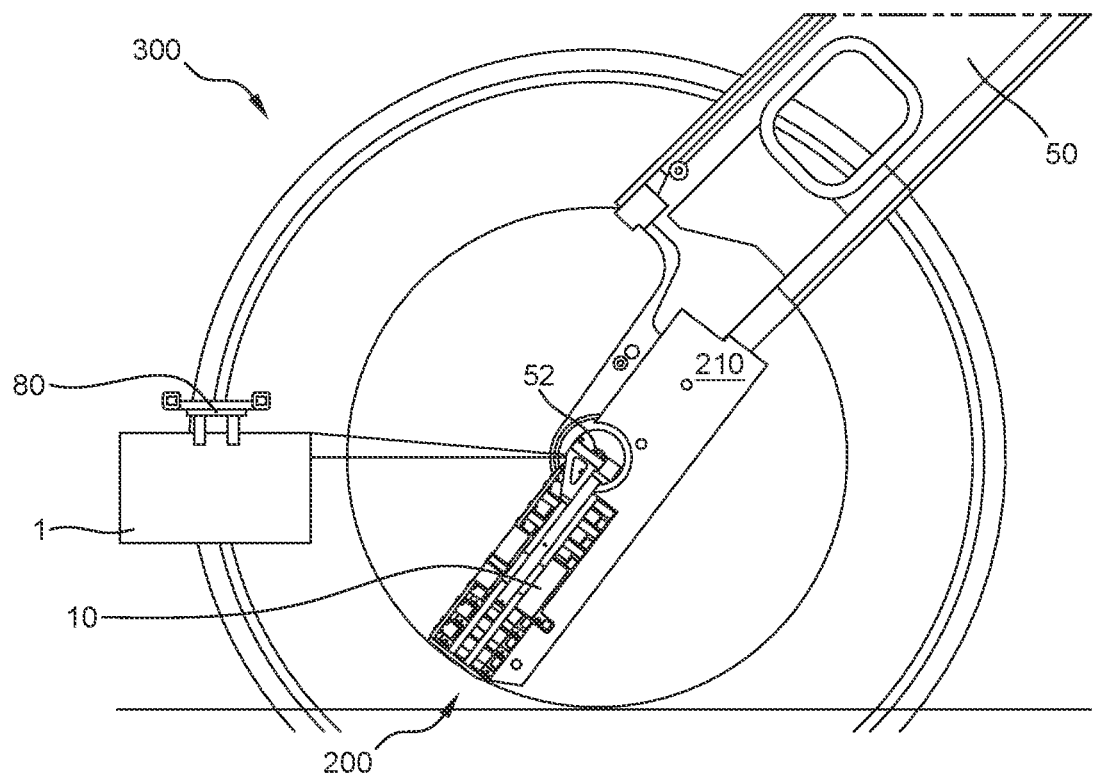
Figure 7E:
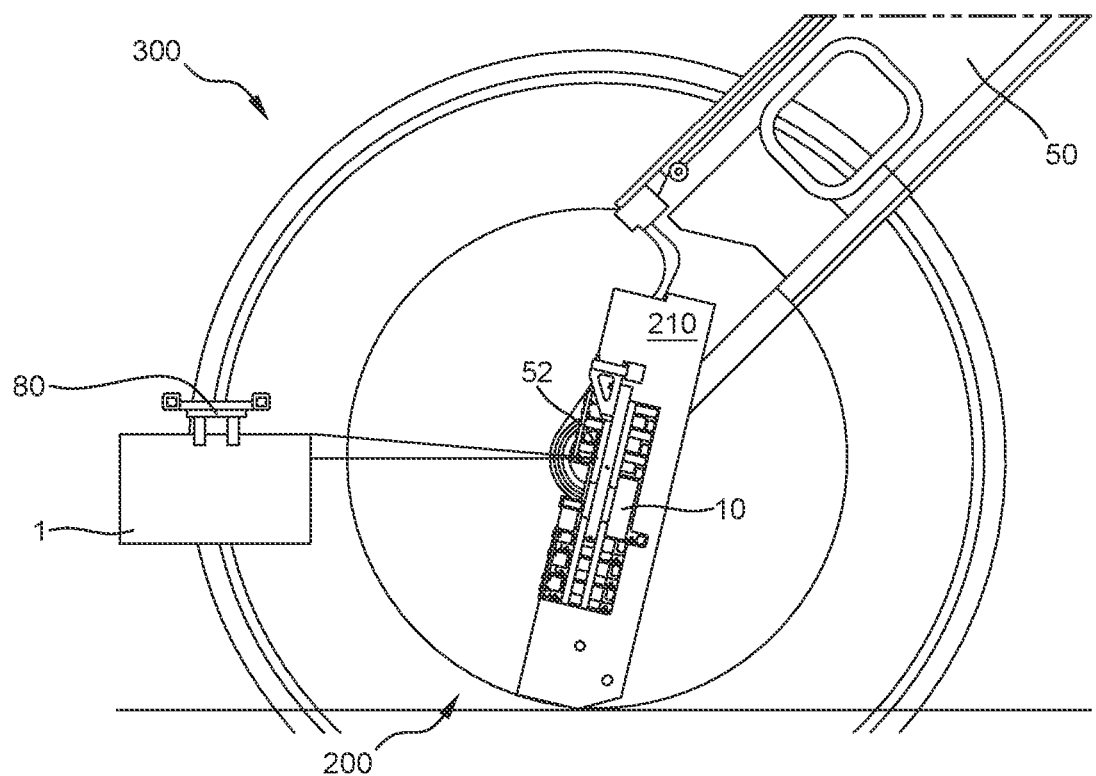
Figure 7F:
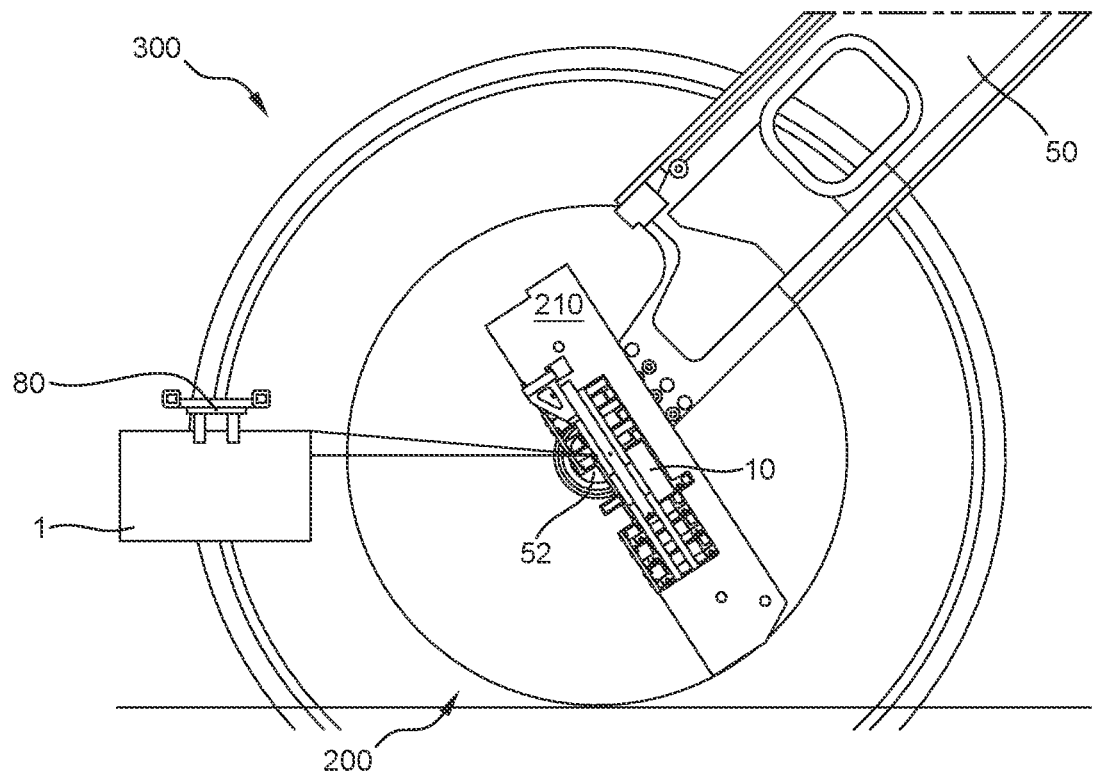
Figure 7G:
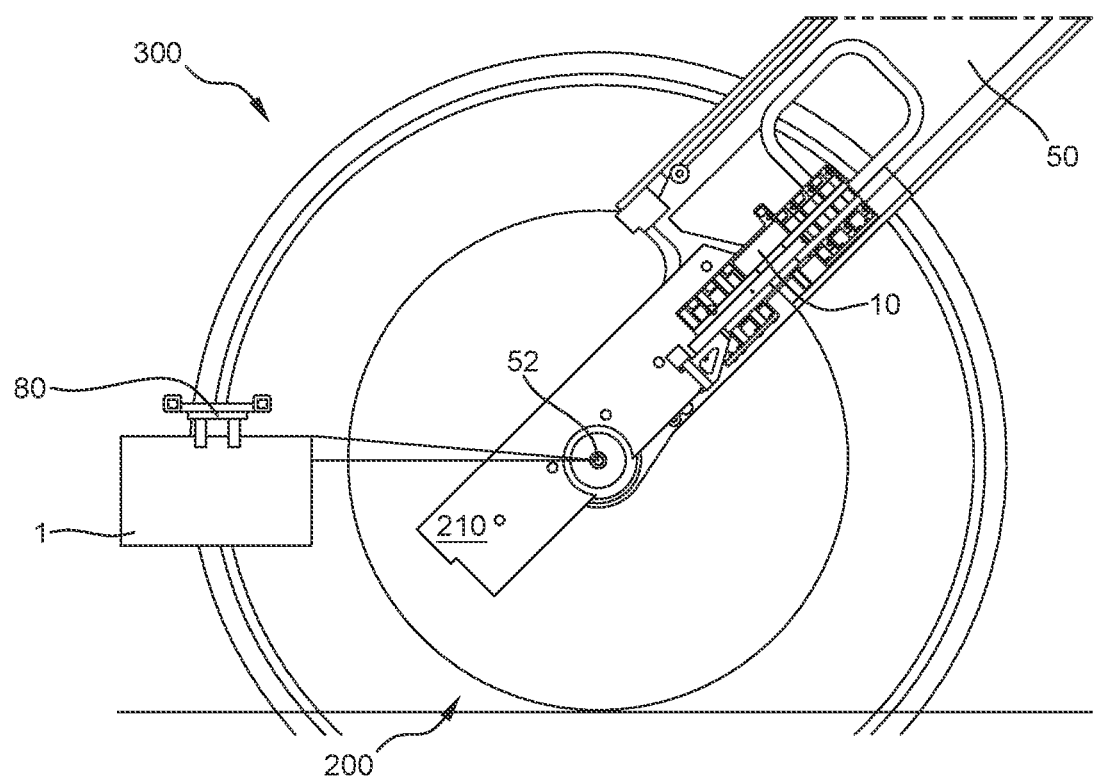
Figure 7H:
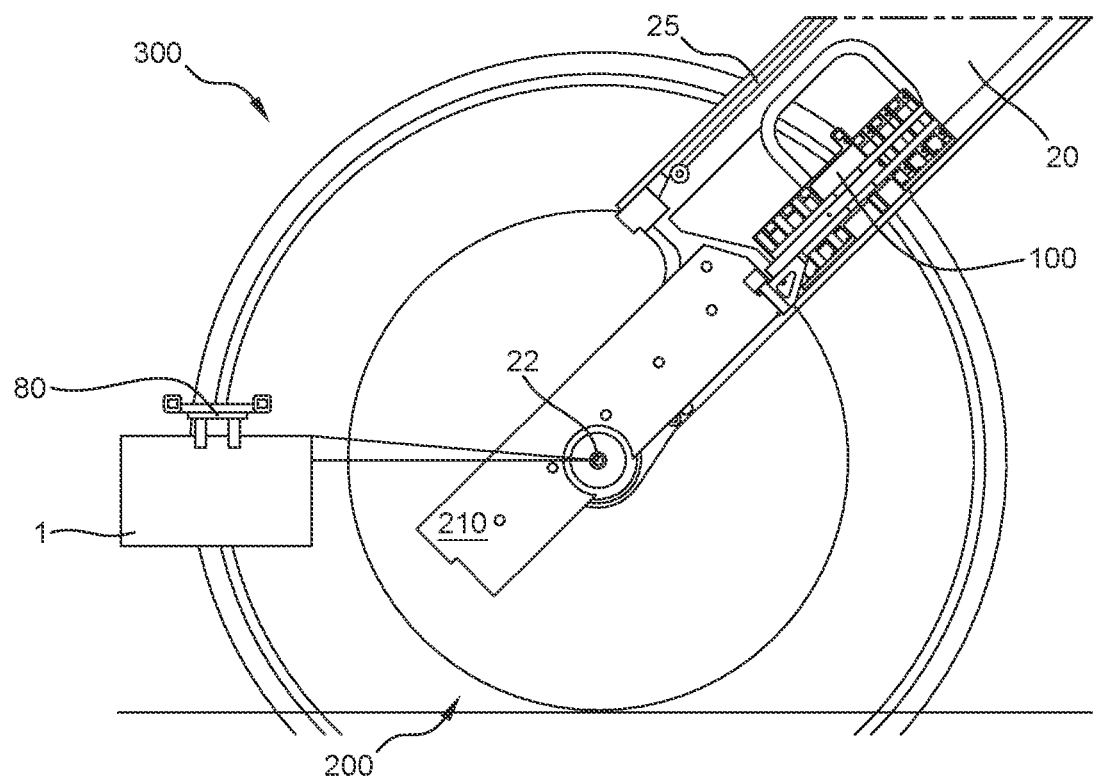
Figure 7I:
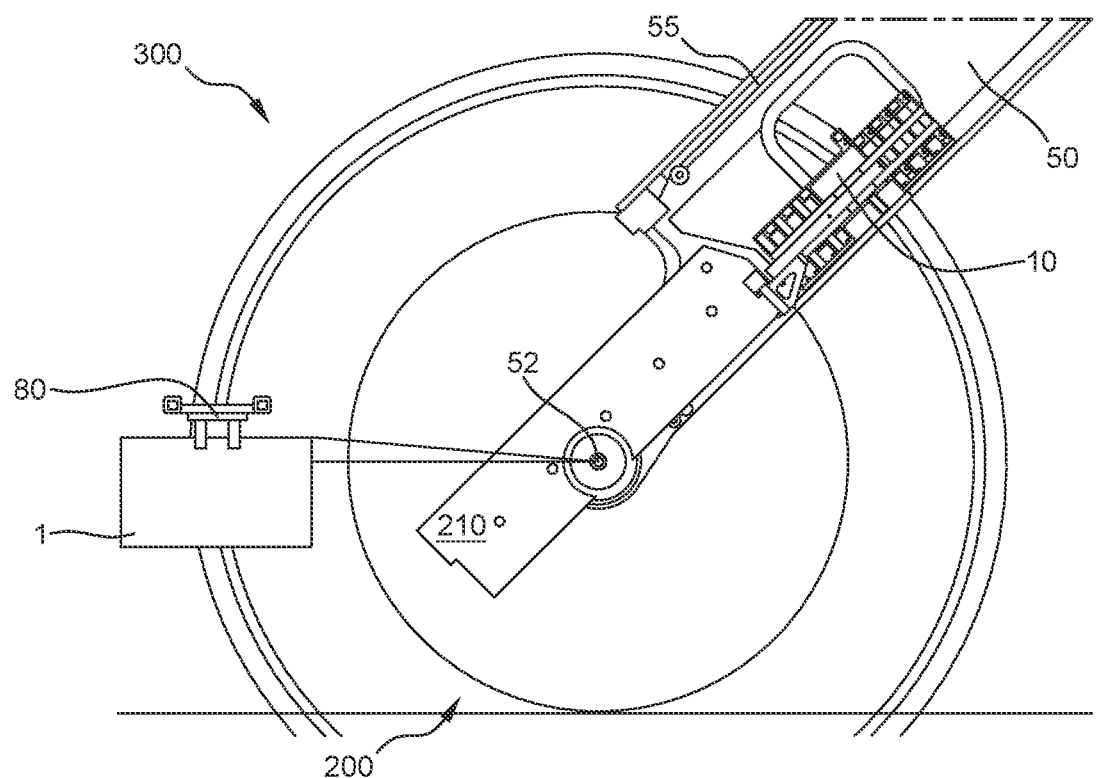
Figure 7J:
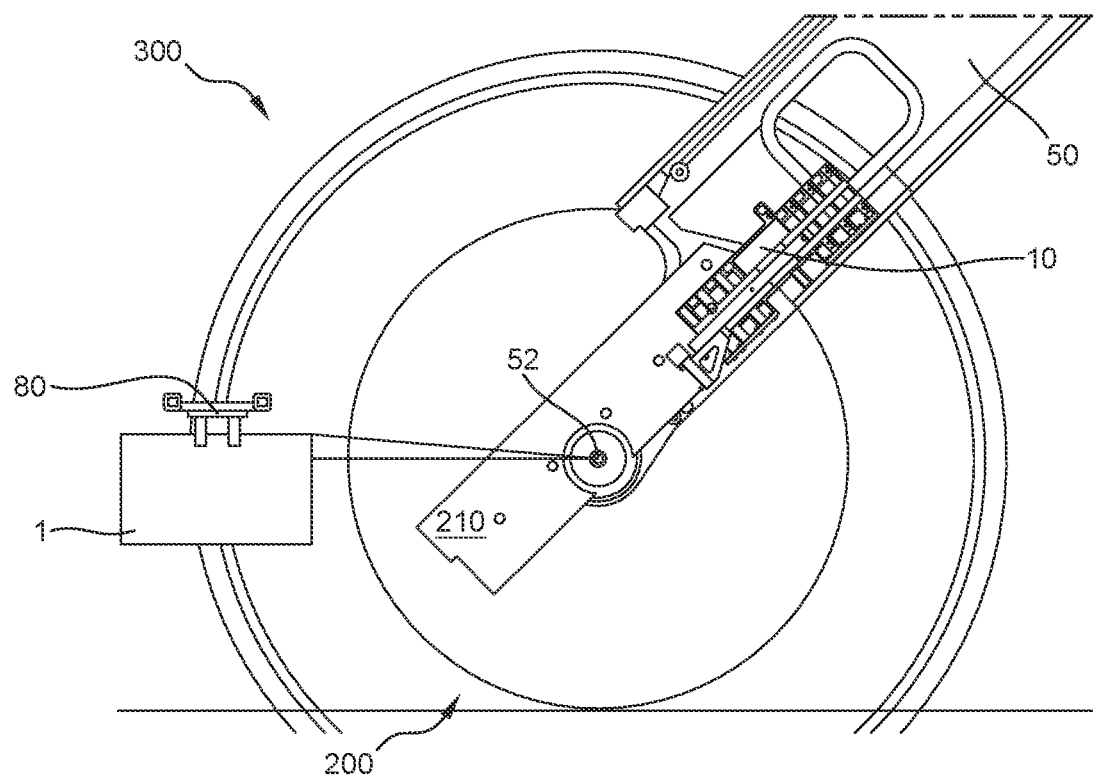
Figure 7K:
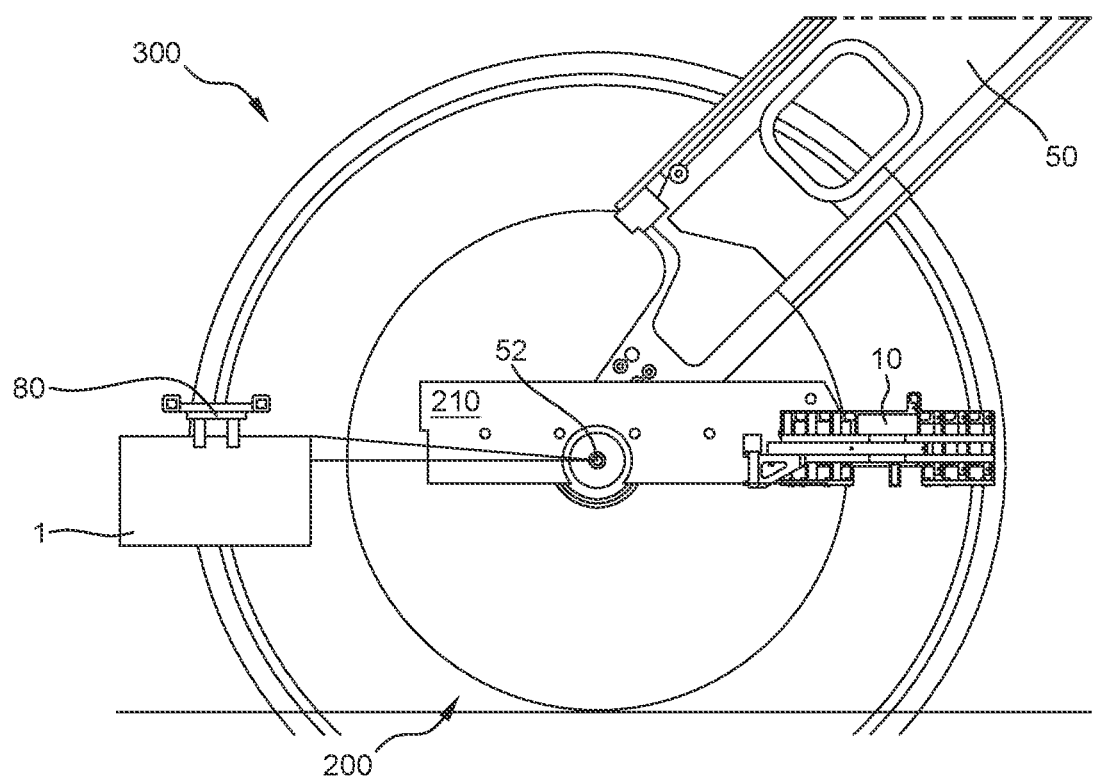
Figure 7L:
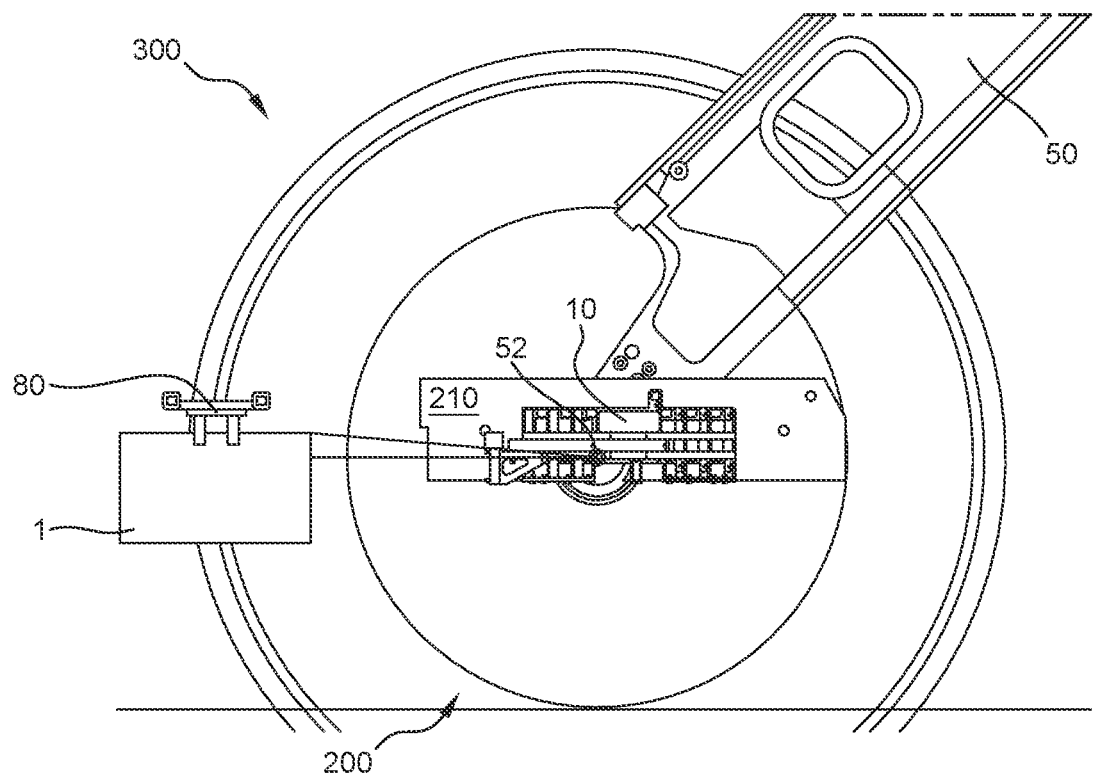
Figure 7M:
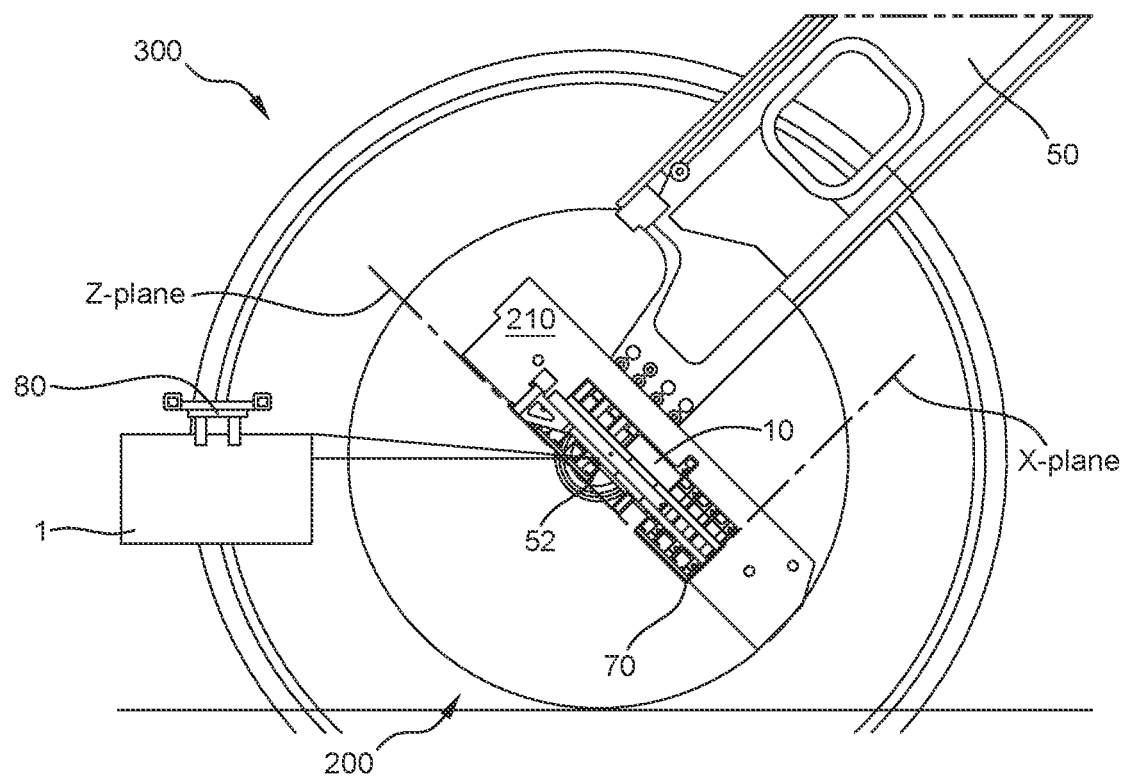
Figure 7N:
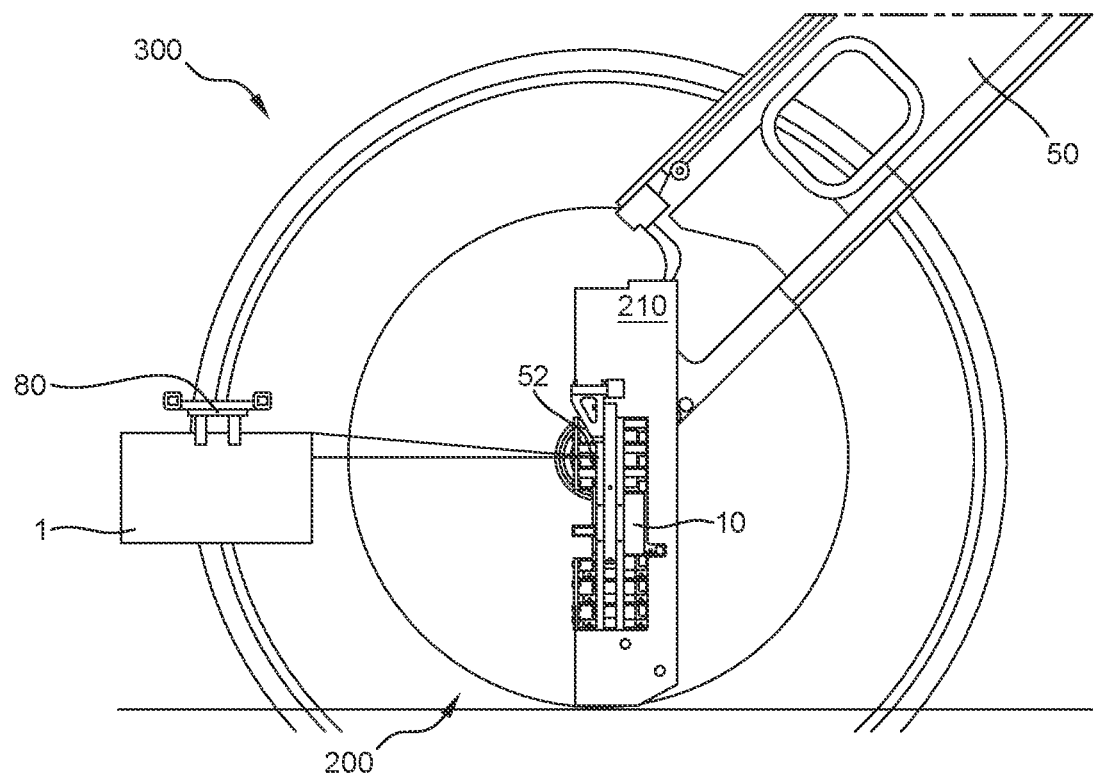
Figure 7O:
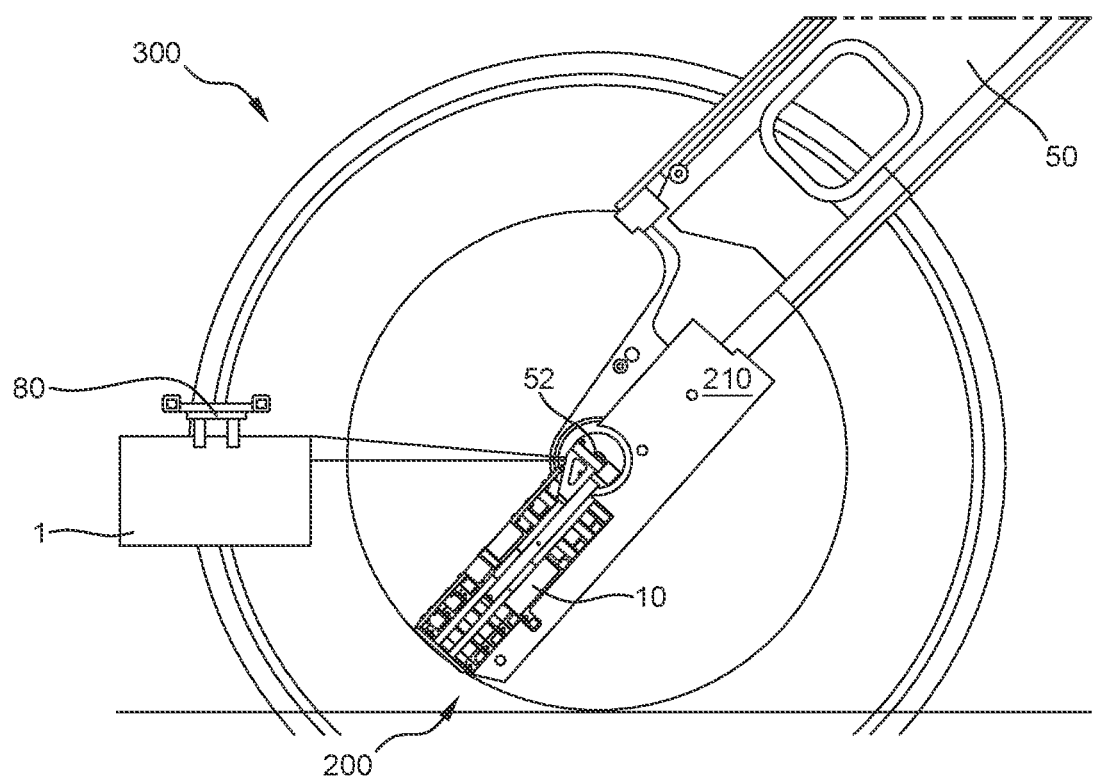
Figure 7P:
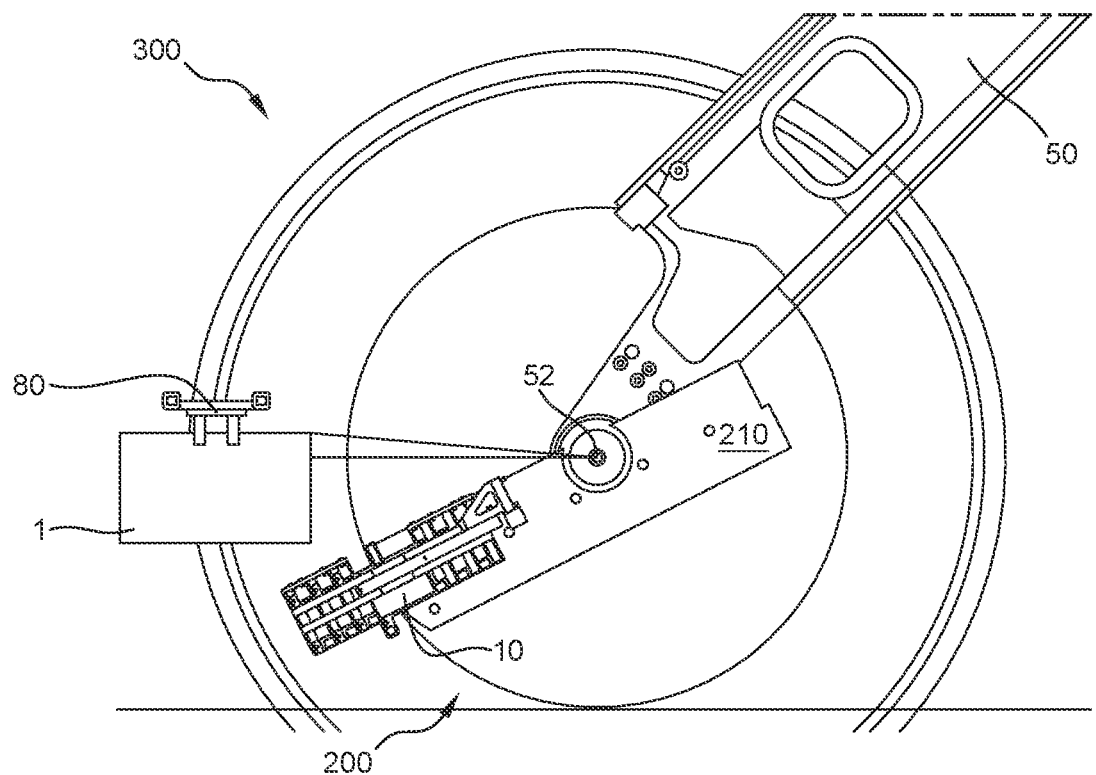
Figure 7Q:
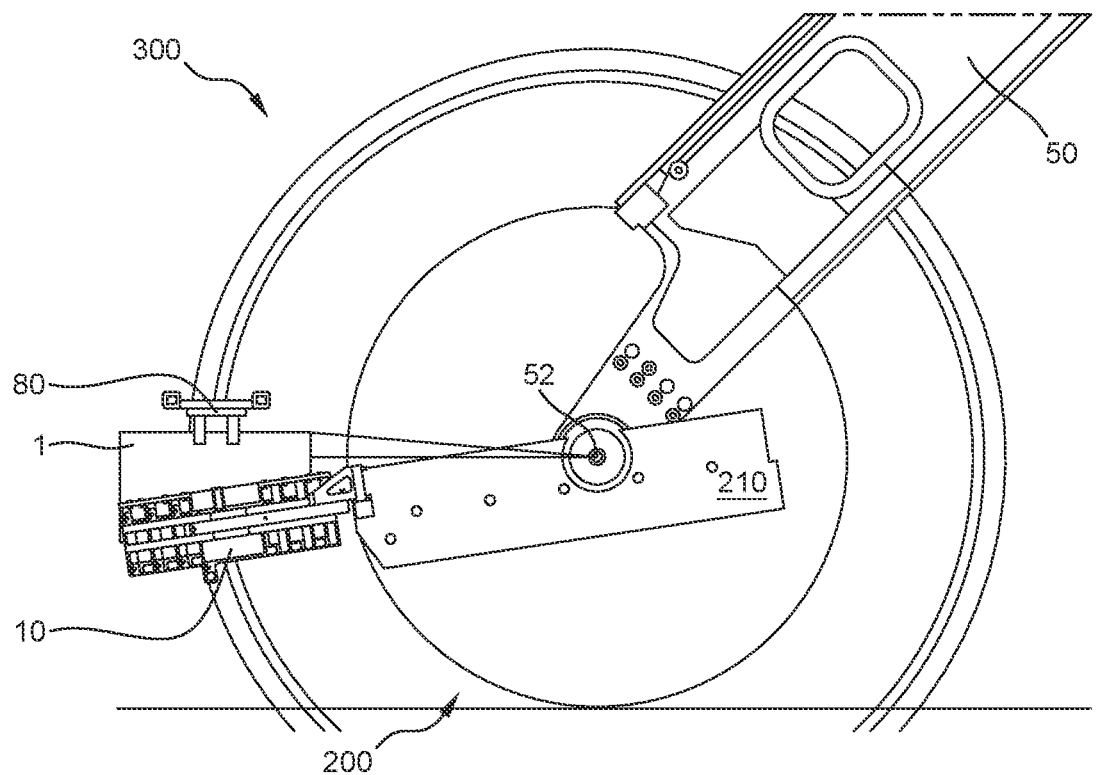

Referring now to FIGS. 7A to 7Q, the controlled operation of the block transfer apparatus 200 shall be described in the context of a block delivery system 300 for delivering blocks for placement during construction of a building structure.

In this example, operation of the block transfer between the downstream and upstream clamps 55, 80 of the block delivery system 300 via the block transfer apparatus 200 shall be described. In FIG. 7A, a block 1 is being transferred to the downstream clamp 80 which is a robotic gripper of a robotic block placement arm (not shown). As soon as the downstream clamp 80 has gripped the block 1, the clamping assembly 10 of the block transfer apparatus 200 may release the block. In this block handover position, the block transfer apparatus 200 is in a horizontal orientation with the clamping assembly 10 fully extended in the longitudinal direction.

In FIG. 7B, the block transfer apparatus 200 releases the block and begins to rotate away from the downstream clamp 80 about support 52 which is a mount at the distal end of boom 50, the support 52 defining a rotation or pivot axis about which the block transfer apparatus 200 is able to pivot. In this initial phase of rotation, the clamping assembly 10 remains at full extension.

In FIG. 7C, as rotation of the block transfer apparatus 200 continues, the clamping assembly 10 begins to retract and move linearly along rails of the frame or bracket 210 of the block transfer apparatus 200. In FIG. 7D, retraction of the clamping assembly 10 continues whilst the block transfer apparatus 200 is rotating and in this state the clamping assembly 10 is now retracted sufficiently to be within the envelope of the frame or bracket 210.

In FIG. 7E, the clamping assembly 10 is shown fully retracted with respect to frame 210 as the block transfer apparatus 200 approaches a nearly vertical orientation. In FIG. 7F, the block transfer apparatus 200 has rotated past vertical and the clamping assembly 10 has begun to extend away from its fully retracted position. In this state, the orientation of the clamping assembly 10 has "flipped" over from the initial orientation shown in FIG. 7A.

The block transfer apparatus 200 continues rotation until the longitudinal axis of the frame 210 is aligned with the lengthwise direction of the boom 50 as shown in FIG. 7F. In this state, the clamping assembly 10 is nearly fully extended so as to reach into the opening 51 of the distal end of the boom 50. Typically, there is a recess or cut-out in the underside portion of the distal end of the boom so that the block transfer apparatus 200 can enter the envelope of the boom without any physical clash. Depending on the size of the cut-out, the clamping assembly 10 may be able to reach full extension during rotation. Otherwise, the block transfer apparatus 200 rotates into alignment with the boom 50 first and then extends the clamping assembly 10 into the boom 50.

As shown in FIG. 7H, the clamping assembly 10 is then fully extended into a position whereby it clamps a block held by the downstream clamp 55 disposed inside the boom 50. The downstream clamp 55 typically forms part of a shuttle mechanism that delivers blocks internally through the boom 50. Once the clamping assembly 10 has clamped the block, the downstream clamp 55 may release its grip of the block. It is to be understood that the position of the block with respect to the gripper jaws of the clamping assembly 10 is not precisely known at this stage.

In FIGS. 7I and 7J, the clamping assembly 10 is shown beginning to retract away from its fully extended position whilst the frame 210 remains in alignment with the boom 50. In FIG. 7J, the clamping assembly 10 has retracted sufficiently so that it is within the cut-out portion of the underside of the distal end of the boom in a safe position for rotation of the block transfer apparatus 200 to begin.

In FIG. 7K, the block transfer apparatus 200 is rotated to a horizontal orientation whilst the clamping assembly 10 remains in an extended state (retracted only a sufficient amount to clear the distal end of the boom upon exit thereof). An adhesive applicator (see FIG. 2A) mounted to the block transfer apparatus 200 then begins dispensing adhesive onto an upper face of the block whilst the clamping assembly 10 retracts the block and thereby translates it linearly beneath nozzles of the adhesive applicator. Once the adhesive dispensing is complete and when the clamping assembly 10 is nearly fully retracted as shown in FIG. 7L the block transfer apparatus 200 rotates to a drop position in which the block is datumed.

The drop position is shown in FIG. 7M. In this example, the block transfer apparatus 200 and clamping assembly 10 are oriented at an angle to the ground of approximately 45 degrees. In this position, the clamping assembly 10 releases its clamp of the block and allows it to drop under gravity into the wedge 70 defined by the first and second datum surfaces as previously described which thereby datums the block in the clamping assembly 10 with respect to the X and Z planes as shown. Once the drop has been performed and the block is datumed in these planes, the gripper jaws of the clamping assembly 10 re-clamp the block to thereby locate the block in a third plane orthogonal to both the first and second planes to thereby fully datum the position of the block with respect to the clamping assembly 10.

After the drop is complete and the block is re-clamped in the gripper jaws, the block transfer apparatus 200 commences further rotation at a safe speed as shown in FIG. 7N. The block transfer apparatus 200 continues to rotate whilst the clamping assembly 10 is extended to the edge of the frame 210 as shown in FIG. 7O. Rotation speed is then decreased whilst the clamping assembly 10 continues to extend beyond the frame 210 as shown in FIG. 7P.

In FIG. 7Q, the final stage of rotation of the block transfer apparatus 200 and extension of the clamping assembly 10 is completed resulting in the block being held out in a substantially horizontal position for transfer to the upstream clamp 80 as shown in FIG. 7A. The cycle then repeats as further blocks are transferred by the block delivery system for laying by the robotic placement arm on a construction site in order to construct a building. It is to be noted that in the transfer position shown in FIG. 7A, the clamping assembly 10 has been flipped 180 degrees from its orientation when adhesive was applied to the block in FIG. 7L. As such the block is now oriented in the clamping assembly 100 such that the face with adhesive applied is now facing downward ready for laying.

A second example of a block transfer apparatus 500 shall now be described with reference to FIGS. 8A to 8D and 9A to 9F.

In this example, the block transfer apparatus 500 is for transferring a block 1 between an upstream clamp (not shown) of a block delivery system and a downstream clamp 80 of the block delivery system. The block transfer apparatus 500 includes a frame 510 pivotally mounted to a support and a clamping assembly 400 mounted to the frame 510 and linearly extendable relative thereto, the clamping assembly 400 including a pair of gripper jaws 420, 430 for clamping opposing sides of the block.

The block transfer apparatus 500 is configured to receive a block 1 from the upstream clamp, wherein the block 1 is initially clamped in the gripper jaws 420, 430 in an approximate position; rotate to a drop position whereby the gripper jaws 420, 430 release the block 1 and allow it to self-datum onto first and second orthogonal datum surfaces 424, 434 and 518 to thereby register an end and top or bottom face of the block in corresponding first and second orthogonal planes; re-clamp the block 1 after the drop by applying a clamping force to opposing sides of the block so as to register the block 1 against a third datum surface 422, 423 defining a third plane orthogonal to both the first and second planes to thereby datum the position of the block 1 with respect to the clamping assembly 400; and, present the block 1 clamped in the datumed position for transfer to the downstream clamp 80.

In this example, the clamping assembly 400 includes a frame 411 to which the gripper jaws 420, 430 are slidably mounted onto rails 441, 442 via bearing blocks or rail guides for linear movement in a lateral direction in order to open and close the jaws. The jaws 420, 430 may be belt driven by a servo motor that turns a lead screw 443 connecting the jaws to thereby move the jaws along the rails 441, 442 in order to apply and release a clamping force to a block.

The first gripper jaw 420 includes two rows of spaced apart gripper pads 422, 423 rigidly mounted to an inner face 421 along the length of the first gripper jaw 420, whilst the second gripper jaw 430 includes a single row of spaced apart gripper pads 431, 431' mounted to a distal end of flexible fingers or battens 432, 432' along the length of second gripper jaw 430. The gripper pads exert a clamping force onto a block when clamped and are arranged so that the gripper pads 431, 431' of the second gripper jaw 430 urge the block into planar alignment in a Y-plane defined by the gripper pads 422, 423 of the first gripper jaw 420 in contact with the block. In this regard, the single row of gripper pads 431, 431' of the second gripper jaw 430 are typically located approximately midway between the height of the two rows defined respectively by gripper pads 422, 423 of the first gripper jaw 420. This arrangement prevents angular misalignment or twisting of the block in the jaws.

The flexible finger members or battens 432, 432' spaced apart along the length of the second gripper jaw 430, allow the pads 431, 431' to flex laterally and compensate for variations in flatness of the side of the block along its length (which may for instance be slightly bowed) as well as any lateral flex in the gripper jaws themselves. This ensures an equal clamping force is applied along the length of the block as each finger will flex to a different degree depending on the variation in flatness. Some of the flexible fingers 432' are partially restrained by retaining clips 433 that act to pretension the finger members. Each flexible finger is located at its base into a recessed portion 436 of the second gripper jaw 430.

The block transfer apparatus 500 further includes a lengthwise extending frame 510 to which the clamping assembly 400 is translatably mounted for linear extension and retraction therealong about rails 515, 516. Rail guides or bearing blocks mounted to the frame 411 of the clamping assembly 400 receive the rails 515, 516 therein and the clamping assembly 400 is belt driven along the rails by servo motor 520. In use, the block transfer apparatus 500 is pivotally mounted to a support (such as a distal end of a boom) to enable controlled rotation about pivot axis P. In the example shown, the frame 510 has structural cross bracing support 512 attached thereto and a pivot mount 513 is provided on this support. On the opposing side, a pivot mount 514 which may be in the form of a high precision reduction gearing is provided mounted to the frame 510. Additionally, a datum bar or plate 517 is mounted to the structural support 512 so that it extends in a direction parallel to the lengthwise direction of the gripper jaws 420, 430. This datum bar 517 is used to datum the top or bottom face of the block as will be described in further detail below. In this example, the distal ends 424, 434 of the gripper jaws provide datum surfaces which register an end face of the block.

Referring now to FIGS. 9A to 9F, the controlled operation of the block transfer apparatus 500 shall be described in the context of a block delivery system for delivering blocks for placement during construction of a building structure.

In this example, operation of the block transfer between the downstream and upstream clamps of the block delivery system via the block transfer apparatus 500 shall be described.

Figure 9A:
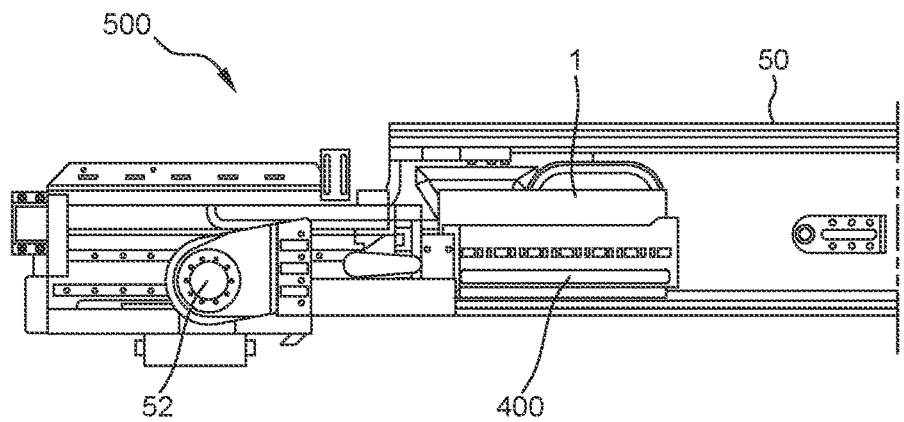
FIGS. 9A to 9F provide a detailed sequence of schematic views of the block transfer apparatus of FIG. 8A illustrating controlled movements thereof.

In FIG. 9A, the block transfer apparatus 500 is shown with its clamping assembly 400 extended out and reaching into a boom 50 to receive a block 1 from a downstream clamp (not shown) such as a shuttle clamp that runs along the boom element 50. In this example, the clamping assembly 400 has been rotated about axis 52 in a counter-clockwise direction through a recess or cut-out in the underside portion of the distal end of the boom so that the block transfer apparatus 500 can enter the envelope of the boom without any physical clash. Depending on the size of the cut-out, the clamping assembly 400 may be able to reach full extension during rotation. Otherwise, the block transfer apparatus 500 rotates into alignment with the boom 50 first and then extends the clamping assembly 400 into the boom 50. Once the clamping assembly 400 has clamped the block, the downstream clamp may release its grip of the block. It is to be understood that the position of the block with respect to the gripper jaws of the clamping assembly 400 is not precisely known at this stage.

Figure 8A:
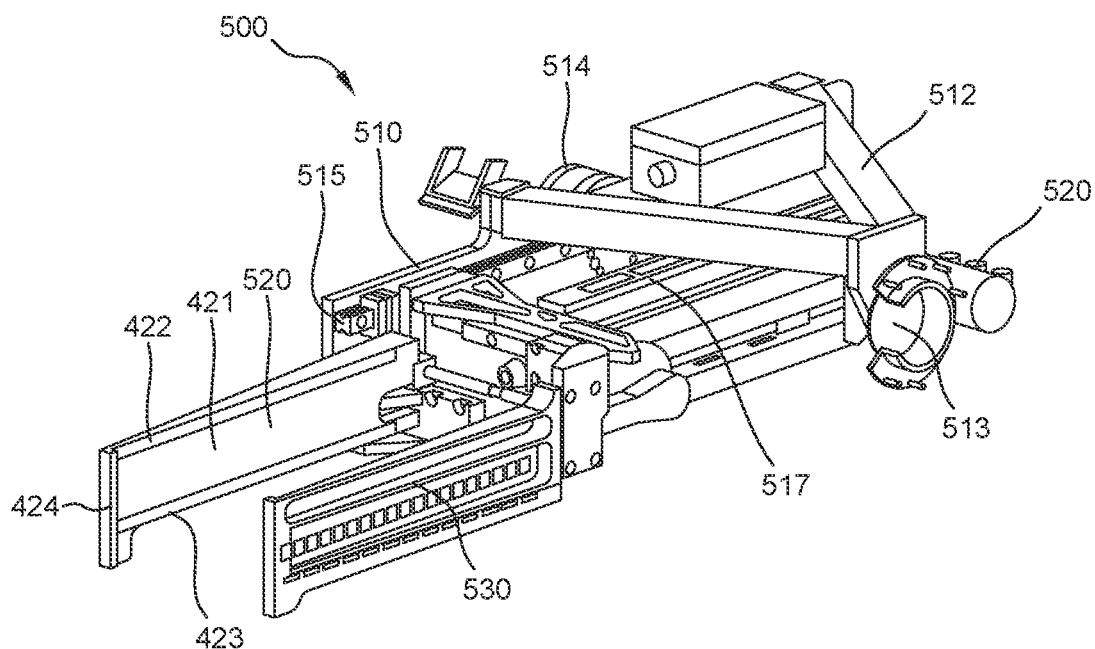
FIG. 8A is a perspective view of a further example of a block transfer apparatus.
Figure 8B:
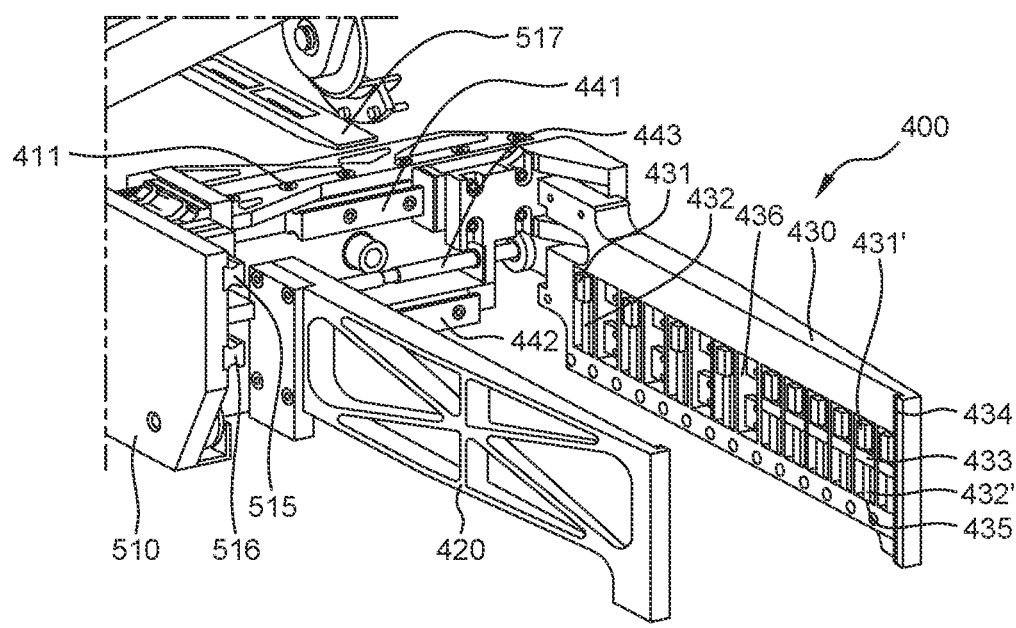
FIG. 8B is a further perspective view of the block transfer apparatus of FIG. 8A.
Figure 8C:
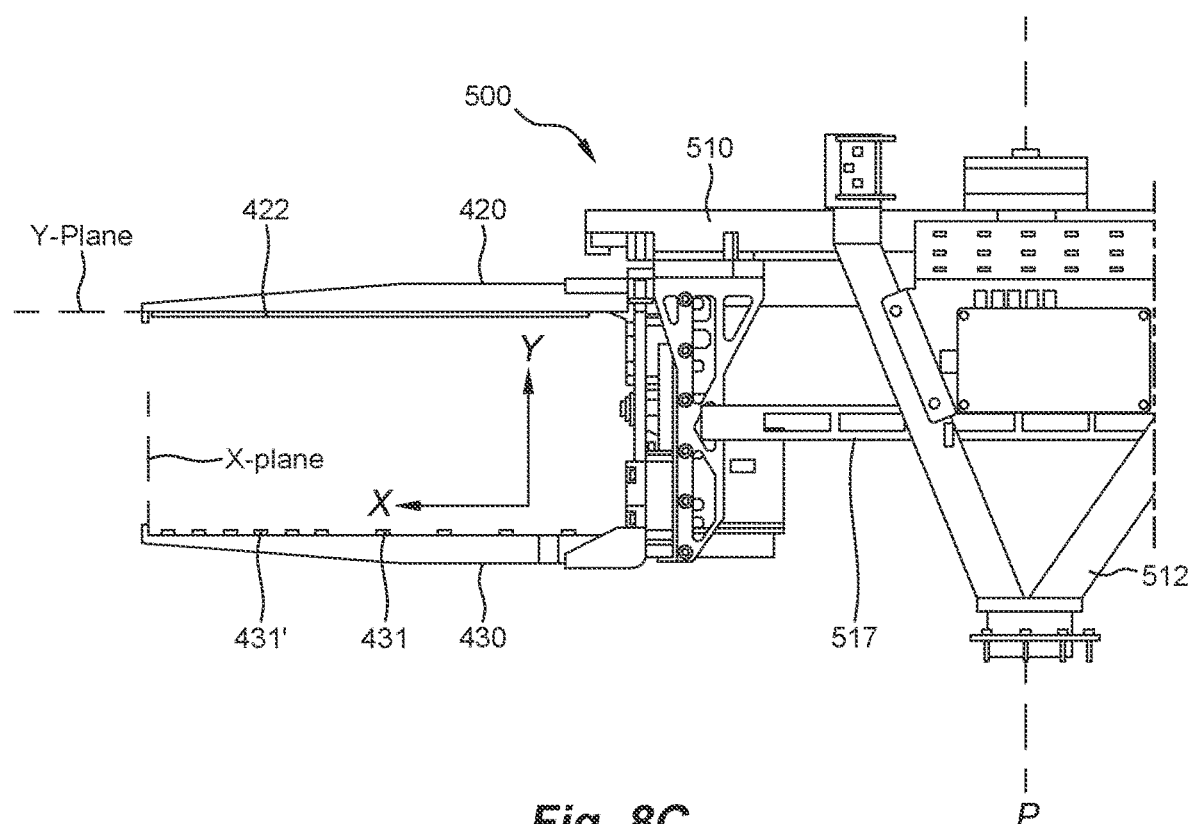
FIG. 8C is a top view of the block transfer apparatus of FIG. 8A.
Figure 8D:
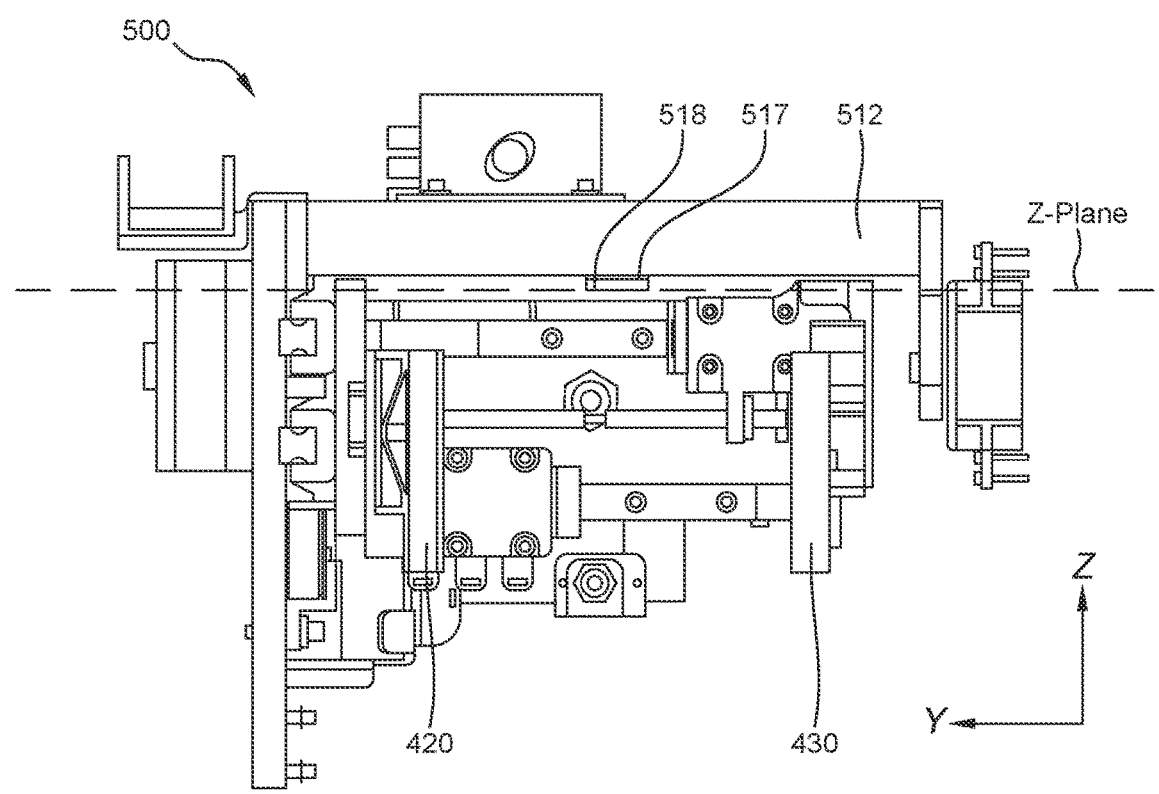
FIG. 8D is a front view of the block transfer apparatus of FIG. 8A.
Figure 9B:
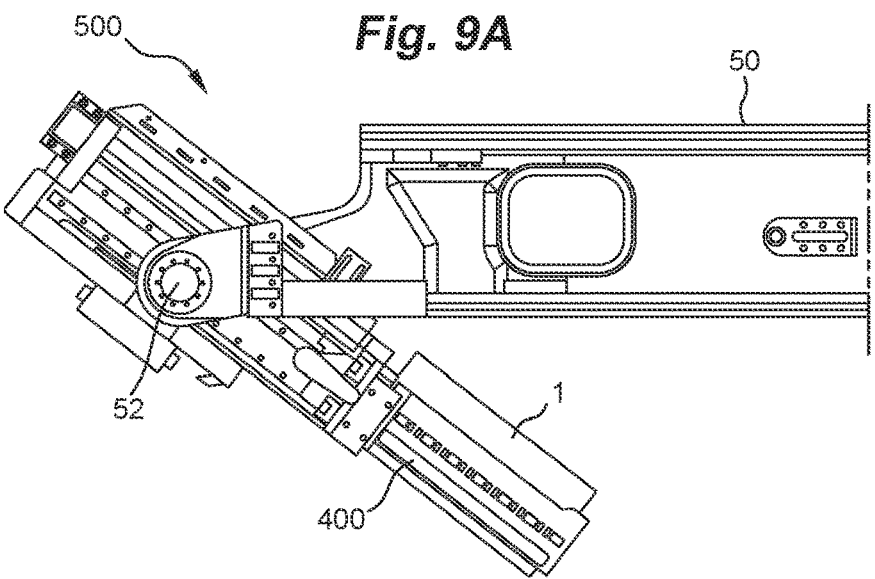
Figure 9C:
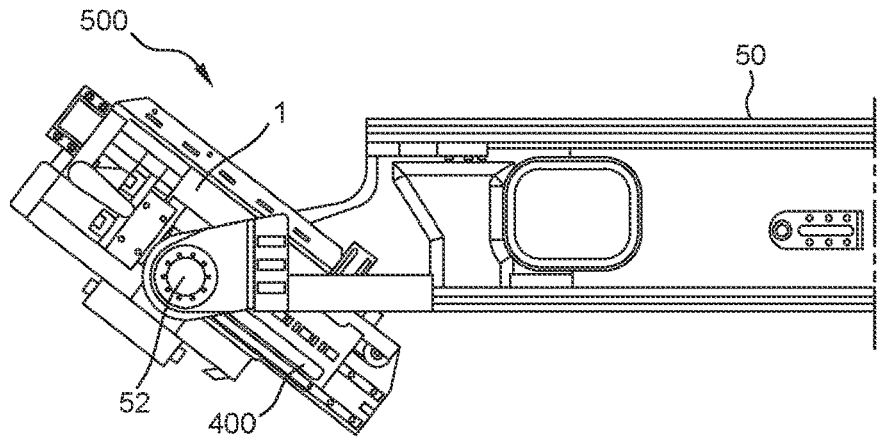
Figure 9D:
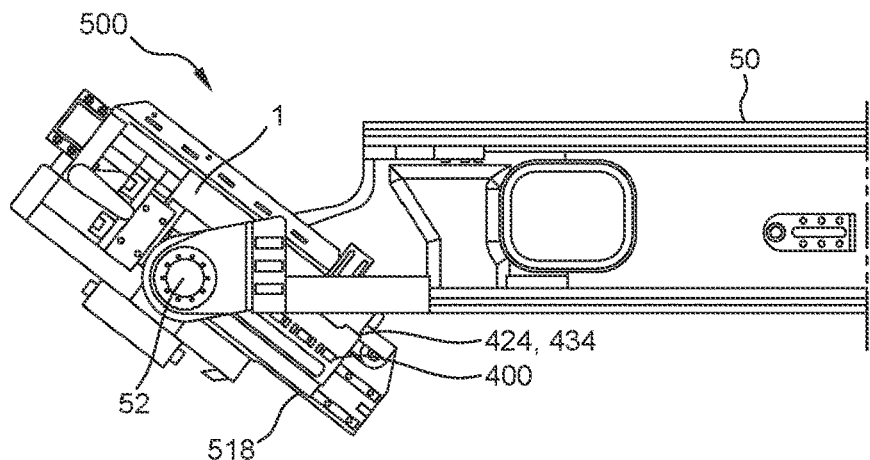

In FIGS. 9B and 9C, the clamping assembly 400 is shown rotating out of the boom in a clockwise direction and starting to retract away from its fully extended position in preparation for the block datuming operation. In FIG. 9D, when the block transfer apparatus 500 is in the drop position (oriented at an angle to the ground of approximately 45 degrees), the clamping assembly 400 releases its clamp of the block and allows it to drop under gravity so that the block self-datums onto first and second orthogonal datum surfaces (424, 434) and 518 to thereby register an end and top or bottom face of the block in corresponding first and second orthogonal planes. This datums the blocks with respect to the X and Z planes as depicted in FIGS. 8C and 8D. Once the drop has been performed and the block is datumed in these planes, the gripper jaws of the clamping assembly 400 re-clamp the block by applying a clamping force to opposing sides of the block so as to register the block against a third datum surface defining a third plane (Y plane) orthogonal to both the first and second planes to thereby datum the position of the block with respect to the clamping assembly 400.

Figure 9E:
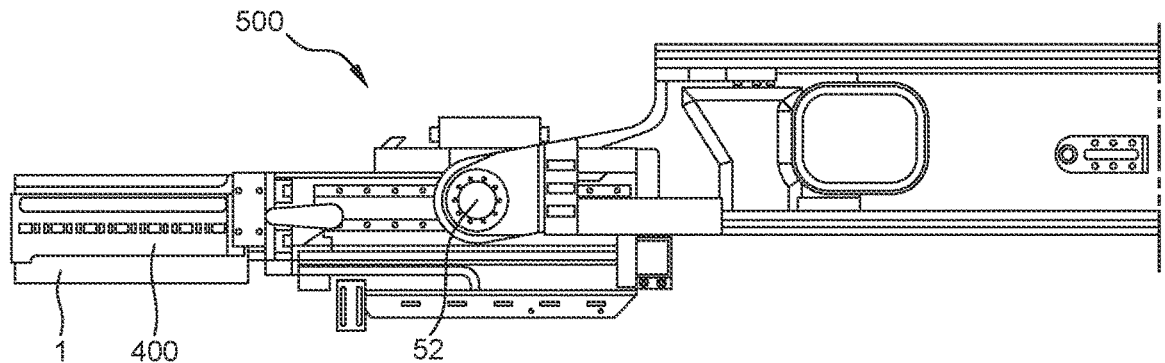
Figure 9F:
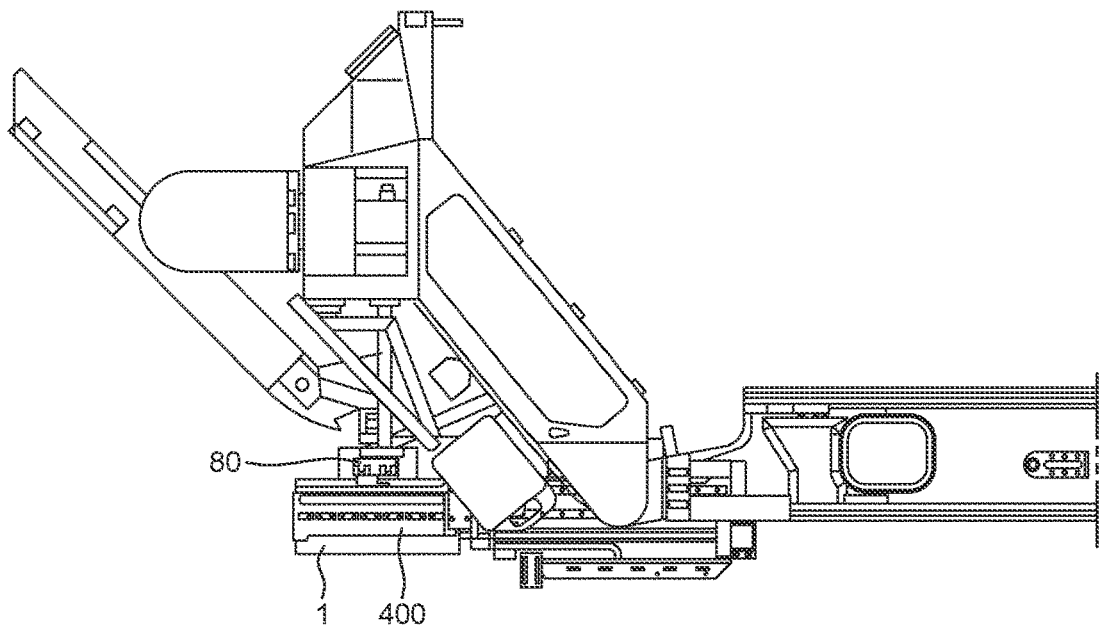
Figure 10A:
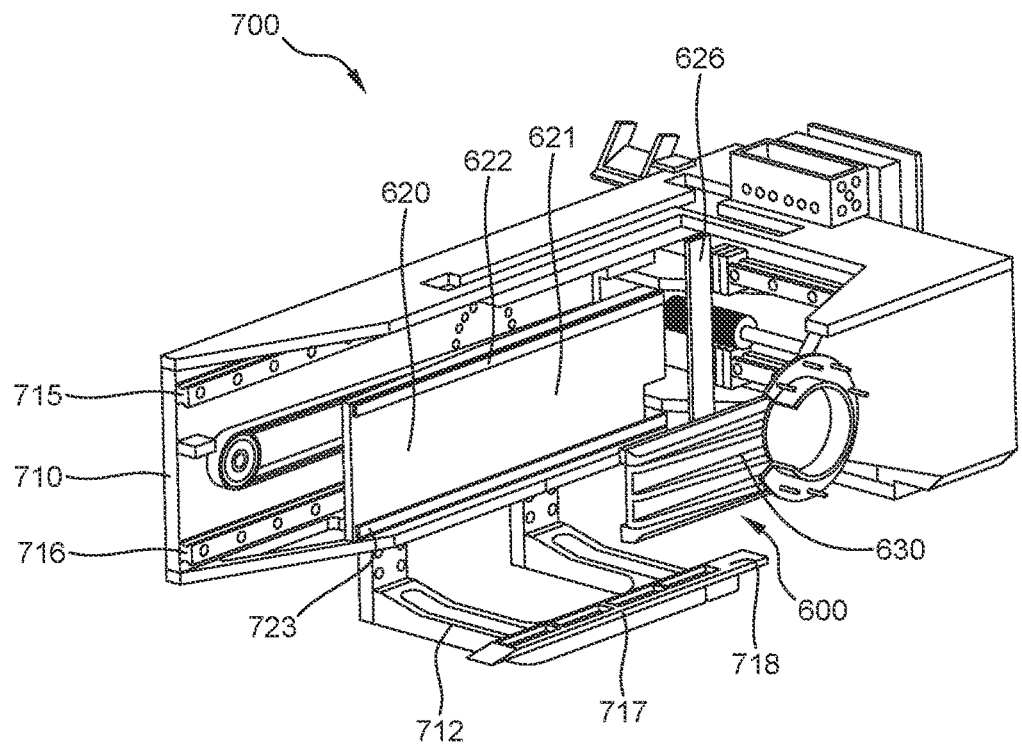
FIG. 10A is a perspective view of a further example of a block transfer apparatus.
Figure 10B:
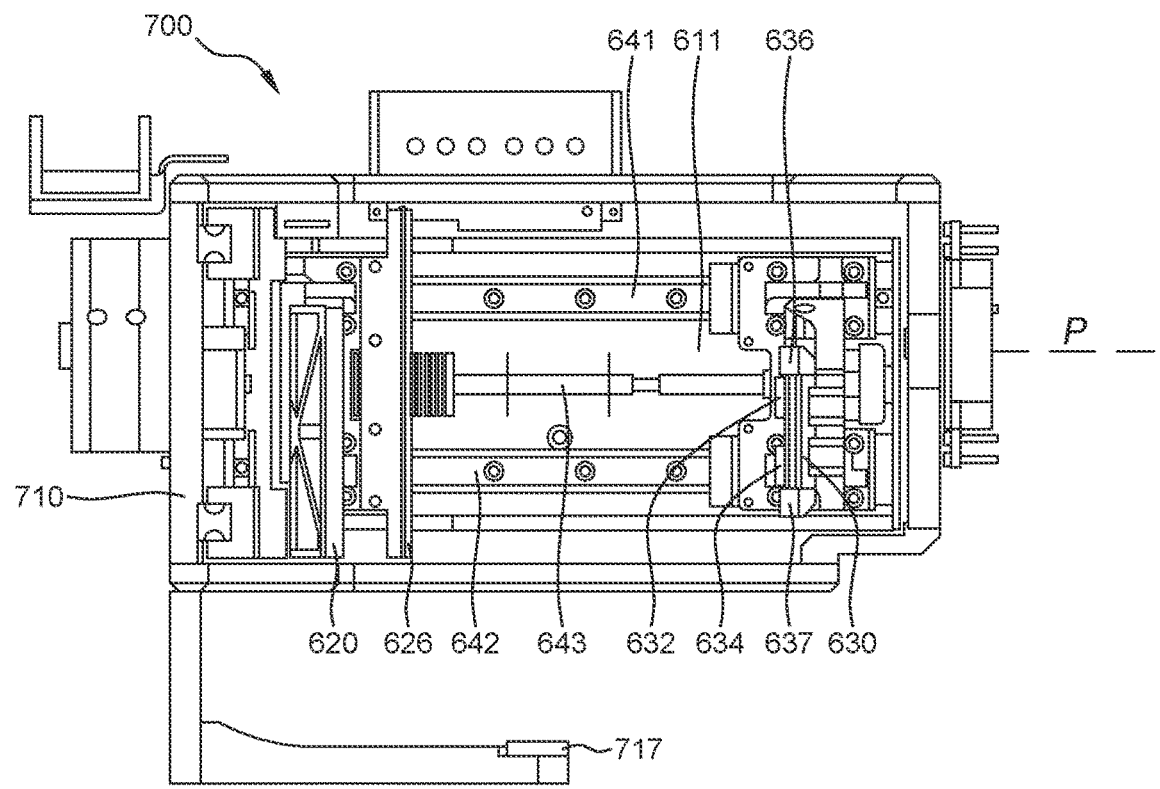
FIG. 10B is a front view of the block transfer apparatus of FIG. 10A.
Figure 10C:
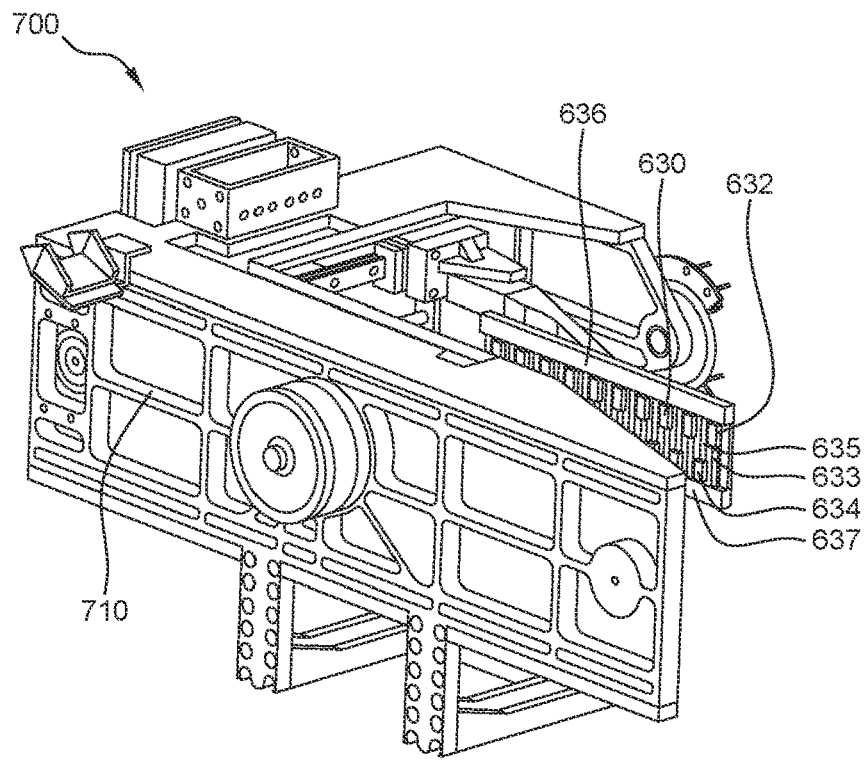
FIG. 10C is a further perspective view of the block transfer apparatus of FIG. 10A; and, FIGS. 11A to 11E provide a detailed sequence of schematic views of the block transfer apparatus of FIG. 10A illustrating controlled movements thereof.

After the drop is complete and the block is re-clamped in the gripper jaws, the block transfer apparatus 500 commences further rotation in a clockwise direction whilst concurrently extending the clamping assembly 400 out in a horizontal disposition as shown in FIG. 9E. In this example, during extension, the block may be translated over a transfer adhesive applicator to apply adhesive to the bottom surface of the block. In this position, the block is held out for transfer to the upstream clamp 80 (e.g. end effector of robotic block placement arm) as shown in FIG. 9F from which it is subsequently laid in position.

A third example of a block transfer apparatus 700 shall now be described with reference to FIGS. 10A to 10C and 11A to 11E.

In this example, the block transfer apparatus 700 is for transferring a block 1 between an upstream clamp of a block delivery system and a downstream clamp of the block delivery system as previously described. The block transfer apparatus 700 includes a frame 710 pivotally mounted to a support and a clamping assembly 600 mounted to the frame 710 and linearly extendable relative thereto, the clamping assembly 600 including a pair of gripper jaws 620, 630 for clamping opposing sides of the block.

The block transfer apparatus 700 is configured to receive a block 1 from the upstream clamp, wherein the block 1 is initially clamped in the gripper jaws 620, 630 in an approximate position; rotate to a drop position whereby the gripper jaws 620, 630 release the block 1 and allow it to self-datum onto first and second orthogonal datum surfaces 626, 718 to thereby register an end and top or bottom face of the block in corresponding first and second orthogonal planes; re-clamp the block 1 after the drop by applying a clamping force to opposing sides of the block so as to register the block 1 against a third datum surface 622, 623 defining a third plane orthogonal to both the first and second planes to thereby datum the position of the block 1 with respect to the clamping assembly 600; and, present the block 1 clamped in the datumed position for transfer to the downstream clamp.

In this example, the clamping assembly 600 includes a frame 611 to which the gripper jaws 620, 630 are slidably mounted onto rails 641, 642 via bearing blocks or rail guides for linear movement in a lateral direction in order to open and close the jaws. The jaws 620, 630 may be belt driven by a servo motor that turns a lead screw 643 connecting the jaws to thereby move the jaws along the rails 641, 642 in order to apply and release a clamping force to a block.

The first gripper jaw 620 includes two rows of spaced apart gripper pads 622, 623 rigidly mounted to an inner face 621 along the length of the first gripper jaw 620, whilst the second gripper jaw 630 includes two rows of spaced apart gripper pads 632, 634 mounted to a distal end of flexible fingers or battens 633,635 along the length of second gripper jaw 630. The gripper pads exert a clamping force onto a block when clamped and are arranged so that the gripper pads 632, 634 of the second gripper jaw 630 urge the block into planar alignment in the third datum plane defined by the gripper pads 622, 623 of the first gripper jaw 620 in contact with the block. In this regard, the two rows of gripper pads 632, 634 of the second gripper jaw 630 are close together and are typically located approximately midway between the height of the two rows defined respectively by gripper pads 622, 623 of the first gripper jaw 420. This arrangement prevents angular misalignment or twisting of the block in the jaws.

The flexible finger members or battens 633, 635 spaced apart along the length of the second gripper jaw 430, allow the pads 634, 636 to flex laterally and compensate for variations in flatness of the side of the block along its length (which may for instance be slightly bowed). This ensures an equal clamping force is applied along the length of the block as each finger will flex to a different degree depending on the variation in flatness. Each flexible finger is located at its base into a respective upper and lower cap 636, 637 mounted along respective top and bottom edges of the second gripper jaw 430 so as to pretension the gripper pads. In this arrangement, the gripper pads 432, 434 alternate in position between the first and second rows.

The block transfer apparatus 700 further includes a lengthwise extending frame 710 to which the clamping assembly 600 is translatably mounted for linear extension and retraction therealong about rails 715, 716. Rail guides or bearing blocks mounted to the frame 611 of the clamping assembly 600 receive the rails 715, 716 therein and the clamping assembly 600 is belt driven along the rails by a servo motor. In use, the block transfer apparatus 700 is pivotally mounted to a support (such as a distal end of a boom) to enable controlled rotation about pivot axis P. In the example shown, the frame 710 has U-shaped support 712 mounted to the frame 710 to which a datum bar or plate 717 is mounted so that it extends in a direction parallel to the lengthwise direction of the gripper jaws 620, 630. This datum bar 717 is used to datum the top or bottom face of the block as will be described in further detail below. In this example, a datum bracket 626 is mounted to a proximate end of the support structure of gripper jaw 620 and this bracket provides a datum surface which registers an end face of the block. In other examples, another datum bracket 626 could be installed in a similar manner in association with gripper jaw 630.

Referring now to FIGS. 11A to 11E, the controlled operation of the block transfer apparatus 700 shall be described in the context of a block delivery system for delivering blocks for placement during construction of a building structure.

In this example, operation of the block transfer between the downstream and upstream clamps of the block delivery system via the block transfer apparatus 700 shall be described.

Figure 11A:
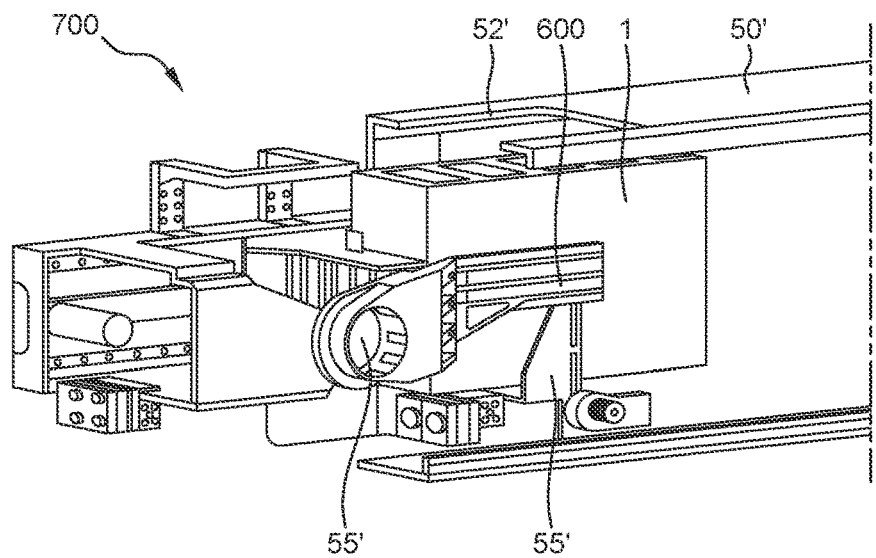

In FIG. 11A, the block transfer apparatus 700 is shown with its clamping assembly 600 extended out and reaching into a boom 50' to receive a block 1 from a downstream clamp 55' such as a shuttle clamp that runs along the boom element 55'. In this example, the clamping assembly 600 has been rotated about axis 52' in a clockwise direction through a recess or cut-out in the topside portion of the distal end of the boom so that the block transfer apparatus 700 can enter the envelope of the boom without any physical clash. Depending on the size of the cut-out, the clamping assembly 600 may be able to reach full extension during rotation. Otherwise, the block transfer apparatus 700 rotates into alignment with the boom 50' first and then extends the clamping assembly 600 into the boom 50'. Once the clamping assembly 600 has clamped the block, the downstream clamp 55' may release its grip of the block. It is to be understood that the position of the block with respect to the gripper jaws of the clamping assembly 600 is not precisely known at this stage.

Figure 11B:
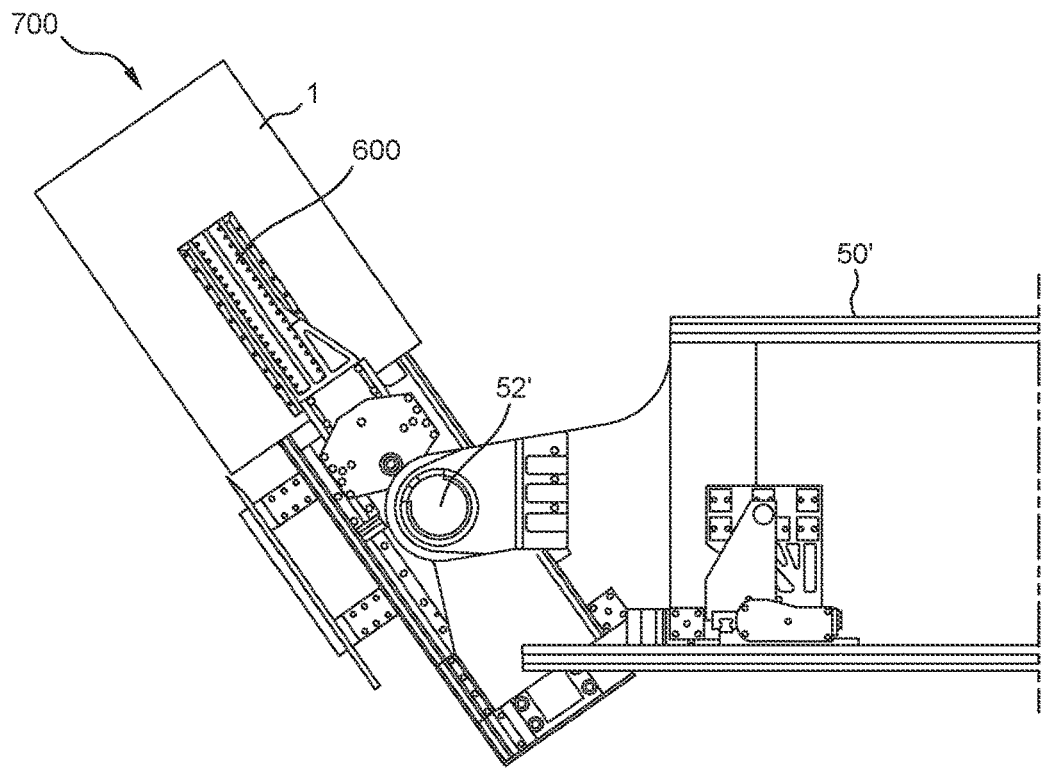
Figure 11C:
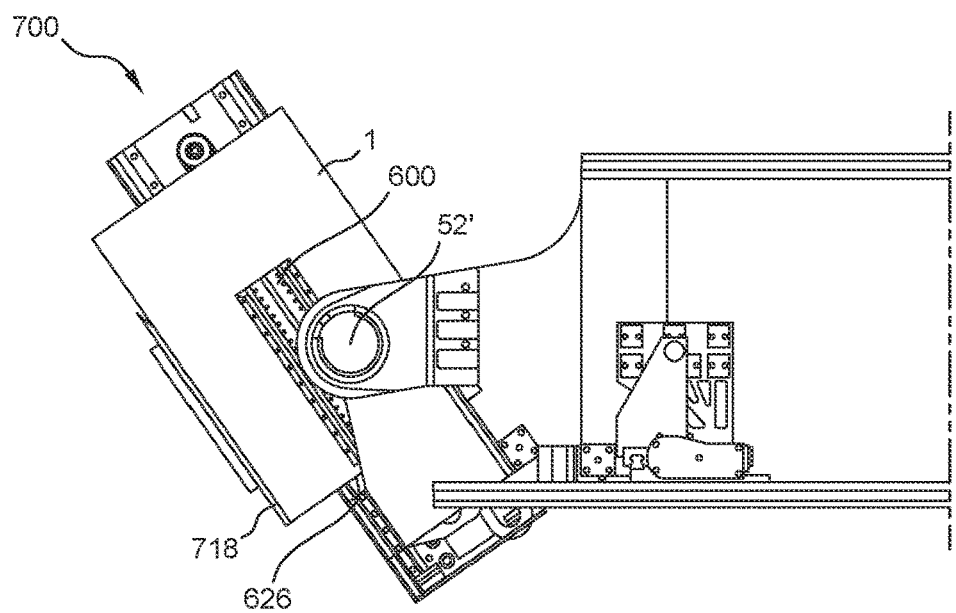

In FIG. 11B, the clamping assembly 600 is shown rotating out of the boom in a counter-clockwise direction and starting to retract away from its fully extended position in preparation for the block datuming operation. In FIG. 11C, when the block transfer apparatus 700 is in the drop position (oriented at an angle to the ground of approximately 45 degrees), the clamping assembly 600 releases its clamp of the block and allows it to drop under gravity so that the block self-datums onto first and second orthogonal datum surfaces 626 and 718 to thereby register an end and top or bottom face of the block in corresponding first and second orthogonal planes. Once the drop has been performed and the block is datumed in these planes, the gripper jaws of the clamping assembly 600 re-clamp the block by applying a clamping force to opposing sides of the block so as to register the block against a third datum surface defining a third plane orthogonal to both the first and second planes to thereby datum the position of the block with respect to the clamping assembly 600.

Figure 11D:
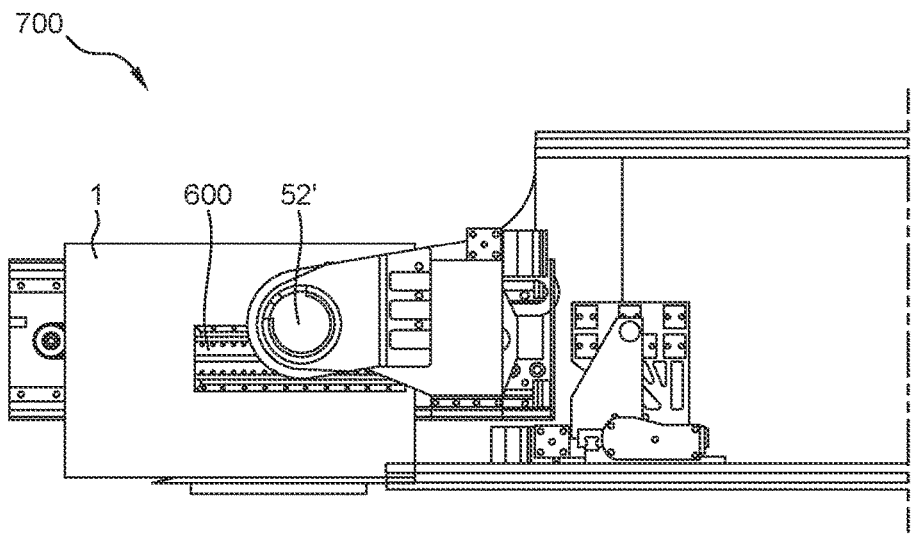
Figure 11E:
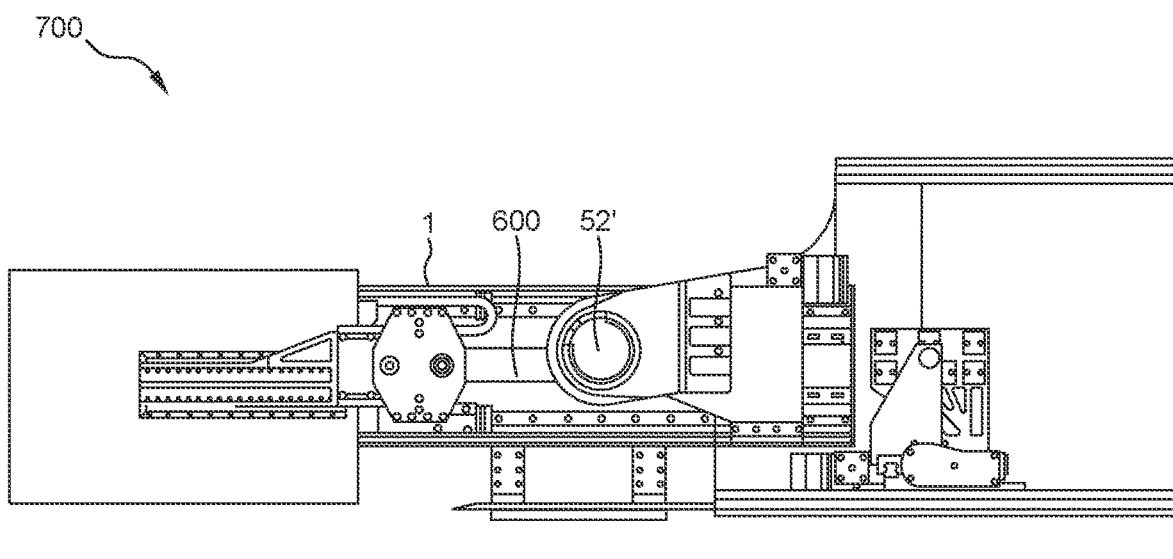

After the drop is complete and the block is re-clamped in the gripper jaws, the block transfer apparatus 700 commences further rotation in a counter clockwise direction whilst concurrently extending the clamping assembly 600 out in a horizontal disposition as shown in FIGS. 11D and 11E. In this example, during extension, the block may be translated over a transfer adhesive applicator to apply adhesive to the bottom surface of the block. In this position, the block is held out for transfer to the upstream clamp (not shown).

In at least one example, the above-described clamping assembly provides a reliable and repeatable means to datum a position of a block being clamped relative thereto. In a robotic system, this enables the clamping assembly or block transfer apparatus to which it may be mounted to present a block for transfer to a robotic arm in a known position and orientation. This mechanical system for self-datuming a block enables confidence in the geometric block position and orientation without requiring a camera-based vision system to image the block in the clamping assembly and determine the pose thereof which has inherent limitations in outdoor operating environments in which vibration, light and inconsistent block geometry can cause issues.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers. As used herein and unless otherwise stated, the term "approximately" means ±20%.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A block transfer apparatus for transferring a block between an upstream clamp of a block delivery system and a downstream clamp of the block delivery system, the block transfer apparatus including:
    a frame pivotally mounted to a support; and,
    a clamping assembly mounted to the frame and linearly extendable relative thereto, the clamping assembly including a pair of gripper jaws that clamp opposing lateral sides of the block;
    wherein, the block transfer apparatus is configured to:
        receive a block from the upstream clamp, wherein the opposing lateral sides of the block are initially clamped in the gripper jaws in an approximate position;
        rotate to a drop position whereby the gripper jaws release the block and allow it to self-datum onto first and second orthogonal datum surfaces to thereby register an end and top or bottom face of the block in corresponding first and second orthogonal planes;
        re-clamp the block after the drop by applying a clamping force to the opposing lateral sides of the block so as to register the block against a third datum surface defining a third plane orthogonal to both the first and second planes to thereby datum the position of the block with respect to the clamping assembly; and,
        present the block clamped in the datumed position for transfer to the downstream clamp.

2. The block transfer apparatus according to claim 1, wherein the first datum surface that registers an end of the block is provided as part of the clamping assembly at one of:
    a distal end of the gripper jaws; and,
    a proximal end of the gripper jaws to either the jaw or a jaw support structure.

3. The block transfer apparatus according to claim 1, wherein the second datum surface that registers a top or bottom surface of the block is at least one of:
    provided as part of the clamping assembly along an upper lengthwise extending edge of the gripper jaws; and,
    provided as part of the frame in the form of a lengthwise extending bar or plate mounted to the support that is parallel to the gripper jaws.

4. The block transfer apparatus according to claim 3, wherein the third datum surface is provided by a first of the two gripper jaws.

5. The block transfer apparatus according to claim 4, wherein the first gripper jaw has a pair of spaced apart first gripper pads rigidly attached to an inner surface of the jaw.

6. The block transfer apparatus according to claim 5, wherein the first gripper pads extend lengthwise along the first gripper jaw.

7. The block transfer apparatus according to claim 4, wherein a second of the two gripper jaws includes a plurality of second gripper pads attached to flexible finger members spaced apart along the length of the jaw that allow the pads to flex laterally and compensate for variations in flatness of the side of the block along its length.

8. The block transfer apparatus according to claim 7, wherein an at least one row of second gripper pads of the second gripper jaw is located approximately midway between the pair of spaced apart first gripper pads such that when a clamping force is applied to the block it is urged into planar alignment with the third datum surface.

9. The block transfer apparatus according to claim 1, wherein the gripper jaws are configured to accommodate blocks of varying length.

10. The block transfer apparatus according to claim 9, wherein the gripper jaws are configured to one of:
   clamp blocks of varying length at different pre-defined positions along the length of the gripper jaws; and,
   clamp blocks of varying length at the same position along the length of the gripper jaws.

11. The block transfer apparatus according to claim 1 wherein the drop position coincides with the clamping assembly being rotated to a relative angle to the ground of at least one of:
   between 30 to 60 degrees;
   between 35 to 55 degrees;
   between 40 to 50 degrees; and,
   approximately 45 degrees.

12. The block transfer apparatus according to claim 1, wherein the support comprises a distal end of a boom used for transferring blocks therealong.

13. The block transfer apparatus according to claim 1, wherein the upstream clamp forms part of a shuttle for delivering a block along the boom.

14. The block transfer apparatus according to claim 1, wherein the downstream clamp is an end effector of a robotic block placement arm that is programmed to place blocks during construction of a building structure.

15. The block transfer apparatus according to claim 1, wherein the block transfer apparatus includes a distance range sensor for use in determining the proximity between the clamping assembly and the block held by the upstream clamp.

16. A block delivery system for delivering blocks for placement during construction of a building structure, the block delivery system including:
   a boom for transferring blocks therealong;
   an upstream clamp forming part of a shuttle that delivers blocks along the boom;
   a downstream clamp associated with an end effector of a robotic block placement arm that is programmed to place blocks during construction of the building structure; and,
   a block transfer apparatus for transferring a block between the upstream clamp and the downstream clamp, the block transfer apparatus including:
      a frame pivotally mounted to a distal end of the boom; and,
      a clamping assembly mounted to the frame and linearly extendable relative thereto, the clamping assembly including a pair of gripper jaws that clamp opposing lateral sides of the block;
   wherein, the block transfer apparatus is configured to:
      receive a block from the upstream clamp, wherein the opposing lateral sides of the block are initially clamped in the gripper jaws in an approximate position;
      rotate to a drop position whereby the gripper jaws release the block and allow it to self-datum onto first and second orthogonal datum surfaces to thereby register an end and top or bottom face of the block in corresponding first and second orthogonal planes;
      re-clamp the block after the drop by applying a clamping force to the opposing lateral sides of the block so as to register the block against a third datum surface defining a third plane orthogonal to both the first and second planes to thereby datum the position of the block with respect to the clamping assembly; and,
      present the block clamped in the datumed position for transfer to the downstream clamp.

* * * * *